US011298645B2

(12) United States Patent
Rocklitz et al.

(10) Patent No.: US 11,298,645 B2
(45) Date of Patent: *Apr. 12, 2022

(54) FILTRATION MEDIA PACK, FILTER ELEMENT, AND METHODS

(71) Applicant: Donaldson Company, Inc., Minneapolis, MN (US)

(72) Inventors: Gary J. Rocklitz, Burnsville, MN (US); Robert M. Rogers, Minnetonka, MN (US); Daniel E. Adamek, Bloomington, MN (US); Ming Ouyang, Woodbury, MN (US); Anitha M. Mathew, Eden Prairie, MN (US)

(73) Assignee: Donaldson Company, Inc., Bloomington, MN (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/735,412

(22) Filed: Jan. 6, 2020

(65) Prior Publication Data

US 2020/0139290 A1 May 7, 2020

Related U.S. Application Data

(63) Continuation of application No. 15/221,824, filed on Jul. 28, 2016, now Pat. No. 10,525,397, which is a (Continued)

(51) Int. Cl.
*B01D 46/52* (2006.01)
*B01D 46/00* (2006.01)

(52) U.S. Cl.
CPC ....... *B01D 46/526* (2013.01); *B01D 46/0001* (2013.01); *B01D 46/522* (2013.01);
(Continued)

(58) Field of Classification Search
CPC ................... B01D 46/522; B01D 46/525–527
See application file for complete search history.

(56) References Cited

U.S. PATENT DOCUMENTS

| 2,058,669 A | 10/1936 | Dollinger |
| 2,410,371 A | 10/1946 | Gordon |

(Continued)

FOREIGN PATENT DOCUMENTS

| AU | 2008210304 | 9/2013 |
| AU | 2008268271 | 3/2014 |

(Continued)

OTHER PUBLICATIONS

Chinese Notice of Allowance received for Chinese Application No. 200880006683.4, dated Mar. 20, 2012, (4 pages) Including English translation.

(Continued)

*Primary Examiner* — Robert Clemente
(74) *Attorney, Agent, or Firm* — Pauly, DeVries, Smith & Deffner LLC

(57) ABSTRACT

A filtration media pack is provided having a plurality of layers of single facer media. The layer of single facer media includes a fluted sheet, a facing sheet, and a plurality of flutes extending between the fluted sheet and the facing sheet and having a flute length extending from a first face to a second face of the filtration media pack. A first portion of the plurality of flutes are closed to unfiltered fluid flowing into the first portion of the plurality of flutes, and a second portion of the plurality of flutes are closed to unfiltered fluid flowing out of the second portion of the plurality of flutes so that fluid passing into one of the first face and the second face of the media pack and out the other face of the media pack passes through media to provide filtration of the fluid.

8 Claims, 24 Drawing Sheets

Related U.S. Application Data continuation of application No. 14/040,929, filed on Sep. 30, 2013, now Pat. No. 9,433,884, which is a continuation of application No. 12/215,718, filed on Jun. 26, 2008, now Pat. No. 8,545,589.

(60) Provisional application No. 60/937,162, filed on Jun. 26, 2007.

(52) U.S. Cl.
CPC ......... *B01D 46/525* (2013.01); *B01D 46/527* (2013.01); *Y10T 156/10* (2015.01)

(56) References Cited

U.S. PATENT DOCUMENTS

| | | |
|---|---|---|
| 2,514,505 A | 7/1950 | Morton |
| 2,514,506 A | 7/1950 | Mueller |
| 2,599,604 A | 6/1952 | Bauer et al. |
| 2,908,350 A | 10/1959 | Buckman |
| 2,960,145 A | 11/1960 | Ruegenberg |
| 2,980,208 A | 4/1961 | Neumann |
| 3,025,963 A | 3/1962 | Bauer |
| 3,053,309 A | 9/1962 | Wilson et al. |
| 3,058,594 A | 10/1962 | Hultgren |
| 3,062,378 A | 11/1962 | Briggs |
| 3,077,148 A | 2/1963 | Mumby |
| 3,146,197 A | 8/1964 | Getzin |
| 3,198,336 A | 8/1965 | Hyslop |
| 3,293,833 A | 12/1966 | George |
| 3,372,533 A | 3/1968 | Rummel |
| 3,485,485 A | 12/1969 | Faigle |
| 3,531,920 A | 10/1970 | Hart |
| 3,799,354 A | 3/1974 | Buckman et al. |
| 3,807,150 A | 4/1974 | Maracle |
| 3,948,712 A | 4/1976 | Stannard |
| 4,102,792 A | 7/1978 | Harris |
| 4,154,688 A | 5/1979 | Pall |
| 4,268,290 A | 5/1981 | Barrington |
| 4,290,889 A | 9/1981 | Erickson |
| 4,310,419 A | 1/1982 | Nara et al. |
| 4,389,315 A | 6/1983 | Crocket |
| 4,410,316 A | 10/1983 | Yoke |
| 4,410,427 A | 10/1983 | Wydeven |
| 4,439,321 A | 3/1984 | Taki et al. |
| 4,452,619 A | 6/1984 | Wright et al. |
| 4,488,966 A | 12/1984 | Schaeffer |
| 4,537,812 A | 8/1985 | Elbers |
| 4,589,983 A | 5/1986 | Wydevan |
| 4,615,804 A | 10/1986 | Wright |
| 4,617,072 A | 10/1986 | Merz |
| 4,652,286 A | 3/1987 | Takao |
| 4,732,678 A | 3/1988 | Humbert, Jr. |
| 4,735,720 A | 4/1988 | Kersting |
| 4,766,453 A | 8/1988 | Shiokama et al. |
| 4,915,878 A | 4/1990 | Fabry et al. |
| 4,925,561 A | 5/1990 | Ishii et al. |
| 4,954,249 A | 9/1990 | Gero et al. |
| 5,002,666 A | 3/1991 | Matsumoto et al. |
| 5,049,326 A | 9/1991 | Matsumoto et al. |
| 5,066,400 A | 11/1991 | Rocklitz et al. |
| 5,080,790 A | 1/1992 | Widmann |
| 5,089,202 A | 2/1992 | Lippold |
| 5,120,296 A | 6/1992 | Yamaguchi et al. |
| 5,128,039 A | 7/1992 | Gabrielsen |
| 5,240,540 A | 8/1993 | Matsumoto et al. |
| 5,262,899 A | 11/1993 | Iizuka |
| 5,274,413 A | 12/1993 | Nomura et al. |
| 5,290,447 A | 3/1994 | Lippold |
| 5,346,519 A | 9/1994 | Williams |
| 5,419,796 A | 5/1995 | Miller |
| 5,435,870 A | 7/1995 | Takagaki et al. |
| 5,487,224 A | 1/1996 | Gabalda et al. |
| 5,522,909 A | 6/1996 | Haggard et al. |
| 5,562,825 A | 10/1996 | Yamada et al. |
| 5,591,329 A | 1/1997 | Davidson |
| 5,613,992 A | 3/1997 | Engel |
| 5,766,289 A | 6/1998 | Haggard |
| 5,772,883 A | 6/1998 | Rothman et al. |
| D396,098 S | 7/1998 | Gillingham |
| 5,792,247 A | 8/1998 | Gillingham et al. |
| D398,046 S | 9/1998 | Gillingham |
| 5,804,014 A | 9/1998 | Kahler |
| 5,804,073 A | 9/1998 | Horst |
| D399,944 S | 10/1998 | Gillingham |
| 5,820,646 A | 10/1998 | Gillingham et al. |
| 5,851,250 A | 12/1998 | Sugie et al. |
| 5,871,641 A | 2/1999 | Davidson |
| 5,882,288 A | 3/1999 | Paul et al. |
| 5,888,262 A | 3/1999 | Kahler |
| 5,895,574 A | 4/1999 | Friedmann et al. |
| 5,902,364 A | 5/1999 | Toker et al. |
| 5,904,793 A | 5/1999 | Gorman et al. |
| 5,970,609 A | 10/1999 | Shioda |
| 5,987,399 A | 11/1999 | Wegerich et al. |
| 6,039,778 A | 3/2000 | Coulonvaux |
| 6,048,298 A | 4/2000 | Paul et al. |
| D428,128 S | 7/2000 | Gillingham |
| 6,089,761 A | 7/2000 | Sakurai et al. |
| 6,179,890 B1 | 1/2001 | Ramos |
| D437,401 S | 2/2001 | Ramos |
| 6,190,432 B1 | 2/2001 | Gieseke et al. |
| 6,202,038 B1 | 3/2001 | Wegerich et al. |
| 6,210,469 B1 | 4/2001 | Tokar |
| 6,235,195 B1 | 5/2001 | Tokar |
| 6,238,561 B1 | 5/2001 | Liu et al. |
| 6,348,084 B1 | 2/2002 | Gieseke |
| 6,348,085 B1 | 2/2002 | Joseph |
| 6,350,291 B1 | 2/2002 | Gieseke |
| 6,350,296 B1 | 2/2002 | Warner |
| 6,402,800 B1 | 6/2002 | Rey |
| 6,433,748 B1 | 8/2002 | Ekelund et al. |
| 6,517,598 B2 | 2/2003 | Anderson |
| 6,544,310 B2 | 4/2003 | Badeau et al. |
| 6,554,503 B2 | 4/2003 | Imanari et al. |
| 6,582,490 B2 | 6/2003 | Miller et al. |
| 6,598,749 B2 | 7/2003 | Paul et al. |
| 6,610,117 B2 | 8/2003 | Gieseke et al. |
| 6,610,126 B2 | 8/2003 | Xu |
| 6,620,223 B2 | 9/2003 | Bloomer |
| 6,673,136 B2 | 1/2004 | Gillingham et al. |
| 6,685,833 B2 | 2/2004 | Lippold |
| 6,743,270 B2 | 6/2004 | Oda et al. |
| 6,746,518 B2 | 6/2004 | Gieseke et al. |
| 6,783,565 B2 | 8/2004 | Gieseke et al. |
| 6,790,397 B2 | 9/2004 | Richerson et al. |
| 6,846,342 B2 | 1/2005 | Mertz et al. |
| 6,848,435 B2 | 2/2005 | Kitamura et al. |
| 6,893,282 B2 | 5/2005 | Schadhauser |
| 6,946,012 B1 | 9/2005 | Miller |
| 6,953,124 B2 | 10/2005 | Winter et al. |
| 6,955,775 B2 | 10/2005 | Chung et al. |
| 6,966,940 B2 | 11/2005 | Krisko et al. |
| 6,986,842 B2 | 1/2006 | Bortnik et al. |
| 7,070,642 B2 | 7/2006 | Scott et al. |
| 7,122,068 B2 | 10/2006 | Tate et al. |
| 7,149,153 B2 | 12/2006 | Meylan |
| 7,166,216 B2 | 1/2007 | Woodard, Jr. et al. |
| 7,213,595 B2 | 5/2007 | Capon et al. |
| 7,235,115 B2 | 6/2007 | Duffy |
| 7,258,719 B2 | 8/2007 | Miller et al. |
| 7,270,693 B2 | 9/2007 | Chung et al. |
| 7,311,747 B2 | 12/2007 | Adamek et al. |
| 7,329,326 B2 | 2/2008 | Wagner et al. |
| 7,396,375 B2 | 7/2008 | Nepsund |
| 7,396,376 B2 | 7/2008 | Schrage et al. |
| 7,425,227 B1 | 9/2008 | Hutchison et al. |
| 7,438,812 B2 | 10/2008 | Denton et al. |
| 7,488,365 B2 | 2/2009 | Golden et al. |
| 7,556,663 B2 | 7/2009 | Niakan |
| 7,588,619 B2 | 9/2009 | Chilton |
| 7,622,063 B2 | 11/2009 | Brandner et al. |
| 7,625,419 B2 | 12/2009 | Nelson et al. |
| 7,661,540 B2 | 2/2010 | Choi |

(56) References Cited

U.S. PATENT DOCUMENTS

| | | |
|---|---|---|
| 7,754,041 B2 | 7/2010 | Brandner et al. |
| 7,927,393 B2 | 4/2011 | Sanami |
| 7,959,702 B2 | 6/2011 | Rocklitz et al. |
| 7,997,425 B2 | 8/2011 | Golden et al. |
| 8,034,145 B2 | 10/2011 | Bohers et al. |
| 8,042,694 B2 | 10/2011 | Driml et al. |
| 8,226,786 B2 | 7/2012 | Risch et al. |
| 8,241,384 B2 | 8/2012 | Murphy et al. |
| 8,268,053 B2 | 9/2012 | Risch et al. |
| 8,277,532 B2 | 10/2012 | Osendorf et al. |
| 8,292,983 B2 | 10/2012 | Reichter et al. |
| 8,361,183 B2 | 1/2013 | Rocklitz et al. |
| 8,397,920 B2 | 3/2013 | Moy et al. |
| 8,409,316 B2 | 4/2013 | Nelson et al. |
| 8,460,442 B2 | 6/2013 | Wagner et al. |
| 8,496,723 B2 | 7/2013 | Osendorf et al. |
| 8,512,499 B2 | 8/2013 | Golden et al. |
| 8,545,589 B2 | 10/2013 | Rocklitz |
| 8,673,196 B2 | 3/2014 | Treier et al. |
| 8,685,128 B2 | 4/2014 | Murphy et al. |
| 8,702,830 B2 | 4/2014 | Muter |
| 8,734,557 B2 | 5/2014 | Rocklitz et al. |
| 8,814,972 B2 | 8/2014 | Waibel et al. |
| 8,961,722 B2 | 2/2015 | Murphy et al. |
| 9,084,957 B2 | 7/2015 | Rocklitz |
| 9,103,470 B2 | 8/2015 | Cik |
| 9,433,884 B2 | 9/2016 | Rocklitz et al. |
| 9,517,430 B2 | 12/2016 | Rocklitz et al. |
| 9,808,752 B2 | 11/2017 | Moe et al. |
| 9,855,519 B2 | 1/2018 | Rocklitz |
| 10,058,812 B2 | 8/2018 | Rocklitz |
| 10,363,513 B2 | 7/2019 | Moe |
| 10,525,397 B2 | 1/2020 | Rocklitz et al. |
| 10,786,774 B2 | 9/2020 | Rocklitz et al. |
| 10,946,313 B2 | 3/2021 | Rocklitz et al. |
| 2002/0046654 A1 | 4/2002 | Bloomer |
| 2002/0060183 A1 | 5/2002 | Paul et al. |
| 2002/0108359 A1 | 8/2002 | Powell |
| 2002/0174770 A1 | 11/2002 | Badeau et al. |
| 2003/0033952 A1 | 2/2003 | Tanner |
| 2003/0037675 A1 | 2/2003 | Gillingham et al. |
| 2003/0056479 A1 | 3/2003 | Lemaster |
| 2003/0075500 A1 | 4/2003 | Kleingünther et al. |
| 2003/0121845 A1 | 7/2003 | Wagner et al. |
| 2004/0060269 A1 | 4/2004 | Chung et al. |
| 2004/0060861 A1 | 4/2004 | Winter et al. |
| 2005/0139544 A1 | 6/2005 | Choi |
| 2005/0144916 A1 | 7/2005 | Adamek et al. |
| 2005/0166561 A1 | 8/2005 | Schrage |
| 2005/0217226 A1 | 10/2005 | Sundet et al. |
| 2005/0223687 A1 | 10/2005 | Miller et al. |
| 2005/0252182 A1 | 11/2005 | Golden et al. |
| 2006/0005518 A1 | 1/2006 | Duffy et al. |
| 2006/0021926 A1 | 2/2006 | Woodard |
| 2006/0042209 A1 | 3/2006 | Dallas et al. |
| 2006/0042210 A1 | 3/2006 | Dallas et al. |
| 2006/0091066 A1 | 5/2006 | Driml et al. |
| 2006/0091084 A1 | 5/2006 | Merritt |
| 2006/0117730 A1 | 6/2006 | Chung et al. |
| 2006/0151383 A1 | 7/2006 | Choi |
| 2006/0163150 A1 | 7/2006 | Golden et al. |
| 2006/0246260 A1 | 11/2006 | Sundet et al. |
| 2006/0272305 A1 | 12/2006 | Morgan |
| 2007/0039296 A1 | 2/2007 | Schrage et al. |
| 2007/0209343 A1 | 9/2007 | Cuvelier et al. |
| 2007/0251634 A1 | 11/2007 | Choi |
| 2008/0022643 A1 | 1/2008 | Fox et al. |
| 2008/0209875 A1 | 9/2008 | Treier et al. |
| 2008/0216654 A1 | 9/2008 | Wagner et al. |
| 2008/0282890 A1 | 11/2008 | Rocklitz et al. |
| 2009/0102094 A1 | 4/2009 | Golden et al. |
| 2009/0127211 A1 | 5/2009 | Rocklitz |
| 2009/0188219 A1 | 7/2009 | Sanami et al. |
| 2009/0211696 A1 | 8/2009 | Moe et al. |
| 2009/0302390 A1 | 12/2009 | Van Dal et al. |
| 2010/0032365 A1 | 2/2010 | Moe |
| 2010/0078379 A1 | 4/2010 | Rocklitz |
| 2011/0186504 A1 | 8/2011 | Rocklitz |
| 2011/0277431 A1 | 11/2011 | Rocklitz et al. |
| 2012/0196733 A1 | 8/2012 | Moe et al. |
| 2012/0312167 A1 | 12/2012 | Wagner et al. |
| 2013/0228077 A1 | 9/2013 | Rocklitz et al. |
| 2014/0182251 A1 | 7/2014 | Rocklitz |
| 2014/0325946 A1 | 11/2014 | Rocklitz et al. |
| 2015/0375142 A1 | 12/2015 | Rocklitz |
| 2017/0028341 A1 | 2/2017 | Rocklitz et al. |
| 2017/0216758 A1 | 8/2017 | Rocklitz et al. |
| 2018/0214797 A1 | 8/2018 | Rocklitz |
| 2019/0054412 A1 | 2/2019 | Rocklitz |
| 2021/0077939 A1 | 3/2021 | Rocklitz et al. |

FOREIGN PATENT DOCUMENTS

| | | |
|---|---|---|
| CA | 557255 | 5/1958 |
| CA | 2676825 | 4/2015 |
| CN | 1040239 | 6/1989 |
| CN | 1080012 | 12/1993 |
| CN | 1100776 | 3/1995 |
| CN | 1220617 | 6/1996 |
| CN | 1079275 | 2/2002 |
| CN | 1502739 | 6/2004 |
| CN | 1615172 | 5/2005 |
| CN | 1668363 | 9/2005 |
| CN | 1678383 | 10/2005 |
| CN | 1902384 | 1/2007 |
| CN | 1325142 | 7/2007 |
| CN | 101189056 | 5/2008 |
| CN | 101626820 | 7/2012 |
| CN | 102743930 | 10/2012 |
| CN | 102743931 | 10/2012 |
| CN | 102743937 | 10/2012 |
| CN | 101932372 | 9/2015 |
| CN | 102438723 | 12/2015 |
| CN | 105148614 | 12/2015 |
| CN | 102781546 | 1/2016 |
| DE | 1407908 | 1/1969 |
| DE | 2117672 | 10/1971 |
| DE | 3815145 | 10/1989 |
| DE | 8910110 | 2/1990 |
| DE | 4126126 | 2/1993 |
| DE | 19735993 | 2/1999 |
| DE | 10113077 | 4/2002 |
| DE | 69722933 | 5/2004 |
| DE | 60033469 | 10/2007 |
| DE | 102008029480 | 12/2009 |
| EP | 0504038 | 9/1992 |
| EP | 0522692 | 1/1993 |
| EP | 0630672 | 12/1994 |
| EP | 0783914 | 7/1997 |
| EP | 1249261 | 10/2002 |
| EP | 1410832 | 4/2004 |
| EP | 1343573 | 3/2005 |
| EP | 1595590 | 11/2005 |
| EP | 1681087 | 7/2006 |
| EP | 1785604 | 5/2007 |
| EP | 2170488 | 4/2010 |
| EP | 2268380 | 1/2011 |
| EP | 2514504 | 10/2012 |
| EP | 2117672 | 1/2013 |
| EP | 2829310 | 1/2015 |
| EP | 3293833 | 3/2018 |
| FR | 1477095 | 4/1967 |
| FR | 2427123 | 12/1979 |
| GB | 1336841 | 11/1973 |
| GB | 2395537 | 4/2006 |
| JP | 1973004670 | 2/1973 |
| JP | 1984006916 | 1/1984 |
| JP | 5982919 | 5/1984 |
| JP | 6071018 | 4/1985 |
| JP | 61011921 | 1/1986 |
| JP | 61178009 | 8/1986 |
| JP | 61200116 | 12/1986 |
| JP | S64085109 | 3/1989 |
| JP | 01128811 | 5/1989 |

(56) References Cited

FOREIGN PATENT DOCUMENTS

| | | |
|---|---|---|
| JP | 1-163408 | 11/1989 |
| JP | 01163410 | 11/1989 |
| JP | 2-25009 | 2/1990 |
| JP | 2-129231 | 10/1990 |
| JP | 3229230 | 10/1991 |
| JP | H06064709 | 3/1994 |
| JP | 06327910 | 11/1994 |
| JP | 3006350 | 1/1995 |
| JP | 8238413 | 9/1996 |
| JP | 08309138 | 11/1996 |
| JP | H08309138 | 11/1996 |
| JP | 1997507156 | 7/1997 |
| JP | 2000509324 | 7/2000 |
| JP | 2002113798 | 4/2002 |
| JP | 2002303122 | 10/2002 |
| JP | 2002537103 | 11/2002 |
| JP | 2002542417 | 12/2002 |
| JP | 2003013724 | 1/2003 |
| JP | 2003166446 | 6/2003 |
| JP | 2004089982 | 3/2004 |
| JP | 2004520156 | 7/2004 |
| JP | 2005511269 | 4/2005 |
| JP | 2005532163 | 10/2005 |
| JP | 2007515291 | 6/2007 |
| JP | 2011511705 | 4/2011 |
| JP | 5555493 | 6/2014 |
| JP | 5711230 | 2/2015 |
| JP | 5728525 | 4/2015 |
| JP | 2015091584 | 5/2015 |
| JP | 5757868 | 6/2015 |
| JP | 2015131299 | 7/2015 |
| WO | 8400014 | 1/1984 |
| WO | 8705827 | 10/1987 |
| WO | 8910781 | 11/1989 |
| WO | 8912137 | 12/1989 |
| WO | 9302769 | 2/1993 |
| WO | 9517943 | 7/1995 |
| WO | 9744128 | 11/1997 |
| WO | 97040918 | 11/1997 |
| WO | 9908771 | 2/1999 |
| WO | 2000050153 | 8/2000 |
| WO | 2002049741 | 6/2002 |
| WO | 2003033952 | 4/2003 |
| WO | 2003047722 | 6/2003 |
| WO | 2004007054 | 1/2004 |
| WO | 2004039476 | 5/2004 |
| WO | 2004082795 | 9/2004 |
| WO | 2005077487 | 8/2005 |
| WO | 2005082484 | 9/2005 |
| WO | 2005123222 | 12/2005 |
| WO | 2006014941 | 2/2006 |
| WO | 2006017790 | 2/2006 |
| WO | 2006076456 | 7/2006 |
| WO | 2006076479 | 7/2006 |
| WO | 2006132717 | 12/2006 |
| WO | 2007056589 | 5/2007 |
| WO | 2007133635 | 11/2007 |
| WO | 2008095196 | 8/2008 |
| WO | 2009003119 | 12/2008 |
| WO | 2009100067 | 8/2009 |
| WO | 2010011910 | 4/2010 |
| WO | 2011017352 | 2/2011 |
| WO | 2011091432 | 7/2011 |
| WO | 2012067729 | 5/2012 |

OTHER PUBLICATIONS

CN Decision by Rexam Board for Chinese Patent Application No. 200980131774.5, dated Apr. 21, 2017 (15 pages) no English translation available.
Decision of Rejection for Japanese Patent Application No. 2015-043876 dated Jun. 20, 2017 (5 pages) with English translation.
Examination Report for Australian Patent Application No. 2016202520 dated Nov. 21, 2016 (2 pages).
Examiner's Pre-Review Report for Japanese Patent Application No. 2010545266, dated Jan. 20, 2014 (4 pages).
"Examiner's Pre-Review Report," for Japanese Patent Application No. 2016-233484 dated Apr. 19, 2019 (10 pages) with English Summary.
Examiner's Report for Canadian Application No. 2676825, dated Sep. 11, 2013, 3 pages.
Examiner's Report for Canadian Patent Application No. 2691867, dated Jan. 30, 2015 (3 pages).
Figures 1-6 from Japanese Patent JP2-129231, dated Oct. 2002, 3 pages.
File History for U.S. Appl. No. 14/040,929 downloaded Jul. 16, 2020 (776 pages).
File History for U.S. Appl. No. 14/198,246 downloaded Jul. 16, 2020 (414 pages).
File History for U.S. Appl. No. 15/221,824 downloaded Jul. 16, 2020 (762 pages).
File History for U.S. Appl. No. 15/372,944 downloaded Jul. 17, 2020 (627 pages).
File History for U.S. Appl. No. 15/859,021 downloaded Jul. 28, 2020 (692 pages).
File History for U.S. Appl. No. 16/113,807 downloaded Jul. 28, 2020 (348 pages).
File History for U.S. Appl. No. 12/508,944 downloaded Jul. 28, 2020 (200 pages).
File History for U.S. Appl. No. 13/013,631 downloaded Jul. 28, 2020 (1077 pages).
File History for U.S. Appl. No. 12/322,616 downloaded Jul. 28, 2020 (698 pages).
File History for U.S. Appl. No. 13/388,956 downloaded Jul. 28, 2020 (1013 pages).
File History for European Patent Application No. 18164621.7 downloaded Jul. 29, 2020 (290 pages).
File History for European Patent Application No. 11703321.7 downloaded Jul. 29, 2020 (2534 pages).
File History for European Patent Application No. 09790799.2 downloaded Jul. 31, 2020 (2187 pages).
File History for European Patent Application No. 10807046.7 downloaded Aug. 5, 2020 (498 pages).
File History for European Patent Application No. 09708023.8 downloaded Aug. 7, 2020 (515 pages).
File History for European Patent Application No. 12163091.7 downloaded Aug. 10, 2020 (540 pages).
File History for European Patent Application No. 12163098.2 downloaded Aug. 10, 2020 (526 pages).
File History for European Patent Application No. 12163105.5 downloaded Aug. 19, 2020 (554 pages).
File History for European Patent Application No. 14166293.2 downloaded Aug. 19, 2020 (268 pages).
File History for co-pending U.S. Appl. No. 12/215,718, (downloaded from USPTO Website Dec. 8, 2014), 214 pages.
File History for co-pending U.S. Appl. No. 13/110,742 (downloaded from USPTO Website Dec. 8, 2014), 148 pages.
File History for co-pending U.S. Appl. No. 13/744,200, (downloaded from USPTO Website Dec. 8, 2014), 126 pages.
File History for co-pending U.S. Appl. No. 14/708,993 (downloaded from USPTO Website Mar. 6, 2017), 243 pages.
File History from related U.S. Appl. No. 12/012,785, now U.S. Pat. No. 7,959,702, (downloaded from USPTO Website Jul. 19, 2013), 240 pages. 240.
File History from related European Application Serial No. 08714184.2-2113, now Issued EP Patent No. 2117672, (downloaded from EPO Register Nov. 25, 2014), 152 pages.
File History from related European Application Serial No. 08781029.7-1365, now Issued EP Patent No. 2170488, (downloaded from EPO Register Nov. 25, 2014), 134 pages.
Final Office Action for Chinese Patent Application No. 201510507854.3 dated Oct. 9, 2017 (14 pages) with English translation.
Final Office Action for Japanese Patent Application No. 2014-114346, dated Aug. 5, 2016 (3 pages).
Final Office Action for Japanese Patent Application No. 2015-043876 dated Nov. 8, 2016 (9 pages) with English translation.

(56) References Cited

OTHER PUBLICATIONS

Final Office Action for Japanese Patent Application No. 2015-077921 dated Feb. 17, 2017 (5 pages) with English summary.
Final Office Action for Japanese Patent Application No. 2015-077921 dated Jun. 20, 2017 (8 pages) with English translation.
"Final Rejection Action," for Chinese Patent Application No. 201710616416.X dated Feb. 25, 2020 (12 pages) with English Translation.
Final Rejection for Chinese Application No. 200980103965.0, dated May 14, 2013 (14 pages) including English translation.
Final Rejection for Chinese Patent Application No. 201080037254.0, dated Mar. 30, 2015 (15 pages) with English translation.
Final Rejection for Japanese Patent Application No. 2010-545266 dated Jul. 8, 2013 (7 pages) with English translation.
Final Rejection for Japanese Patent Application No. 2013-232560 dated Jan. 5, 2016 (3 pages) with English Summary.
First Chinese Office Action Received First Office Action for Chinese Application No. 200880006683.4, dated May 31, 2011, Including English translation, 7 pages.
First Examination Report for Australian Patent Application No. 2011207507, dated Dec. 1, 2015 (3 pages).
First Examination Report for India Patent Application No. 283/KOLNP/2010, dated Dec. 30, 2014 (3 pages).
First Examination Report for India Patent Application No. 3070/KOLNP/2009, dated Aug. 7, 2014 (2 pages).
First Examination Report for Indian Patent Application No. 3243/kolnp/2010, dated Oct. 12, 2015 (2 pages).
"First Examination Report," for Indian Patent Application No. 2038/KOLNP/2012 dated Jul. 27, 2018 (6 pages).
"First Examination Report," for Indian Patent Application No. 486/KOLNP/2012 dated Jun. 27, 2018 (9 pages).
First Examiner Report for Australian Patent Application No. 2014201109, dated Jul. 20, 2015 (3 pages).
First Examiner Report from Australian Application No. 2008268271, dated Feb. 24, 2012, 2 pages.
First Examiner's Report for Australian Patent Application No. 2013270543 dated Apr. 23, 2015 (3 pages).
First Office Action for Application Serial No. 200980131774.5, dated Mar. 20, 2013, with English translation (14 pages).
First Office Action for Chinese Application No. 200880104082.7, dated Aug. 9, 2013 (7 pages) with English translation.
First Office Action for Chinese Application No. 200980103965.0, dated Jul. 20, 2012, (pp. 1-18) Including English translation.
First Office Action for Chinese Application No. 201080037254.0, dated Oct. 29, 2013, with English translation (20 pages).
First Office Action for Chinese Patent Application No. 201180011588.5, (with English translation) dated Mar. 4, 2014 (30 pages).
First Office Action for Chinese Patent Application No. 201210181182.8, dated Feb. 21, 2014 (16 pages) with English translation.
First Office Action for Chinese Patent Application No. 201210180467.X, dated Jan. 28, 2014 (10 pages) with English translation.
First Office Action for Chinese Patent Application No. 201210181810.2 dated Jan. 10, 2014 (8 pages) with English translation.
First Office Action for Chinese Patent Application No. 201510507854.3, dated Jun. 28, 2016 (15 pages) with English translation.
First Office Action for Chinese Patent Application No. 201510828027.4 dated Dec. 16, 2016 (14 pages) with English Translation.
First Office Action for Chinese Patent Application No. 201510896382.5 dated Mar. 27, 2017 (17 pages).
First Office Action for Japanese Patent Application No. 2013089604, dated Jan. 27, 2014 (4 pages) with English translation.
First Office Action for Japanese Patent Application No. 2013-232560, dated Dec. 8, 2014 (5 pages) with English translation.
First Office Action for Japanese Patent Application No. 2014114346, dated Jul. 31, 2015 (10 pages) with English Summary.
First Office Action for Japanese Patent Application No. 2015-077921, dated Jul. 4, 2016 (6 pages) with English Translation.
First Office Action from JP Application No. 2008554447, dated Dec. 14, 2012, (13 pages) Including English translation.

First Office Action from JP Application No. 2009-548495, dated Mar. 11, 2013, (7 pgs.) with English Summary.
First Office Action Received for Australian Application No. 2008210304, dated Nov. 23, 2011 (2 pages).
"First Office Action," for Chinese Patent Application No. 201710616416.X dated Apr. 24, 2019 (15 pages) with English Translation.
"First Office Action," for Japanese Patent Application No. 2017-203639 (our file 758.2137JPD5) mailed Feb. 4, 2019 (6 pages) with English Summary.
Fourth Office Action for Chinese Patent Application No. 200980131774.5, dated Apr. 29, 2015 (14 pages) with English translation.
Fourth Office Action for Chinese Patent Application No. 201210180467.X, dated Dec. 29, 2015 (10 pages) with English translation.
"Fourth Office Action," for Chinese Patent Application No. 201510896382.5 dated Jan. 11, 2019 (18 pages) with English Translation.
International Preliminary Report on Patentability for International Application No. PCT/US2008/068394, dated Jan. 5, 2010 (8 pages).
International Preliminary Report on Patentability for International Application No. PCT/US2009/032965 dated Aug. 19, 2010 (9 pages).
International Preliminary Report on Patentability from International Application No. PCT/US2008/068394, dated Jan. 14, 2010 (9 pages).
International Preliminary Report on Patentability from International Application No. PCT/US2010/044286, dated Feb. 16, 2012, 7 pages.
International Search Report and Written Opinion for International Application No. PCT/US2009/032965, dated May 18, 2009 (13 pages).
International Search Report and Written Opinion from International Application No. PCT/US2008/052961, dated Jun. 11, 2008 (13 pages).
International Search Report and Written Opinion from International Application No. PCT/US2008/068394, dated Oct. 7, 2008, (11 pages).
International Search Report and Written Opinion from International Application No. PCT/US2010/044286, dated Apr. 14, 2011, 10 pages.
Invitation to Pay Additional Fees, received in corresponding International Application No. PCT/US2009/051670, 12 pages, dated Oct. 14, 2009.
Japanese office action from Japanese Application No. 2010-515132, dated May 2, 2012, (pp. 1-14) Including English translation.
Non Final Office Action for Chinese Patent Application No. 201210181810.2, dated Feb. 10, 2015 (13 pages) with English translation.
Non-Final Office Action for Japanese Application No. 2011-520223, dated Jun. 4, 2013, with English translation (5 pages).
Non-Final Office Action for Japanese Patent Application No. 2014-263546, dated Nov. 10, 2015 (5 pages) with English Summary.
Notice of Allowance for Chinese Patent Application No. 200880104082.7, dated Sep. 17, 2015 (3 pages) with English translation.
Notice of Allowance for Chinese Patent Application No. 201210181810.2, dated Aug. 19, 2015 (3 pages with English translation).
"Notice of Allowance," for Chinese Patent Application No. 2009801039650, dated Jun. 4, 2015 (3 pages) including English translation.
"Notice of Allowance," for Chinese Patent Application No. 201210181182.8, dated Jun. 4, 2015 (3 pages) with English translation.
Notification for Patent Reexamination for Chinese Patent Application No. 200980131774.5 dated Nov. 18, 2016 (16 pages) with English translation.
Notification for Patent Reexamination for Chinese Patent Application No. 201080037254.0, dated Oct. 26, 2015 (9 pages) with English translation.
Office Action by the Appeal Examiner for Japanese Patent Application No. 2010-545266, dated Dec. 11, 2015 (3 pages) with English Summary.
Office Action for Chinese Application No. 200880104082.7, dated Feb. 12, 2015 (6 pages) with English Translation.

(56) References Cited

OTHER PUBLICATIONS

Office Action for Japanese Application No. 2012-523711, with English translation, dated Jul. 1, 2014 (5 pages).
Office Action for Japanese Patent Application No. 2014114346, dated Aug. 4, 2017 (23 pages) with English translation.
Office Action for Japanese Patent Application No. 2015-043876 dated Mar. 1, 2016 (6 pages) with English translation.
Office Action for Japanese Patent Application No. 2016-233484 dated Sep. 4, 2017 (7 pages) with English translation.
Office Action for JP Application No. 2010-545266, dated Jun. 20, 2014 (9 pages).
Office Action for Mexican Patent Application No. MX/a/2012/001455 dated Apr. 7, 2016 (2 pages), translation only.
Office Action for Mexican Patent Application No. MX/a/2012/001455 dated May 4, 2017 (3 pages), translation only.
Office Action for Mexican Patent Application No. MX/a/2012/001455 dated Dec. 7, 2016 (2 pages), translation only.
Office Action for Mexican Patent Application No. MX/a/2012/001455 dated Nov. 14, 2017 (5 pages) with English summary.
"Office Action," for Brazilian Patent Application No. PI0915931-2 dated Jun. 4, 2019 (5 pages) English Translation Only.
"Office Action," for Brazilian Patent Application No. PI0915931-2 dated Oct. 1, 2019 (14 pages) with English Translation.
"Office Action," for Japanese Patent Application No. 2015-043876 dated Nov. 13, 2018 (2 pages), English translation.
"Office Action," for Japanese Patent Application No. 2015-043876 dated Jun. 26, 2018 (15 pages) with English translation.
"Office Action," for Japanese Patent Application No. 2016-233484 dated Mar. 23, 2020 (17 pages) with English Translation.
"Office Action," for Japanese Patent Application No. 2016-233484 dated May 7, 2018 (10 pages) with English translation.
PCT International Search Report and Written Opinion from International Application No. PCT/US2009/051670, dated Feb. 9, 2010, 26 pages.
PCT International Search Report and Written Opinion from International Application No. PCT/US2011/022446, dated Apr. 5, 2011, 15 pages.
PCT Notification Concerning Transmittal of International Preliminary Report on from International Application No. PCT/US2011/022446, dated Aug. 9, 2012, 12 pages.
PCT Notification Concerning Transmittal of International Preliminary Report on Patentability from International Application No. PCT/US2009/051670, dated Feb. 3, 2011, 15 pages.
Reconsideration Report for Japanese Patent Application No. 2015-043876 dated Dec. 12, 2017 (2 pages), English translation.
Response to Examiner's Report for Canadian Patent Application No. 2,691,867, dated and filed with the CIPO Jul. 30, 2015 (86 pages).
Response to First Examination Report for Indian Patent Application No. 283/KOLNP/2010, filed with the IPO Dec. 28, 2015 (54 pages).
Response to First Office Action from Japanese Application No. 2010-515132, dated Sep. 19, 2012, (11 pages) Including English translation of claim amendments.
Second Examiner's Report for Canadian Patent Application No. 2691867, dated Nov. 2, 2015 (3 pages).
Second Non-Final Office Action for Chinese Patent Application No. 201180011588.5, dated Dec. 25, 2014 (9 pages) with English translation.
Second Office Action for Chinese Patent Application No. 200880104082.7, dated Mar. 11, 2014 (49 pages) with English translation.
Second Office Action for Chinese Patent Application No. 2009801039650, dated Oct. 29, 2014 (6 pages) including English translation.
Second Office Action for Chinese Patent Application No. 200980131774.5, dated Jan. 24, 2014 (12 pages) including English translation.
Second Office Action for Chinese Patent Application No. 201080037254.0, dated Nov. 15, 2014 (15 pages) with English translation.
Second Office Action for Chinese Patent Application No. 201210180467.X, dated Nov. 2, 2014 (7 pages) with English translation.
Second Office Action for Chinese Patent Application No. 201210181182.8, dated Dec. 9, 2014 (6 pages) with English translation.
Second Office Action for Chinese Patent Application No. 201510507854.3 dated Feb. 13, 2017 (8 pages) with English translation.
Second Office Action for Chinese Patent Application No. 201510828027.4 dated Sep. 11, 2017 (15 pages) with English Translation.
Second Office Action for Chinese Patent Application No. 201510896382.5 dated Nov. 29, 2017 (14 pages) with English translation.
Second Office Action for Japanese Patent Application No. 2010-545266, dated May 15, 2015 (10 pages) with English Translation.
Second Office Action for Mexican Patent Application No. MX/a/2011/000965, dated Nov. 6, 2014 (2 pages).
"Second Office Action," for Chinese Patent Application No. 201710616416.X dated Sep. 27, 2019 (11 pages) with English Translation.
"Technical Examination Report," for Brazilian Patent Application No. 1120120185209 dated Jan. 29, 2019 (2 pages) English Translation Only.
"Technical Examination Report," for Brazilian Patent Application No. PI 0907653-0 dated Dec. 11, 2018 (6 pages) English Translation only.
Third Non Final Office Action for Chinese Patent Application No. 201180011588.5, dated Jun. 15, 2015 (7 pages) with English translation.
Third Office Action for Chinese Patent Application No. 200980131774.5, dated Jan. 16, 2015 (15 pages) with English translation.
Third Office Action for Chinese Patent Application No. 201210180467.X, dated Jul. 6, 2015 (8 pages) with English translation.
Third Office Action for Mexican Patent Application No. MX/a/2011/000965, dated Apr. 27, 2014 (2 pages).
"Third Office Action," for Chinese Patent Application No. 201510896382.5 dated Jul. 12, 2018 (20 pages) with English translation.
Translation of Final Rejection for Japanese Patent Application No. 2011520223, dated Sep. 2, 2014, 2 pages.
Translation of Mexican Office Action Received, Mexican Application No. MX/a/2009/008242, dated Jun. 8, 2012, 1 page.
Translation of Office Action for Mexican Application No. MX/a/2010/008530, dated Jul. 10, 2014 (3 pages).
Translation of Office Action for Mexican Patent Application No. MX/2010/008530, dated Jan. 30, 2015 (3 pages).
Translation of Office Action for Mexican Patent Application No. MX/a/2010/008530, dated Dec. 3, 2013 (2 pages).
Translation of Office Action for Mexico Application No. MX/a/2010/008530, dated May 28, 2013 (3 pages).
Translation of Office Action for Mexico Patent Application No. MX/a/2011/000965, dated Apr. 28, 2015 (2 pages).
Translation of Office Action from Mexican Application No. MX/a/2009/014134 Kpdsd dated Apr. 19, 2012 (3 pages).
Type 101 Automatic Corrugator, Solent Technology Deep Pleating Equipment http://www.solentech.com/html/101_info.html Dec. 23, 2009, 1 page.
Type 102 Computerized Pleating System, Solent Technology Deep Pleating Equipment http://www.solentech.com/html/102_info.html Dec. 23, 2009, 1 page.
Type 103 Box Pleater, Solent Technology Deep Pleating Equipment http://www.solentech.com/html/103_info.html Dec. 23, 2009, 1 page.
Type 104 Blade Pleater, Solent Technology Deep Pleating Equipment http://www.solentech.com/html/104_info.html Dec. 23, 2009, 1 page.
Type 106 Dedicated Pleating System, Solent Technology Deep Pleating Equipment http://www.solentech.com/html/106_info.html Dec. 23, 2009, 1 page.
Type 202 Computerized Pleating System, Solent Technology Deep Pleating Equipment http://www.solentech.com/html/202_info.html Dec. 23, 2009, 1 page.
Final Office Action for U.S. Appl. No. 16/113,807 dated Oct. 9, 2020 (17 pages).
Notice of Allowance for U.S. Appl. No. 15/859,021 dated Nov. 4, 2020 (9 pages).

(56) References Cited

OTHER PUBLICATIONS

Response to Non Final Office Action for U.S. Appl. No. 15/859,021, filed Sep. 2, 2020 (6 pages).
"Constant," "Uniform," Excerpts from Random House Unabridged Dictionary regarding the terms "constant"/"uniform," Random House Unabridged Dictionary, second Edition, 1993 (3 pages).
"Formed by," Excerpts from Random House Unabridged Dictionary regarding the terms "formed by," emphasis added, Random House Unabridged Dictionary, Second Edition, 1993 (3 pages).
Hutten, Irwin "Strength and Tensile Properties," Testing of Non-woven Filter Media, Handbook of Non-Woven Filter Media, Elsevier Science & Technology Books, Mar. 2007, pp. 267-271 (7 pages).
Muchorski, D. et al., "Tensile properties of paper and paperboard (using constant rate of elongation apparatus)," Revision of TAPPI Standard test method T 494, Jun. 13, 2006 (28 pages).
"Non-Final Office Action," for U.S. Appl. No. 16/113,807 dated Mar. 1, 2021 (20 pages).
"Response to Final Office Action," for U.S. Appl. No. 16/113,807, filed Feb. 9, 2021 (11 pages).
"Summons to attend oral proceedings pursuant to Rule 115(1) EPC," for EP Opposition Application No. 11703321.1 dated Dec. 22, 2020 (7 pages).

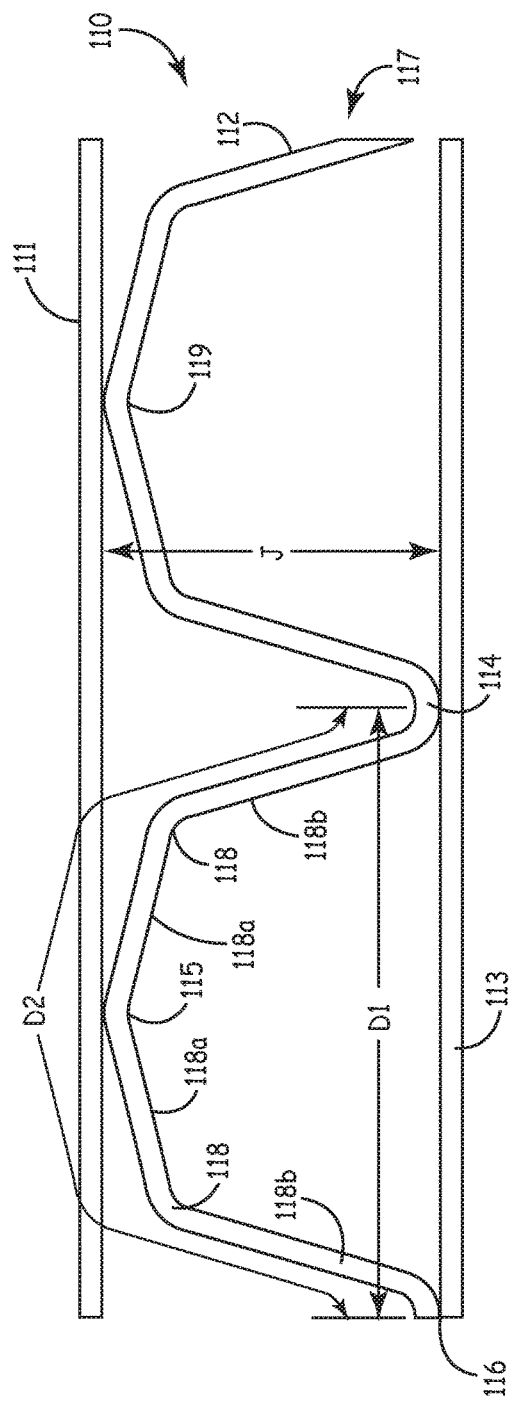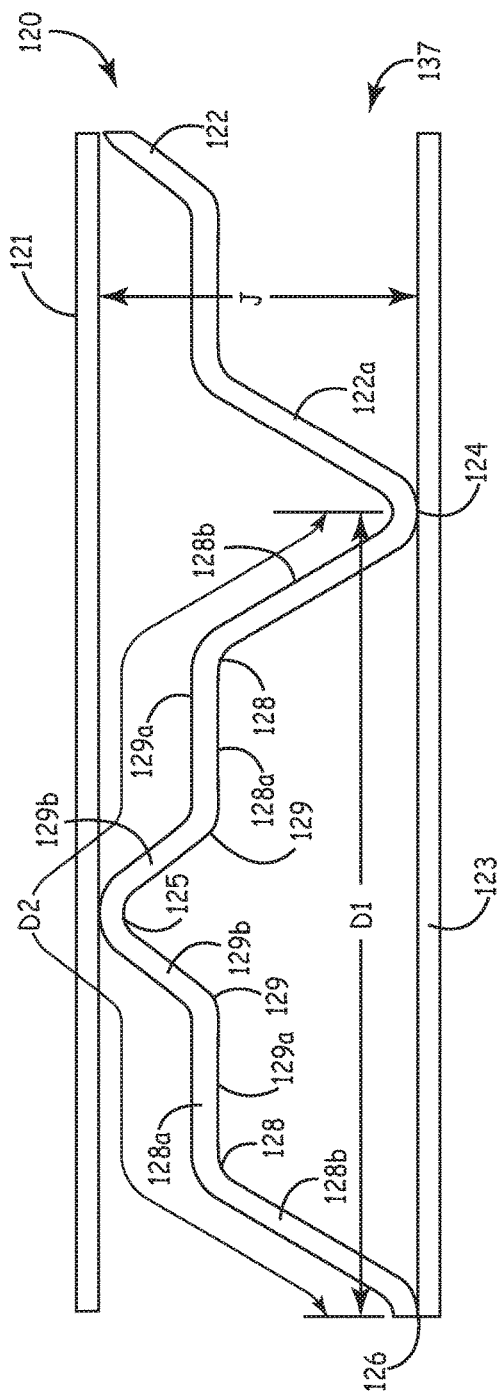

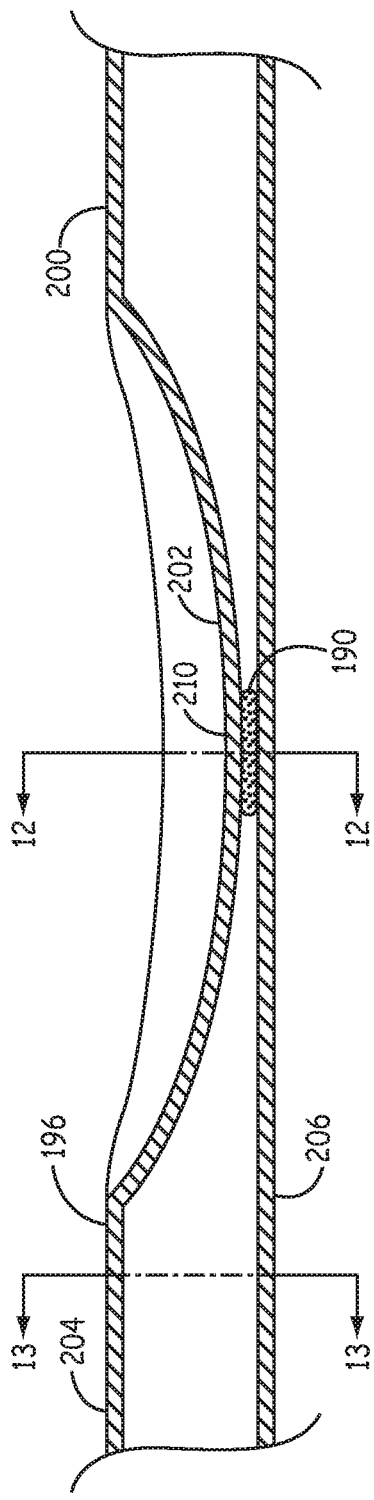
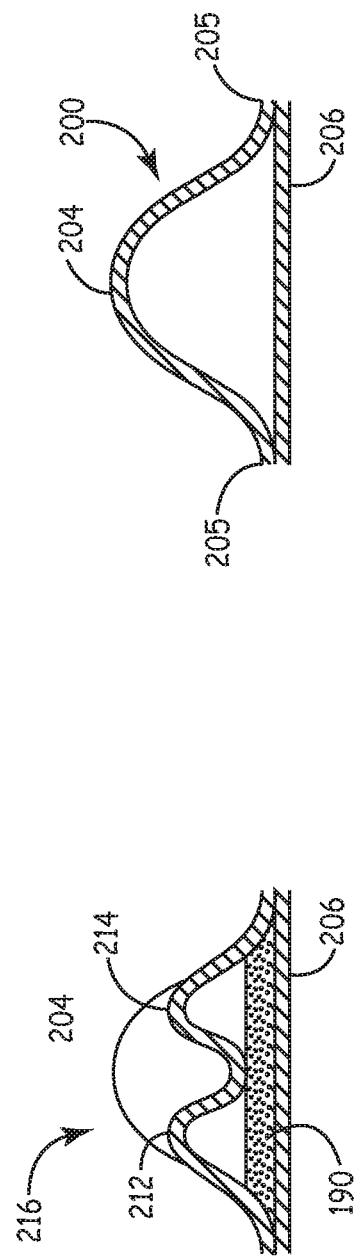

FILTRATION MEDIA PACK, FILTER ELEMENT, AND METHODS

CROSS REFERENCE TO RELATED APPLICATIONS

This application is a continuation of U.S. application Ser. No. 15/221,824, filed Jul. 28, 2016, which is a continuation of U.S. application Ser. No. 14/040,929, filed Sep. 30, 2013, now U.S. Pat. No. 9,433,884, issued Sep. 6, 2016, which is a continuation of U.S. application Ser. No. 12/215,718, filed Jun. 26, 2008, now U.S. Pat. No. 8,545,589, issued Oct. 1, 2013, which claims the benefit of U.S. Provisional Application No. 60/937,162, filed Jun. 26, 2007, the contents of which are herein incorporated by reference.

FIELD OF THE INVENTION

The present invention relates to a filtration media pack and a filter element that can be used to filter a fluid. The invention is additionally directed to methods for manufacturing and using a filtration media pack.

BACKGROUND

Fluid streams, such as air and liquid, carry contaminant material therein. In many instances, it is desired to filter some or all of the contaminant materials from the fluid stream. For example, air flow streams to engines for motorized vehicles or for power generation equipment, gas streams to gas turbine systems, and air streams to various combustion furnaces, carry particulate contaminants therein that should be filtered. Also liquid streams in engine lube systems, hydraulic systems, coolant systems or fuel systems, can carry contaminants that should be filtered. It is preferred for such systems, that selected contaminant material be removed from (or have its level reduced in) the fluid. A variety of fluid filter (air or liquid filter) arrangements have been developed for contaminant reduction. In general, however, continued improvements are sought.

Z-media generally refers to a type of fluted filtering media element where a fluid enters flutes on a first face of the media element and exits from flutes at a second face of the media element. In general, the faces on z-media are provided on opposite ends of the media. The fluid enters through open flutes on one face and exits through open flutes on the other face. At some point between the first face and the second face, the fluid passes from one flute to another flute to provide for filtration.

Early forms of z-media were often referred to as corrugated media because the characterization of the media was adopted from the corrugated box board industry. Corrugated box boards, however, were generally designed for carrying a load. Accordingly, flute designs can be modified away from the standards and sizes from the corrugated box board industry to provide improved filtration media performance.

Various disclosures have been provided for modifying the form of the flutes in z-media. For example, U.S. Pat. No. 5,562,825 describes corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In U.S. Pat. No. 5,049,326 to Matsumoto et al., circular (in cross-section) or tubular flutes defined by one sheet having half tubes attached to another sheet having half tubes, with flat regions between the resulting parallel, straight, flutes are shown. See FIG. 2 of U.S. Pat. No. 5,049,326. U.S. Pat. No. 4,925,561 to Ishii et al. (FIG. 1) shows flutes folded to have a rectangular cross section, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

SUMMARY

A filtration media pack is provided according to the present invention. The filtration media pack includes a plurality of layers of single facer media. A layer of single facer media comprises a fluted sheet, a facing sheet, and a plurality of flutes extending between the fluted sheet and the facing sheet and having a flute length extending from a first face of the filtration media pack to a second face of the filtration media pack. The filtration media pack includes a first portion of flutes that are closed to unfiltered fluid flowing into the first portion of the flutes and a second portion of flutes that are closed to unfiltered fluid flowing out of the second portion of the flutes so that fluid passing into one of the first face or the second face of the media pack and out the other of the first face or the second face of the media pack passes through media to provide filtration of the fluid. The filtration media pack can be characterized as a z-media pack, if desired, and can be provided having inlet flutes and outlet flutes so that unfiltered fluid flows into the media pack via the inlet flutes and out of the media pack via the outlet flutes. It should be understood, however, that the flutes of the media pack need not be characterized as inlet flutes and outlet flutes.

The performance of the filtration media pack can be altered or modified by selecting from several design criteria. The term "performance" generally refers to at least one of increased longevity, increased loading capacity, decreased pressure drop, increased flow, decreased size or volume, etc. For example, the filtration media pack can be designed for a particular application to provide enhanced performance compared with certain presently available z-media packs. Enhancing performance can result from, for example, controlling one or more of masking, flute width height ratio, flute length, flute density, flute shape, reducing plug length, flute taper, and flute volume asymmetry. Any of these techniques can be used alone or in combination to provide a filtration media pack having desired properties.

The Applicants have found that the extent of performance improvement of a filtration media pack increases as additional design characteristics of the media pack are controlled. For example, the performance of a media pack can be improved relative to a standard media pack from, for example, standard B flute media, by adjusting a single design criteria such as masking, flute width height ratio, flute length, flute density, flute shape, plug length, flute taper, and flute volume asymmetry. In addition, the Applicants have found that enhanced performance can be provided as a result of controlling an additional design criteria.

In an embodiment, the filtration media pack can be controlled to have a plurality of flutes having an average flute length of less than 5 inches, and can be controlled so that the filtration media pack exhibits a flute density ($\rho$) of at least 35.0 flute/inch$^2$ according to the formula:

$$\rho = \frac{\text{number of channels (open and closed)}}{2 \times z\text{-media pack cross sectional area}}$$

wherein the number of channels is counted and the media cross sectional area is measured. In addition, the filtration media pack can exhibit at least one of:

(i) at least one of the first portion of the plurality of flutes or the second portion of the plurality of flutes are closed as a result of plugs having an average plug length of less than 7 mm;

(ii) a flute width height ratio of greater than 2.5; or (iii) a flute width height ration of less than 0.4.

In an alternative embodiment of the filtration media pack, the filtration media pack can be provided exhibiting a flute density of at least 35.0 flute/inch$^2$, and can have an asymmetric volume arrangement so that a volume on one side of the media pack is greater than a volume on another side of the media pack by at least 10%.

In another alternative arrangement for the filtration media pack, the filtration media pack can have an average flute length of greater than about 4 inches, a flute width height ratio of greater than to 2.5 or less than 0.4, and an asymmetric volume arrangement so that the volume on one side of the media pack is greater than a volume on the other side of the media pack by at least 10%.

In another alternative filtration media pack according to the present invention, the filtration media pack can have an average flute length of greater than about 8 inches, a flute width height ratio of greater than 2.5 or a flute width height ratio of less than 0.4, and a non-asymmetric volume arrangement so that a volume on one side of the media pack is not greater than the volume on the other side of the media pack by, more than at least 100%.

The performance the filtration media pack can be improved by controlling the shape of the flutes. For example, the fluted media can have a single ridge extending along at least a portion of the flute between adjacent peaks. This flute shape can be referred to as "low contact." The fluted sheet can include two ridges extending along at least a portion of the length of the flute between adjacent peaks. This shape of the flute can be referred to as "zero strain" or "Y" shaped. The fluted sheet can be constructed to provide a repeating pattern of one, two, or more ridges extending along at least 50% of the fluted length between an internal peak and an external peak. The repeating pattern can be provided between all adjacent peaks or between some repeating pattern that is less than all repeating peaks such as between every other repeating peak, between every third repeating peak, between every fourth repeating peak, etc. Portions of the fluted media need not include ridges extending between adjacent peaks.

Filter elements can be provided that includes the filtration media pack. The filter element includes a seal member extending around a periphery of the media pack. The seal member can include a seal surface constructed to engage a housing surface in a radially extending direction to provide a seal. Alternatively, the seal member can include a seal surface constructed to engage a housing surface in an axially extending direction to provide a seal. The seal member can be attached directly to the media pack or attached indirectly (via another structure such as a seal support) to the media pack Methods for manufacturing a filtration media pack are provided. The method can include stacking or rolling a plurality of layers of single facer media to form the filtration media pack.

Methods for filtering a fluid are provided. The method can include feeding a fluid to one of a first face or a second face of a filtration media pack, and recovering fluid from the other of the first face or the second face of the filtration media pack.

The fluid that can be filtered by the filtration media pack includes gaseous substances and liquid substances. Exemplary gaseous substances that can be filtered includes air. Exemplary liquid substances that can be filtered include water, oil, fuel, and hydraulic fluid.

BRIEF DESCRIPTION OF THE DRAWINGS

FIGS. 5A-C are enlarged schematic, cross-sectional views of a portion of media according to the present invention.

FIG. 11 is a cross-sectional view of a flute after contact with an inverter wheel and before contact with a folder wheel for closure of the flute.

FIG. 12 is a cross-sectional view of a flute taken along line 12-12 of FIG. 11.

FIG. 13 is a cross-sectional view of a flute taken along line 13-13 of FIG. 11.

DETAILED DESCRIPTION

Fluted Filtration Media

Figure 1:
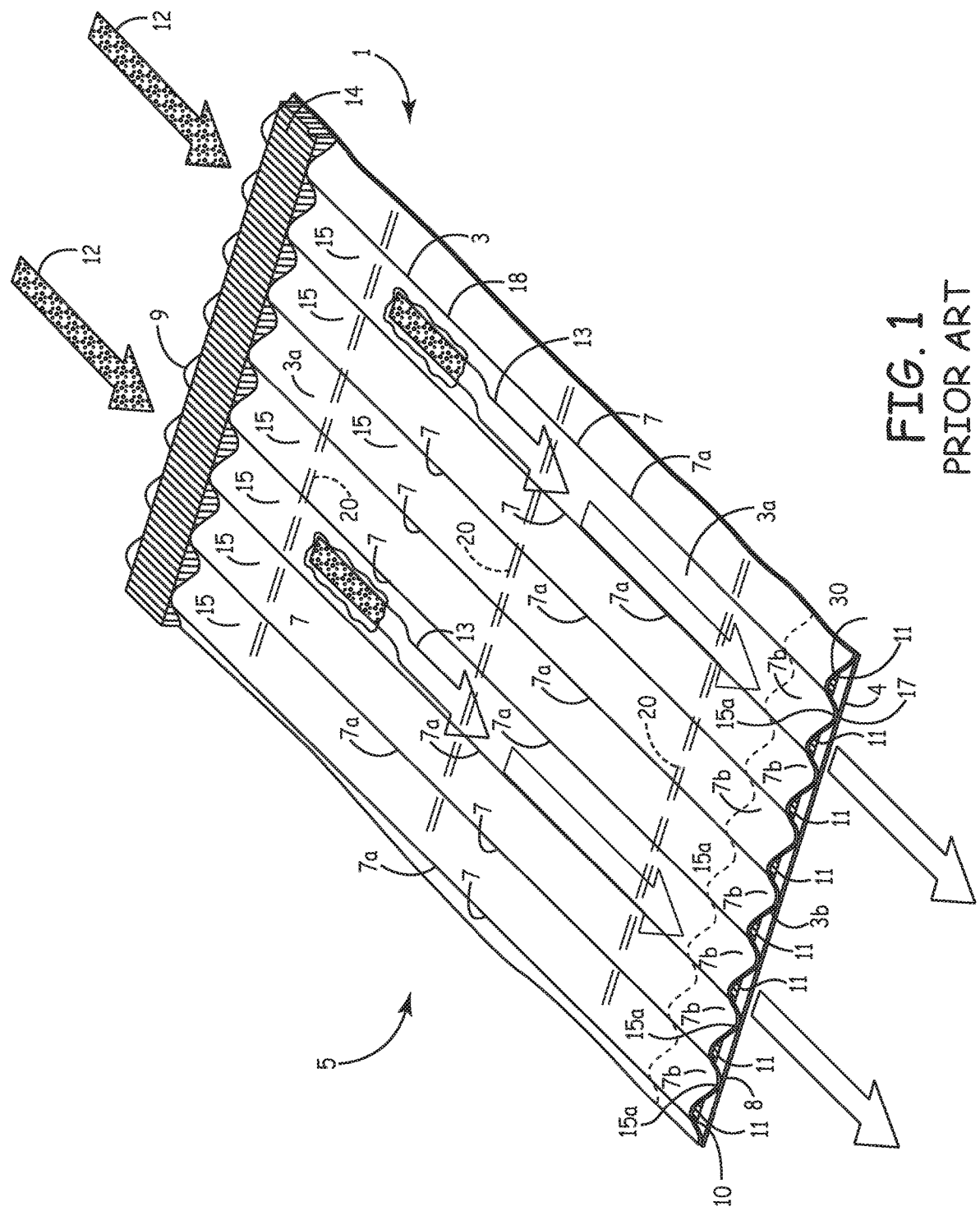
FIG. 1 is a fragmentary, schematic, perspective view of an exemplary z-filtration media according to the prior art.

Fluted filtration media can be used to provide fluid filter constructions in a variety of manners. One well known manner is as a z-filter construction. The terms "z-filter construction" or "z-filter media" as used herein, is meant to refer to a filter element construction in which individual ones of corrugated, folded, pleated, or otherwise formed filter flutes are used to define longitudinal filter flutes for fluid flow through the media; the fluid flowing along the flutes between inlet and outlet flow ends (or flow faces) of the filter element. Some examples of z-filter media filter elements are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

The fluid that can be filtered by the filtration media pack includes gaseous substance and liquid substances. Exemplary gaseous substances that can be filtered includes air. Exemplary liquid substances that can be filtered include water, oil, fuel, and hydraulic fluid. A preferred type of fluid to be filtered by the filtration media pack includes air. In general, much of the discussion is directed at filtering air. It should be understood, however, that the filtration media pack can be used to filter other gaseous substances and other liquid substances.

One type of z-filter media utilizes two media components joined together to form the media construction. The two components are: (1) a fluted (for example, corrugated) media sheet; and, (2) a facing media sheet. The facing media sheet is typically non-corrugated, however it can be corrugated, for example perpendicularly to the flute direction as described in International Publication No. WO 2005/077487, published Aug. 25, 2005, incorporated herein by reference. Alternatively, the facing sheet can be a fluted (for example, corrugated) media sheet and the flutes or corrugations may be aligned with or at angles to the fluted media sheet. Although the facing media sheet can be fluted or corrugated, it can be provided in a form that is not fluted or corrugated. Such a form can include a flat sheet. When the facing media sheet is not fluted, it can be referred to as a non-fluted media sheet or as a non-fluted sheet.

The type of z-filter media that utilizes two media components joined together to form the media construction wherein the two components are a fluted media sheet and a facing media sheet can be referred to as a "single facer media" or as a "single faced media." In certain z-filter media arrangements, the single facer media (the fluted media sheet and the facing media sheet), together, can be used to define media having parallel inlet and outlet flutes. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is described in FIG. 11 of U.S. Pat. No. 5,820,646, incorporated herein by reference. In general, arrangements where the z-filter media is coiled can be referred to as coiled arrangements, and arrangements where the z-filter media is stacked can be referred to as stacked arrangements. Filter elements can be provided having coiled arrangements or stacked arrangements.

Typically, coiling of the fluted sheet/facing sheet combination (e.g., the single facer media) around itself, to create a coiled media pack, is conducted with the facing sheet directed outwardly. Some techniques for coiling are described in International Publication No. WO 2004/082795, published Sep. 30, 2004, incorporated herein by reference. The resulting coiled arrangement generally has, as the outer surface of the media pack, a portion of the facing sheet, as a result. If desired, the single facer media can be coiled so that the fluted sheet forms the outer surface of the media pack.

The term "corrugated" used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example, formed by corrugating or folding or pleating) extending thereacross. Fluted media can be prepared by any technique that provides the desired flute shapes. While corrugating can be a useful technique for forming flutes having a particular size. When it is desirable to increase the height of the flutes (the height is the elevation between peaks), corrugating techniques might not be practical and it may be desirable to fold or pleat the media. In general, pleating of media can be provided as a result of folding the media. In general, forming flutes by pleating can be referred to as micropleating. An exemplary technique for folding the media to provide pleats includes scoring and using pressure to create the fold.

Filter element or filter cartridge configurations utilizing z-filter media are sometimes referred to as "straight through flow configurations" or by variants thereof. In general, in this context what is meant is that the serviceable filter elements generally have an inlet flow end (or face) and an exit flow end (or face), with flow entering and exiting the filter cartridge in generally the same straight through direction. The term "straight through flow configuration" disregards, for this definition, air flow that passes out of the media pack through the outermost wrap of facing media. In some instances, each of the inlet flow end and outlet flow end can be generally flat or planar, with the two parallel to one another. However, variations from this, for example non-planar faces, are possible in some applications. Furthermore, the characterization of an inlet flow face and an opposite exit flow face is not a requirement that the inlet flow face and the outlet flow face are parallel. The inlet flow face and the exit flow face can, if desired, be provided as parallel to each other. Alternatively, the inlet flow face and the outlet flow face can be provided at an angle relative to each other so that the faces are not parallel. In addition, non-planar faces can be considered non-parallel faces.

A straight through flow configuration is, for example, in contrast to cylindrical pleated filter cartridges of the type shown in U.S. Pat. No. 6,039,778, in which the flow generally makes a substantial turn as its passes through the serviceable cartridge. That is, in a U.S. Pat. No. 6,039,778 filter, the flow enters the cylindrical filter cartridge through a cylindrical side, and then turns to exit through an end face in a forward-flow system. In a reverse-flow system, the flow enters the serviceable cylindrical cartridge through an end face and then turns to exit through a side of the cylindrical filter cartridge. An example of such a reverse-flow system is shown in U.S. Pat. No. 5,613,992.

The filter element or filter cartridge can be referred to as a serviceable filter element or filter cartridge. The term "serviceable" in this context is meant to refer to a media containing filter cartridge that is periodically removed and replaced from a corresponding air cleaner. An air cleaner that includes a serviceable filter element or filter cartridge is constructed to provide for the removal and replacement of the filter element or filter cartridge. In general, the air cleaner can include a housing and an access cover wherein the access cover provides for the removal of a spent filter element and the insertion of a new or cleaned (reconditioned) filter element.

The term "z-filter media construction" and variants thereof as used herein, without more, is meant to refer to any or all of: a single facer media containing a fluted media sheet and a facing media sheet with appropriate closure to inhibit air flow from one flow face to another without filtering passage through the filter media; and/or, a single facer media that is coiled or stacked or otherwise constructed or formed into a three dimensional network of flutes; and/or, a filter construction including a single facer media; and/or, a fluted media constructed or formed (e.g., by folding or pleating) into a three dimensional network of flutes. In general, it is desirable to provide an appropriate flute closure arrangement to inhibit unfiltered air that flows in one side (or face) of the media from flowing out the other side (or face) of the media as part of the filtered air stream leaving the media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example U.S. 2006/0091084 A1, published May 4, 2006 to Baldwin Filters, Inc. also comprising flutes extending between opposite flow faces, with a seal arrangement to prevent flow of unfiltered air through the media pack. In many z-filter constructions according to the invention, adhesive or sealant can be used to close the flutes and provide an appropriate seal arrangement to inhibit unfiltered air from flowing from one side of the media to the other side of the media. Plugs, folds of media, or a crushing of the media can be used as techniques to provide closure of flutes to inhibit the flow of unfiltered air from one side of the media (face) to the other side of the media (face).

An alternative z-filter construction can be provided utilizing a fluted media sheet. For example, the fluted media sheet can be folded to create closures at the inlet flow face and the exit flow face. An example of this type of arrangement can be seen in, for example, U.S. 2006/0151383 to AAF-McQuay Inc. and WO 2006/132717 to Fleetguard, Inc., that describe fluted media having folds or bends perpendicular to the flute direction to seal the ends of the flutes.

Referring to FIG. 1, an exemplary type of media 1 useable as z-filter media is shown. Although the media 1 is representative of prior art media, many of the terms relied upon for describing the media 1 can also describe portions of the media according to the invention. The media 1 is formed from a fluted (in the example corrugated) sheet 3 and a facing sheet 4. In general, the fluted corrugated sheet 3 is of a type generally characterized herein as having a regular, curved, wave pattern of flutes or corrugations 7. The term "wave pattern" in this context, is meant to refer to a flute or corrugated pattern of alternating troughs 7b and hills 7a. The term "regular" in this context is meant to refer to the fact that the pairs of troughs and hills (7b, 7a) alternate with generally the same repeating corrugation (or flute) shape and size. (Also, typically in a regular configuration each trough 7b is substantially an inverse of each hill 7a.) The term "regular" is thus meant to indicate that the corrugation (or flute) pattern comprises troughs and hills with each pair (comprising an adjacent trough and hill) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet forming the fluted sheet 3 is flexible. With respect to the characterization of a repeating pattern, it is not meant that in any given filter construction, an equal number of hills and troughs is necessarily present. The media 1 could be terminated, for example, between a pair comprising a hill and a trough, or partially along a pair comprising a hill and a trough. (For example, in FIG. 1 the media 2 depicted in fragmentary has eight complete hills 7a and seven complete troughs 7b.) Also, the opposite flute ends (ends of the troughs and hills) may vary from one another. Such variations in ends are disregarded in these definitions, unless specifically stated. That is, variations in the ends of flutes are intended to be covered by the above definitions.

In the context of fluted filtration media, and in particular the exemplary media 1, the troughs 7b and hills 7a can be characterized as peaks. That is, the highest point of the hills 7a can be characterized as peaks and the lowest points of the troughs 7b can be characterized as peaks. The combination of the fluted sheet 3 and the facing sheet 4 can be referred to as the single facer media 5. The peaks formed at the troughs 7b can be referred to as internal peaks because they face toward the facing sheet 3 of the single facer media 5. The peaks formed at the hills 7a can be characterized as external peaks because they face away from the facing sheet 3 forming the single facer media 5. For the single facer media 5, the fluted sheet 3 includes repeating internal peaks at 7b that face toward the facing sheet 4, and repeating external peaks at 7a that face away from the facing sheet 4.

The term "regular" when used to characterize a flute pattern is not intended to characterize media that can be considered "tapered." In general, a taper refers to a reduction or an increase in the size of the flute along a length of the flute. In general, filtration media that is tapered can exhibit a first set of flutes that decrease in size from a first end of the media to a second end of the media, and a second set of flutes that increase in size from the first end of the media to the second end of the media. In general, a tapered pattern is not considered a regular pattern. It should be understood, however, that z-media can contain regions that are considered regular and regions that are considered non-regular along the flute length. For example, a first set of flutes may be considered regular along a distance of the flute length, such as, one quarter the distance to three quarters the distance, and then for the remaining amount of the flute length can be considered non-regular as a result of the presence of a taper. Another possible flute configuration is to have a tapered-regular-tapered arrangement where, for example, a flute tapers from a first face to a pre-selected location, the flute then can be considered regular until a second pre-determined location, and then the flute tapers to the second face. Another alternative arrangement can be provided as a regular-taper-regular arrangement, or as a regular-taper arrangement. Various alternative arrangements can be constructed as desired.

In the context of z-media, there are generally two types of "asymmetry." One type of asymmetry is referred to as area asymmetry, and the other type of asymmetry is referred to volume asymmetry. In general, area asymmetry refers to an asymmetry in flute cross-sectional area, and can be exhibited by tapered flutes. For example, area asymmetry exists if a fluted area at one location along the length of a flute is different from the fluted area at another location along the length of the flute. Because tapered flutes exhibit a decrease in size from a first location (e.g., end) to a second location (e.g., end) of the media pack or an increase in size from a first location (e.g., end) to a second location (e.g., end) of the media pack, there is an area asymmetry. This asymmetry (area asymmetry) is a type of asymmetry resulting from tapering and, as a result, media having this type of asymmetry can be referred to as non-regular. Another type of asymmetry can be referred to as volumetric asymmetry and will be explained in more detail. Volumetric asymmetry refers to a difference between a dirty side volume and a clean side volume within the filter media pack. Media exhibiting volume asymmetry can be characterized as regular if the wave pattern is regular, and the media can be characterized as non-regular if the wave pattern is non-regular.

Z-media can be provided where at least a portion of the flutes are closed to the passage of unfiltered air by a technique other than providing a plug of adhesive or sealant. For example, the ends of flutes can be folded or crushed to provide a closure. One technique for providing a regular and consistent fold pattern for closing flutes can be referred to as darting. Darted flutes or darting generally refers to the closure of a flute wherein the closure occurs by folding the flute to create a regular fold pattern to collapse the flutes toward the facing sheet to provide a closure rather than by crushing. Darting generally implies a systematic approach to closing the ends of flutes as a result of folding portions of the flute so that the flute closures are generally consistent and controlled. For example, U.S. Patent Publication No. US 2006/0163150 A1 discloses flutes having a darted configuration at the ends of the flutes. The darted configuration can provide advantages including, for example, a reduction in the amount of sealant needed to provide a seal, an increased security in the effectiveness of the seal, and a desirable flow pattern over the darted end of the flutes. Z-media can include flutes having darted ends, and the entire disclosure of U.S. Patent Publication No. US 2006/0163150 A1 is incorporated herein by reference. It should be understood that the existence of darts at the ends of flutes does not render the media non-regular.

In the context of the characterization of a "curved" wave pattern, the term "curved" is meant to refer to a pattern that is not the result of a folded or creased shape provided to the media, but rather the apex of each hill 7a and the bottom of each trough 7b is formed along a radiused curve. Although alternatives are possible, a typical radius for such z-filter media would be at least 0.25 mm and typically would be not more than 3 mm. Media that is not curved, by the above definition, can also be useable. For example, it can be desirable to provide peaks having a radius that is sufficiently sharp so that it is not considered "curved." In general, if the radius is less than 0.25 mm, or less than 0.20 mm, the ridge or bottom can be characterized as bent, folded, or creased. In order to reduce masking, it can be desirable to provide a peak with a knife edge. The ability to provide a knife edge at the peak can be limited by the equipment used to form the media, the media itself, and the conditions under which the media is subjected. For example, it is desirable to not cut or tear the media. Accordingly, using a knife edge to create the peak can be undesirable if the knife edge causes a cut or tear in the media. Furthermore, the media can be too light or too heavy to provide a sufficiently non-curved peak without cutting or tearing. Furthermore, the humidity of the air during processing can be enhanced to help create a tighter radius when forming the peak.

An additional characteristic of the particular regular, curved, wave pattern depicted in FIG. 1, for the corrugated sheet 3, is that at approximately a midpoint 30 between each trough 7b and each adjacent hill 7a, along most of the length of the flutes 7, is located a transition region where the curvature inverts. For example, viewing back side or face 3a, FIG. 1, trough 7b is a concave region, and hill 7a is a convex region. Of course when viewed toward front side or face 3b, trough 7b of side 3a forms a hill; and, hill 7a of face 3a, forms a trough. In some instances, region 30 can be a straight segment, instead of a point, with curvature inverting at ends of the segment 30. When the region 30 is provided as a straight segment, the wave pattern depicted in FIG. 1, for example, can be characterized as an "arc-straight-arc" wave pattern because of the repeating pattern of curve at the hill 7a, straight segment at the region 30, and curve at the trough 7b.

A characteristic of the particular regular, curved, wave pattern corrugated sheet 3 shown in FIG. 1, is that the individual corrugations are generally straight. By "straight" in this context, it is meant that through at least 50% and preferably at least 70% (typically at least 80%) of the length between edges 8 and 9, the hills 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to FIG. 1 and as referenced above, the media 2 has first and second opposite edges 8 and 9. For the example shown, when the media 2 is coiled and formed into a media pack, in general edge 9 will form an inlet end for the media pack and edge 8 an outlet end, although an opposite orientation is possible in some applications.

In the example shown, adjacent edge 8 is provided sealant, in this instance in the form of a sealant bead 10, sealing the fluted sheet 3 and the facing sheet 4 together. Bead 10 will sometimes be referred to as a "single facer"

bead, since it is a bead between the corrugated sheet 3 and the facing sheet 4, which forms the single facer media 5. Sealant bead 10 seals closed individual flutes 11 adjacent edge 8, to passage of air therefrom.

In the example shown, at adjacent edge 9 is provided sealant, in this instance in the form of a sealant bead 14. Sealant bead 14 generally closes flutes 15 to passage of unfiltered fluid therein, adjacent edge 9. Bead 14 would typically be applied as the media 2 is coiled about itself, with the corrugated sheet 3 directed to the inside. Thus, bead 14 will form a seal between a back side 17 of facing sheet 4, and side 18 of the fluted sheet 3. The bead 14 will sometimes be referred to as a "winding bead" since it is typically applied, as the strip 2 is coiled into a coiled media pack. If the media 2 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, a z-filter media pack can be characterized as comprising fluted filter media secured to facing filter media, and configured in a media pack of flutes extending between first and second flow faces. A sealant or seal arrangement is provided within the media pack, to ensure that air entering flutes at a first upstream flow face or edge cannot exit the media pack from a downstream flow face or edge, without filtering passage through the media. Alternately stated, a z-filter media pack is closed to passage of unfiltered air therethrough, between the inlet flow face and the outlet flow face, typically by a sealant arrangement or other arrangement. An additional alternative characterization of this is that a first portion of the flutes are closed or sealed to prevent unfiltered air from flowing into the first portion of flutes, and a second portion of the flutes are closed or sealed to prevent unfiltered air from flowing out of the second portion of flutes so that air passing into one of the first face or the second face of the media pack and out the other of the first face or the second face of the media pack passes through media to provide filtration of the air.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved," and "wave pattern."

In general, the filter media is a relatively flexible material, typically a non-woven fibrous material (of cellulose fibers, synthetic fibers or both) often including a resin therein, sometimes treated with additional materials. Thus, it can be conformed or configured into the various fluted, for example corrugated, patterns, without unacceptable media damage. Also, it can be readily coiled or otherwise configured for use, again without unacceptable media damage. Of course, it must be of a nature such that it will maintain the required fluted (for example corrugated) configuration, during use.

In the corrugation or fluting process, an inelastic deformation is caused to the media. This prevents the media from returning to its original shape. However, once the tension is released the flutes or corrugations will tend to spring back, recovering only a portion of the stretch and bending that has occurred. The facing sheet is sometimes tacked to the fluted sheet, to inhibit this spring back in the fluted (or corrugated) sheet.

Also, the media can contain a resin. During the corrugation process, the media can be heated to above the glass transition point of the resin. When the resin cools, it will help to maintain the fluted shapes.

The media of the fluted sheet 3, facing sheet 4 or both, can be provided with a fine fiber material on one or both sides thereof, for example in accord with U.S. Pat. Nos. 6,955,775, 6,673,136, and 7,270,693, incorporated herein by reference. In general, fine fiber can be referred to as polymer fine fiber (microfiber and nanofiber) and can be provided on the media to improve filtration performance. As a result of the presence of fine fiber on the media, it may be possible or desirable to provide media having a reduced weight or thickness while obtaining desired filtration properties. Accordingly, the presence of fine fiber on media can provide enhanced filtration properties, provide for the use of thinner media, or both. Fiber characterized as fine fiber can have a diameter of about 0.001 micron to about 10 microns, about 0.005 micron to about 5 microns, or about 0.01 micron to about 0.5 micron. Nanofiber refers to a fiber having a diameter of less than 200 nanometer or 0.2 micron. Microfiber can refer to fiber having a diameter larger than 0.2 micron, but not larger than 10 microns. Exemplary materials that can be used to form the fine fibers include polyvinylidene chloride, polyvinyl alcohol polymers and co-polymers comprising various nylons such as nylon 6, nylon 4,6, nylon 6,6, nylon 6,10, and co-polymers thereof, polyvinyl chloride, PVDC, polystyrene, polyacrylonitrile, PMMA, PVDF, polyamides, and mixtures thereof.

Still referring to FIG. 1, at 20 tack beads are shown positioned between the fluted sheet 3 and facing sheet 4, securing the two together. The tack beads 20 can be for example, discontinuous lines of adhesive. The tack beads can also be points in which the media sheets are welded together.

From the above, it will be apparent that the exemplary fluted sheet 3 depicted is typically not secured continuously to the facing sheet, along the troughs or hills where the two adjoin. Thus, air can flow between adjacent inlet flutes, and alternately between the adjacent outlet flutes, without passage through the media. However, unfiltered air which has entered a flute through the inlet flow face cannot exit from a flute through the outlet flow face without passing through at least one sheet of media, with filtering.

Figure 2:
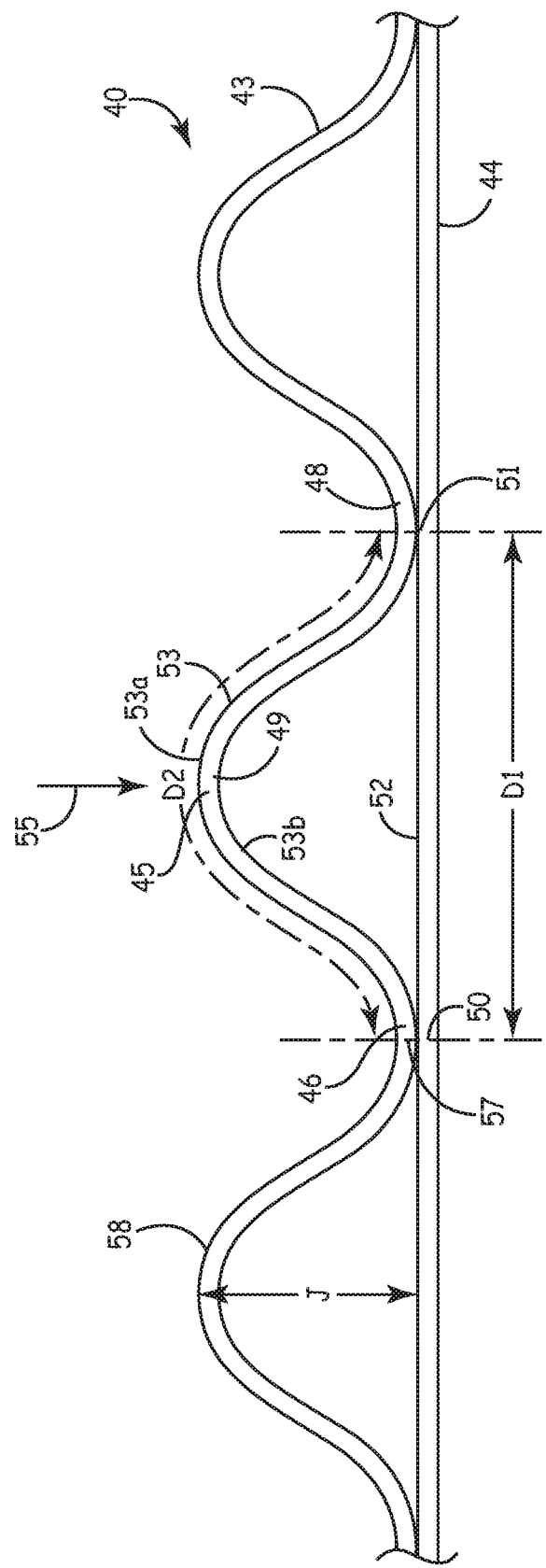
FIG. 2 is an enlarged schematic, cross-sectional view of a portion of the prior art media depicted in FIG. 1.
Figure 3A:
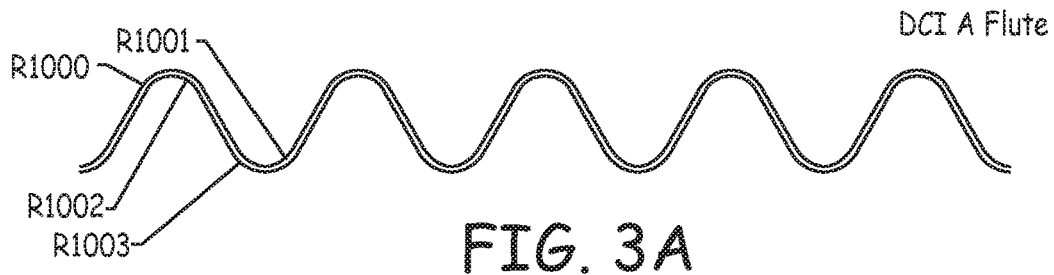
FIGS. 3A-3G are schematic views of various corrugated media definitions.
Figure 3B:
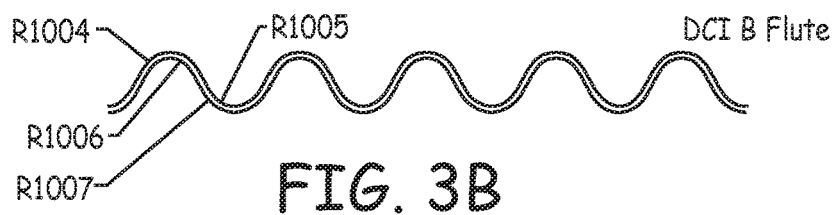
Figure 3C:
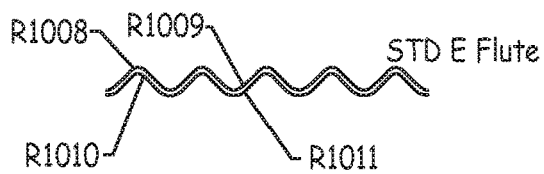
Figure 3D:
Figure 3E:
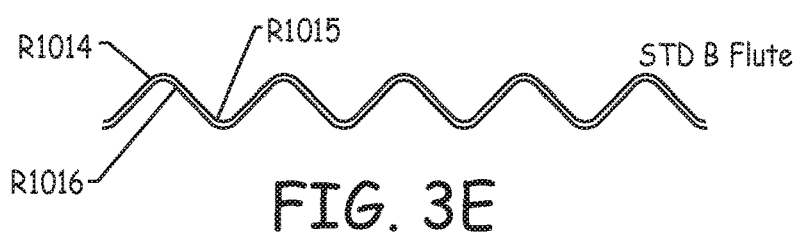
Figure 3F:
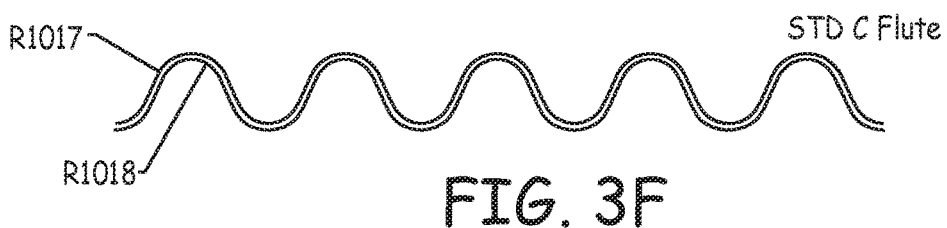
Figure 3G:
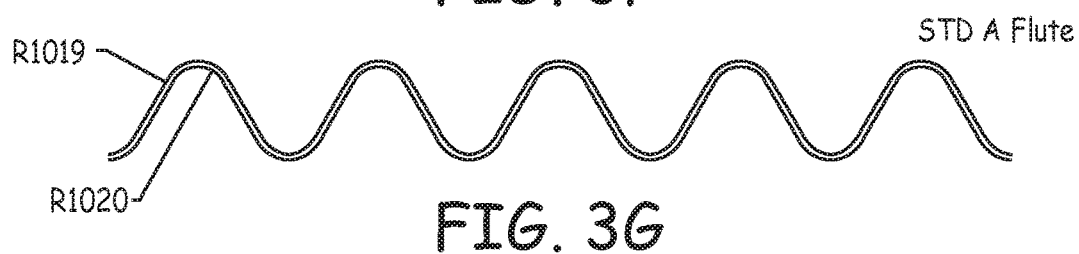

Attention is now directed to FIG. 2, in which a z-filter media construction 40 utilizing a fluted (in this instance regular, curved, wave pattern) sheet 43, and a non-corrugated flat, facing sheet 44, is depicted. The distance D1, between points 50 and 51, defines the extension of flat media 44 in region 52 underneath a given flute 53. The points 50 and 51 are provided as the center point of the internal peaks 46 and 48 of the fluted sheet 43. In addition, the point 45 can be characterized as the center point of the external peak 49 of the fluted sheet 43. The distance D1 defines the period length or interval of the media construction 40. The length D2 defines the arcuate media length for the flute 53, over the same distance D1, and is of course larger than D1 due to the shape of the flute 53. For a typical regular shaped media used in fluted filter applications according to the prior art, the ratio of the lengths D2 to D1 is typically within a range of 1.2-2.0, inclusive. An exemplary arrangement common for air filters has a configuration in which D2 is about 1.25×D1 to about 1.35×D1. Such media has, for example, been used commercially in Donaldson Powercore™ Z-filter arrangements having a regular, curved, wave pattern. Herein the ratio D2/D1 will sometimes be characterized as the flute/flat ratio or the media draw for the media.

The flute height J is the distance from the facing sheet 44 to the highest point of the fluted sheet 43. Alternatively stated, the flute height J is the difference in exterior elevation between alternating peaks 57 and 58 of the fluted sheet 43. The flute height J takes into account the thickness of the fluted sheet 43. The peak 57 can be referred to as the internal peak (the peak directed toward the facing sheet 44), and the peak 58 can be referred to as the external peak (the peak directed away from the facing sheet 44). Although the distances D1, D2, and J are applied to the specific fluted media arrangement shown in FIG. 2, these distances can be applied to other configurations of fluted media where D1 refers to the period length of a flute or the distance of flat media underneath a given flute, D2 refers to the length of fluted media from lower peak to lower peak, and J refers to the flute height.

Another measurement can be referred to as the cord length (CL). The cord length refers to the straight line distance from the center point 50 of the lower peak 57 and the center point 45 of the upper peak 58. The thickness of the media and the decision where to begin or end a particular distance measurement can affect the distance value because the media thickness affects the distance value. For example, the cord length (CL) can have different values depending upon whether the distance is measured from the bottom of the internal peak to the bottom of the external peak or whether it is measured from the bottom of the internal peak to the top of the external peak. This difference in distance is an example of how the media thickness effects the distance measurement. In order to minimize the effect of the thickness of the media, the measurement for cord length is determined from a center point within the media. The relationship between the cord length CL and the media length D2 can be characterized as a media-cord percentage. The media-cord percentage can be determined according to the following formula:

$$\text{media-cord percentage} = \frac{(1/2D2 - CL) \times 100}{CL}$$

In the corrugated cardboard industry, various standard flutes have been defined. These include, for example, the standard E flute, standard X flute, standard B flute, standard C flute, and standard A flute. FIGS. 3A-3G, attached, in combination with Table 1 below provides definitions of these flutes.

Donaldson Company, Inc., (DCI) the assignee of the present disclosure, has used variations of the standard A and standard B flutes, in a variety of z-filter arrangements. The DCI standard B flute can have a media-cord percentage of about 3.6%. The DCI standard A flute can have a media-cord percentage of about 6.3. Various flutes are also defined in Table 1 and FIGS. 3A-G. FIG. 2 shows a z-filter media construction 40 utilizing the standard B flute as the fluted sheet 43.

TABLE 1

(Flute definitions for FIGS. 3A-3G)

| | |
|---|---|
| DCI A Flute: | Flute/flat = 1.52:1; The Radii (R) are as follows: |
| | R1000 = .0675 inch (1.715 mm): |

TABLE 1-continued (Flute definitions for FIGS. 3A-3G)

| | |
|---|---|
| | R1001 = .0581 inch (1.476 mm); |
| | R1002 = .0575 inch (1.461 mm); |
| | R1003 = .0681 inch (1.730 mm); |
| DCI B Flute: | Flute/flat = 1.32:1; The Radii (R) are as follows: |
| | R1004 = .0600 inch (1.524 mm): |
| | R1005 = .0520 inch (1.321 mm); |
| | R1006 = .0500 inch (1.270 mm); |
| | R1007 = .0620 inch (1.575 mm); |
| Std. E Flute: | Flute/flat = 1.24:1; The Radii (R) are as follows: |
| | R1008 = .0200 inch (.508 mm); |
| | R1009 = .0300 inch (.762 mm); |
| | R1010 = .0100 inch (.254 mm); |
| | R1011 = .0400 inch (1.016 mm); |
| Std. X Flute: | Flute/flat = 1.29:1; The Radii (R) are as follows: |
| | R1012 = .0250 inch (.635 mm); |
| | R1013 = .0150 inch (.381 mm); |
| Std. B Flute: | Flute/flat =1.29:1; The Radii (R) are as follows: |
| | R1014 = .0410 inch (1.041 mm); |
| | R1015 = .0310 inch (.7874 mm); |
| | R1016 = .0310 inch (.7874 mm); |
| Std. C Flute: | Flute/flat = 1.46:1; The Radii (R) are as follows: |
| | R1017 = .0720 inch (1.829 mm); |
| | R1018 = .0620 inch (1.575 mm); |
| Std. A Flute: | Flute/flat = 1.53:1; The Radii (R) are as follows: |
| | R1019 = .0720 inch (1.829 mm); |
| | R1020 = .0620 inch (1.575 mm). |

In general, standard flute configurations from the corrugated box industry have been used to define corrugation shapes or approximate corrugation shapes for corrugated media. Improved performance of filtration media can be achieved by providing a flute configuration or structure that enhances filtration. In the corrugated box board industry, the size of the flutes or the geometry of the corrugation was selected to provide a structure suited for handling a load. The flute geometry in the corrugated box industry developed the standard A flute or B flute configuration. While such flute configurations can be desirable for handling a load, filtration performance can be enhanced by altering the flute geometry. Techniques for improving filtration performance include selecting geometries and configurations that improve filtration performance in general, and that improve filtration performance under selected filtration conditions. Exemplary flute geometries and configurations that can be altered to improve filtration performance include flute masking, flute shape, flute width height ratio, and flute asymmetry. In view of the wide selection of flute geometries and configurations, the filter element can be configured with desired filter element geometries and configurations in view of the various flute geometries and configurations to improve filtration performance.

Masking

In the context of z-media, masking refers to the area of proximity between the fluted sheet and the facing sheet where there is a lack of substantial pressure difference resulting in a lack of useful filtration media when the filtration media is in use. In general, masked media is not useful for significantly enhancing the filtration performance of filtration media. Accordingly, it is desirable to reduce masking to thereby increase the amount of filtration media available for filtration and thereby increase the capacity of the filtration media, increase the throughput of the filtration media, decrease the pressure drop of the filtration media, or some or all of these.

In the case of a fluted sheet arranged in a pattern with broad radii at the peaks as shown in FIG. 2, there exists a relatively large area of filtration media proximate the contact area of the fluted sheet and the facing sheets that is generally not available for filtration. Masking can be reduced by decreasing the radii of the peak or contact point between the fluted sheet and the facing sheet (e.g., providing sharper contact points). Masking generally takes into account the deflection of the media when it is under pressure (e.g., during filtration). A relatively large radius may result in more of the fluted media being deflected toward the facing sheet and thereby increasing masking. By providing a sharper peak or contact point (e.g., a smaller radius), masking can be reduced.

Figure 4A:
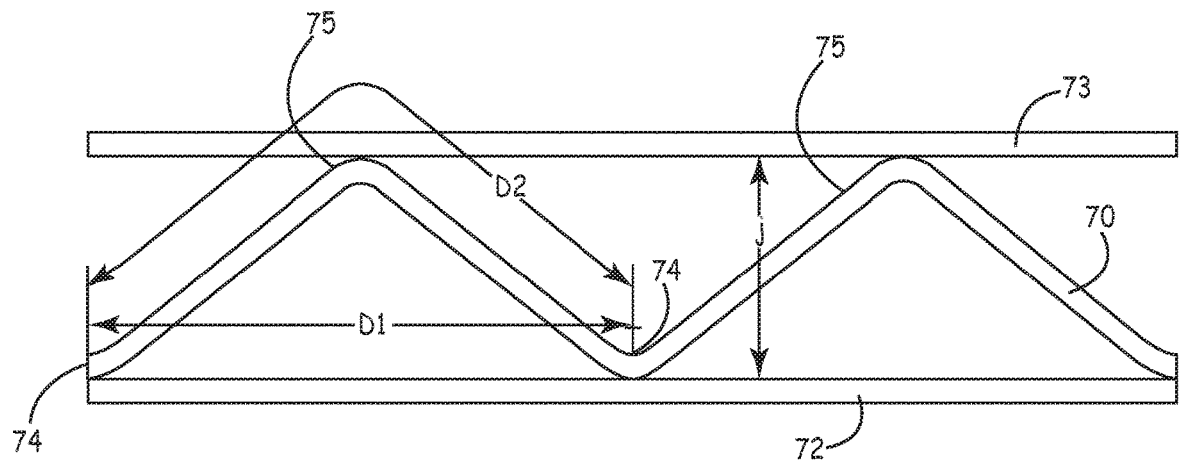
FIGS. 4A-C are enlarged schematic, cross-sectional views of a portion of media illustrating width height ratio.

Attempts have been made to reduce the radii of contact between the fluted sheet and the facing sheet. For example, see U.S. Pat. No. 6,953,124 to Winter et al. An example of reducing the radii is shown in FIG. 4A where the fluted sheet 70 contacts the facing sheets 72 and 73 at relatively sharp peaks or contact points 74 and 75 in the fluted sheet 70. A curved wave pattern such as the curved wave pattern shown in FIG. 1 generally provides a fluted sheet having a radius at the peaks of at least 0.25 mm and typically not more than 3 mm. A relatively sharp peak or contact point can be characterized as a peak having a radius of less than 0.25 mm. Preferably, the relatively sharp peak or contact peak point can be provided having a radius of less than about 0.20 mm. In addition, masking can be reduced by providing a peak having a radius of less than about 0.15 mm, and preferably less than about 0.10 mm. The peak can be provided having no radius or essentially a radius of about 0 mm. Exemplary techniques for providing fluted media exhibiting relatively sharp peaks or contact points includes coining, bending, folding, or creasing the fluted media in a manner sufficient to provide a relatively sharp edge. It should be understood that the ability to provide a sharp edge depends on a number of factors including the composition of the media itself and the processing equipment used for providing coining, bending, folding, or creasing. In general, the ability to provide a relatively sharp contact point depends on the weight of the media and whether the media contains fibers that resist tearing or cutting. In general, it is desirable to not cut the filtration media during coining, bending, folding, or creasing. While it is desirable to reduce the radius of the peak (internal peak or external peak) to reduce masking, it is not necessary that all of the peaks have a reduced radius to decrease masking. Reduced masking, and enhanced filtration performance, can be achieved by providing at least some of the peaks (e.g., at least about 20% of the peaks) with a relatively sharp peak or contact point. Furthermore, depending on the design of the media, the external peaks can be provided with a reduced radius or the internal peaks can be provided with a reduced radius, or both the external peaks and the internal peaks can be provided with a reduced radius in order to decrease masking.

Increasing the Surface Area of Media

Filtration performance can be enhanced by increasing the amount of filtration media available for filtration. Reducing masking can be considered a technique for increasing the surface area of media available for filtration.

Now referring to FIG. 4A, the fluted sheet 70 can be considered to provide flutes having a cross-section resembling an equilateral triangle. Because the media is flexible, it is expected that when the media is subjected to pressure such as during filtration, the fluted sheet 70 may deflect. In addition, the fluted sheet 43 in FIG. 2 can be considered to have flutes resembling a triangular shape. In general, fluted media where the flutes resemble equilateral triangles generally provides the least amount of media available for filtration compared with other flute designs where the period length or interval D1 is increased or decreased, or the flute height J is increased or decreased, relative to the other.

Figure 4B:
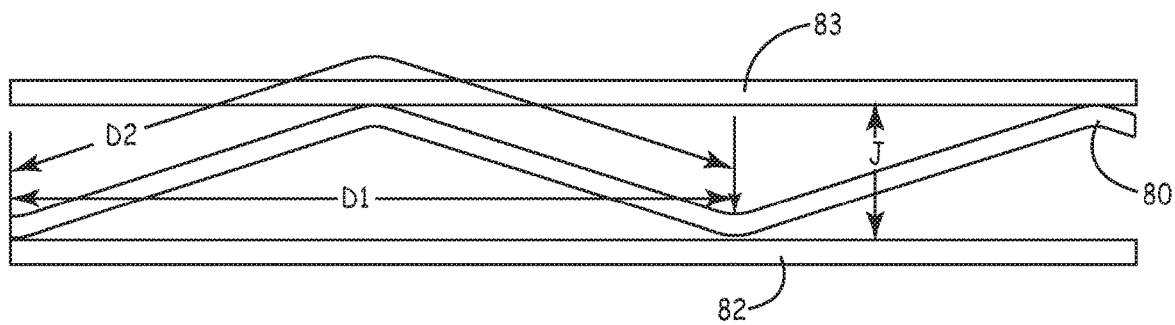
Figure 4C:
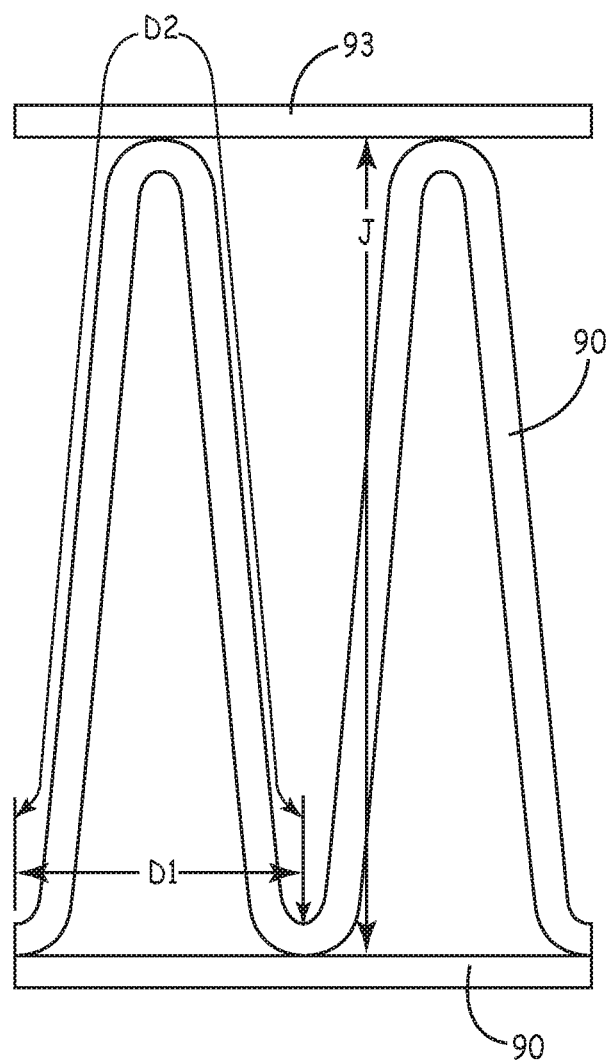

Now referring to FIGS. 4B and 4C, FIG. 4B refers to media where the fluted sheet 80 extends between the facing sheets 82 and 83. FIG. 4C shows media where the fluted sheet 90 extends between the facing sheets 92 and 93. The fluted sheet 80 is shown having a longer flute period D1 than the fluted sheet 70 in FIG. 4A. The fluted sheet 80 is provided having a relatively long period D1 relative to the flute height J compared with the media configuration shown in FIG. 4A. Now referring to FIG. 4C, the fluted sheet 90 is shown having a shorter flute period D1 than the fluted sheet 70 in FIG. 4A. The fluted sheet 90 is shown having a relatively large flute height J relative to the period D1 compared with the media configuration shown in FIG. 4A.

The configuration of the fluted media can be characterized by the flute width height ratio. The flute width height ratio is the ratio of the flute period length D1 to the flute height J. The flute width height ratio can be expressed by the following formula:

$$\text{flute width height ratio} = \frac{D1}{J}$$

Measured distances such as flute period length D1 and the flute height J can be characterized as average values for the filtration media along the flute length excluding 20% of the flute length at each end. The distances can be measured away from the ends of the flutes. It is typically the ends of the flutes that have a sealant or closure. The flute width height ratio calculated at a flute closure would not necessarily represent the flute width height ratio of the flute where the filtration is taking place. Accordingly, the measure of flute width height ratio can be provided as an average value over the flute length with the exception of the last 20% of the flute length near the ends of the flutes to remove the effects of flute closure when the flutes are closed at or near the ends. For "regular" media, it is expected that the flute period length D and the flute height J will be relatively constant along the flute length. By relatively constant, it is meant that the flute width height ratio can vary within about 10% over the length of the flute excluding the 20% length at each end where flute closure designs may affect the width height ratio. In addition, in the case of a "non-regular" media, such as, media having tapered flutes, the flute width height ratio can vary or remain about the same over the length of the flute. By adjusting the flute shape away from a theoretical equilateral triangle shape, the amount of media in a given volume available for filtration can be increased. Accordingly, flutes having a flute width height ratio of at least about 2.2, at least about 2.5, at least about 2.7, or at least about 3.0 can provide an increased surface area of media available for filtration. In addition, providing a flute design having a width height ratio of less than about 0.45, less than about 0.40, less than about 0.37, or less than about 0.33 can provide increased media area available for filtration. In general, a theoretical flute having an equilateral triangle shape represents a flute width height ratio of about 1.6.

Another technique for increasing the amount of filtration media available for filtration includes increasing the flute density of the media pack. The flute density refers to the number of flutes per cross-sectional area of filtration media in a filtration media pack. The flute density depends on a number of factors including the flute height J, the flute period D1, and the media thickness T. The flute density can be characterized as a media pack flute density or as a single facer media flute density. The equation for calculating the media pack flute density ($\rho$) for a filter element is:

$$\rho = \frac{\text{number of channels (open and closed)}}{2 \times z\text{-media pack cross sectional area}}$$

The flute density of a filter element can be calculated by counting the number of channels including those channels that are open and those channels that are closed in a cross sectional area of the filter element, and dividing that by two times the cross sectional area of the filter element at the location where the number of channels was determined. In general, it is expected that the flute density will remain relatively constant across the length of the filter element from the inlet flow face to the outlet flow face, or vice versa. It should be understood that the z-media cross sectional are refers to the cross sectional area of the media (wound or stacked) and not necessarily to the cross sectional area of the filter element. The filter element may have a sheath or a seal intended to engage a housing that would provide the filter element with a cross-sectional area that is greater than the cross-sectional area of the media. Furthermore, the cross-sectional area of the media refers to the effective area. That is, if the media is wound around a core or mandrel, the cross-sectional area of the core or mandrel is not part of the z-media pack cross-sectional area. Furthermore, the number of channels refers to the number of channels in the effective area.

An alternative equation for the calculation of flute density ($\rho$) for a single facer media is:

$$\rho = \frac{1}{(J+T) \times D1}$$

In the equation for flute density per single facer media, J is the flute height, D1 is the flute period length, and T is the thickness of the fluted sheet. This alternate equation can be referred to as the equation for calculating the single facer media flute density. The single facer media flute density is determined based upon the configuration of the single facer media. In contrast, the media pack flute density is determined based upon the assembled media pack Theoretically, the media pack flute density and the single facer media flute density should provide similar results. However, it is possible that the media pack may be configured in such a way that the media pack flute density and the single facer media flute density provide different results.

The standard B flute shown in FIGS. 2 and 3A-G and characterized in Table 1 provides a coiled filtration media having a flute density (media pack flute density and single facer media flute density) of about 34 flute/inch$^2$. The media pack formed from standard B flute media can be characterized as having an average flute density of about 34 flute/inch$^2$. The flute density (whether expressed as the media pack flute density or the single facer media flute density) can be considered an average flute density for the media pack unless stated otherwise. The flute density, therefore, may be referred to at times as the flute density and at other times as the average flute density. In general, increasing the average flute density refers to providing a media pack having a flute density greater than the flute density for standard B flute media. For example, increased flute density can refer to a media pack having a flute density greater than 35.0 flute/inch$^2$. The media pack can be provided having a flute density of greater than about 36 flute/inch$^2$, greater than about 38 flute/inch$^2$, greater than about 40 flute/inch$^2$, greater than 45 flute/inch$^2$, or greater than about 50 flute/inch$^2$. The media pack can be provided having a decreased flute density (compared with standard B media) to provide decreased pressure drop or less resistance to flow therethrough. For example, the media pack can be provided having a media pack flute density of less than 34.0 flute/inch$^2$, less than about 30 flute/inch$^2$, or less than about 25 flute/inch$^2$.

In general, providing media having increased flute density has a tendency to increase the surface area of media within a volume of the media and, therefore, has a tendency to increase the loading capacity of the filtration media. Accordingly, increasing the flute density of media can have the effect of enhancing the loading capacity of the media. However, increasing the flute density of media can have the effect of increasing the pressure drop through the media assuming other factors remain constant. Furthermore, decreasing the flute density for filtration media can have the effect of decreasing initial pressure drop.

Increasing the flute density of filtration media has the effect of decreasing the flute height (J) or the flute period length (D1), or both. As a result, the size of the flute (the size of the flute refers to cross sectional area of the flute) tends to decrease as flute density increases. As a result, smaller flute sizes have the effect of increasing the pressure drop across the filtration media. In general, the reference to a pressure drop across the media refers to the pressure differential determined at a first face of the media relative to the pressure measured at second face of the media, wherein the first face and the second face are provided at generally opposite ends of a flute. In order to provide a filtration media having a relatively high flute density while retaining a desired pressure drop, the flute length can be decreased. The flute length refers to the distance from the first face of the filtration media to the second face of the filtration media. In the case of filtration media useful for filtering air for combustion engines, short length flutes can be characterized as those flutes having a flute length of less than about 5 inches (e.g., about 1 inch to about 5 inches, or about 2 inches to about 4 inches). Medium length flutes can be characterized as those flutes having a length of about 5 inches to about 8 inches. Long length flutes can be characterized as those flutes having a flute length of greater than about 8 inches (e.g., about 8 inches to about 12 inches).

Flute Shape

Figure 5C:
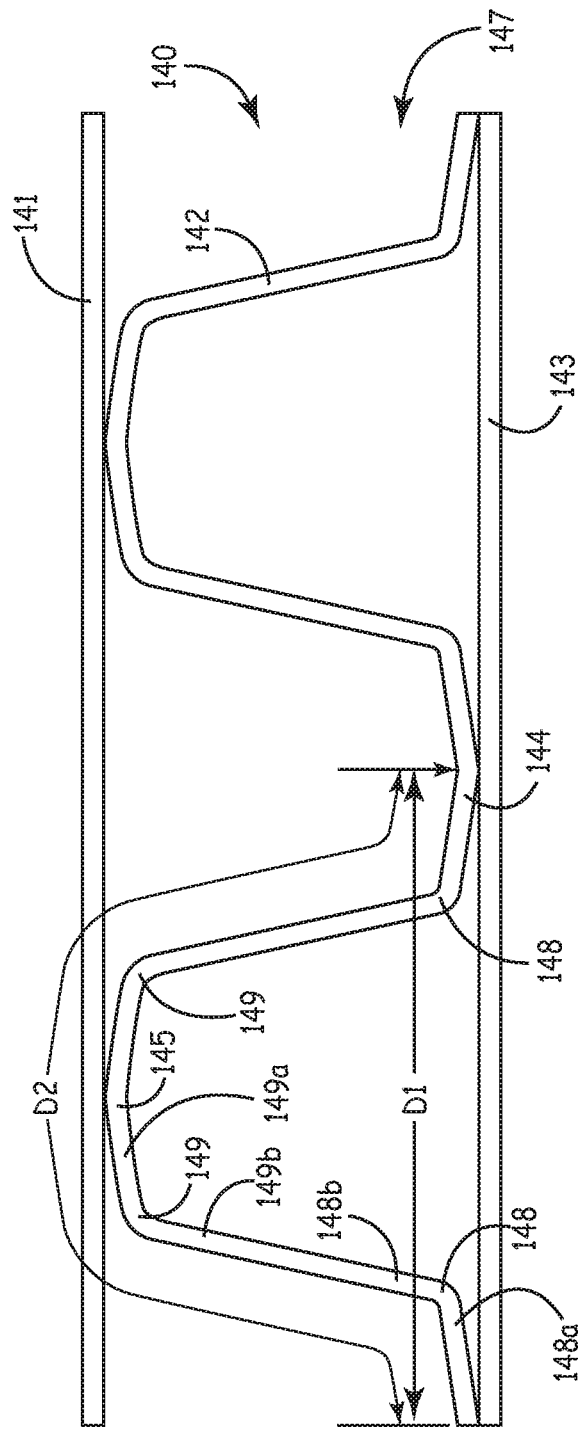

Another technique for increasing the amount of filtration media available for filtration within a media pack includes selecting a flute shape that provides for an increased amount of filtration media available for filtration compared with standard flute designs such as those described in Table 1. One technique for providing a flute shape that increases the amount of filtration media available for a filtration is by creating a ridge between adjacent peaks. As discussed previously, adjacent peaks can be characterized as an internal peak and an external peak depending upon whether the peak is facing toward the facing sheet or away from the facing sheet. FIGS. 5A-C show representative exemplary flute shapes for enhancing filtration performance. The flute shape shown in FIG. 5A can be referred to as a "low contact" flute shape. The flute shapes shown in FIGS. 5B and 5C can be referred to as a "zero strain" flute shapes. In general, the "low contact" name refers to the ability of the flute shape to enhance the amount of fluted media sheet between the facing media sheets while reducing the amount of contact (e.g., masking) between the fluted sheet and the facing sheet compared with standard A and B fluted media. The "zero strain" name refers to the ability of the flute shape to provide a taper along a length of the flutes without inducing an undesired level of strain on the media. In general, an undesired level of strain (or elongation) in the media can refer to an amount of strain that causes a tear or rip in the media, or an amount of strain that requires the use of a special media that can withstand a higher level of strain. In general, media that can withstand a strain of greater than about 12% can be considered a special media that an withstand a higher level of strain, and can be more expensive than media that is equipped to handle strain up to about 12%. The zero strain fluted sheet can additionally provide for reduced contact (e.g., reduced masking) between the fluted sheet and the facing sheet.

Now referring to FIGS. 5A-C, the media 110 includes fluted sheet 112 between facing sheets 111 and 113, the media 120 includes fluted sheet 122 between facing sheets 121 and 123, and the media 140 includes fluted sheet 142 between facing sheets 141 and 143. The combination of the fluted sheet 112 and the facing sheet 113 can be referred to as a single facer media 117, the combination of the fluted sheet 122 and the facing sheet 123 can be referred to as the single facer media 137, and the combination of fluted sheet 142 and facing sheet 143 can be referred to as the single facer media 147. When the single facer media 117, 137, or 147 is coiled or stacked, the facing sheet 111, 121, or 141 can be provided from another single facer media in the case of stacked media or from the same single facer media in the case of coiled media.

The media 110, 120, and 140 can be arranged to provide filter elements for cleaning a fluid such as air. The filter elements can be arranged as coiled elements or stacked elements. Coiled elements generally include a fluted media sheet and a facing media sheet that is wound to provide the coiled construction. The coil construction can be provided having a shape that is characterized as round, obround, or racetrack. A stacked construction generally includes alternating layers of media comprising fluted media sheet adhered to facing media sheet. The media 110, 120, and 140 shown in FIGS. 5A-C are sectional views taken across the media to show the cross-sectional shape of the fluted sheet for the low contact and zero strain shapes. It should be understood that the cross-sectional shape can be provided extending along a length of the flute. Furthermore, the flutes can be sealed so that the media functions as z-media. The seal can be provided, if desired, as an adhesive or sealant material.

In FIG. 5A, the distance D1 is measured from the center point of the internal peak 114 to the center point of the external peak 116. The fluted media 110 is shown having two ridges 118 for each period length D1, or along the media length D2. The ridges 118 are provided extending along at least a portion of the length of the flute. In general, each ridge 118 can be characterized as a general area where a relatively flatter portion of the fluted media 118a joins a relatively steeper portion of the fluted media 118b. A ridge (e.g., a non-peak ridge) can be considered a line of intersection between differently sloped media portions. A ridge can be formed as a result of deformation of the media at that location. The media can be deformed at the ridge as a result of applying pressure to the media. Techniques for forming the ridge include coining, creasing, bending, and folding. Preferably, the ridge can be provided as a result of coining during a corrugation process where the corrugation rolls apply pressure to the media to form the ridge. An exemplary technique for forming the fluted sheet and the single spacer media is described in U.S. Application Ser. No. 61/025,999 that was filed with the United States Patent and Trademark Office on Feb. 4, 2008. The entire disclosure of U.S. Application Ser. No. 61/025,999 is incorporated herein by reference. It is recognized that a peak can be referred to as a ridge. In the context of this disclosure, however, the reference to a "ridge" can be seen from context to refer to a "non-peak ridge" when the ridge is clearly provided between peaks.

For the exemplary fluted sheet 112, the relatively flatter portion of the fluted media 118a can be seen in FIG. 5A as the portion of the fluted media extending between the external peak 115 and the ridge 118. The average angle of the relatively flatter portion of the fluted media 118a from the external peak 115 to the ridge 118 can be characterized as less than 45°, and can be provided as less than about 30° relative to the facing sheet 113. The relatively steeper portion of the fluted media 118b can be characterized as that portion of the media extending from the internal peak 116 to the ridge 118. In general, the angle of the relatively steeper portion of the fluted media 118b, as characterized as extending between the internal peak 116 and the ridge 118, can be greater than 45° and can be greater than about 60° relative to the facing sheet 113. It is the difference in angle between the relatively flatter portion of the fluted media 118a and the relatively steeper portion of the fluted media 118b that can characterize the presence of the ridge 118. It should be understood that the angle of the relatively flatter portion of the fluted media 118a and angle of the relatively steeper portion of the fluted media 118b can be determined as the average angle between the points that form the end points of the section of the media, and the angle is measured from the facing sheet.

The ridge 118 can be provided as a result of coining, creasing, bending, or folding along a length of the fluted sheet 112 during the formation of the fluted media 12. It may be desirable, but it is not necessary, during the step of forming the fluted media 112 to take the steps to set the ridge 118. For example, the ridge 118 can be set by heat treatment or moisture treatment or a combination thereof. In addition, the ridge 118 can exist as a result of coining, creasing, bending, or folding to form the ridge without an additional step of setting the ridge. Furthermore, the characterization of a ridge 118 is not to be confused with the fluted sheet external peaks 115 or 119 and the fluted sheet internal peaks 116 or 114. The characterization of a generally flatter portion 118a and a generally steeper portion 118b is intended as a way to characterize the presence of a ridge. In general, it is expected that the flatter portion 118a and the steeper portion 118b will exhibit a curve. That is, it is expected that the flatter portion 18a and the steeper portion 118b will not be completely planar, particularly as fluids such as air flows through the media during filtration. Nevertheless, the angle of the media can be measured from the ridge to the corresponding, adjacent peak to provide the average angle of that portion of the media.

The shape of the media depicted in FIG. 5A can be referred to as a low contact shape. In general, the low contact shape refers to the relatively low area of contact between the fluted sheet 112 and the facing sheet 111. The presence of the ridge 118 helps provide for reduced masking at the peaks 115 and 119. The ridge 118 exists as a result of deforming the fluted sheet 112 and, as a result, reduces the internal stress on the media at the peaks 115 and 119. Without the presence of the ridge 118, there would likely exist a level of internal tension in the fluted sheet 112 that would cause the fluted sheet 112 to create a greater radius at the peaks 115 and 119, and thereby increase masking. As a result, the presence of the ridge 118 helps increase the amount of media present between adjacent peaks (e.g., peaks 115 and 114) and helps decrease the radius of a peak (e.g., peak 115) as a result of relieving, to a certain extent, the tension within the fluted sheet 112 that would cause it to expand or flatten out at the peaks in the absence of the ridge.

Figure 6:
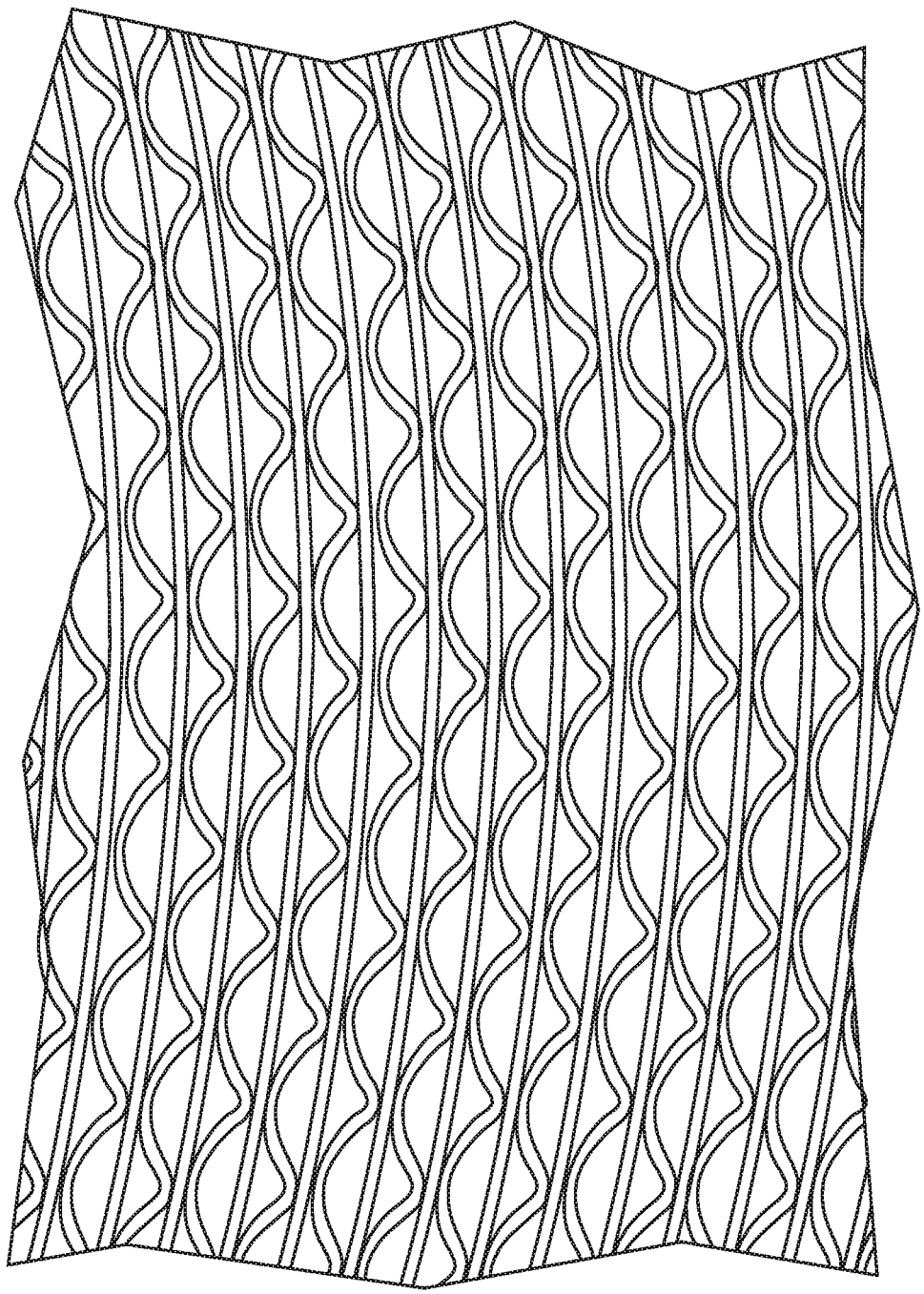
FIG. 6 is a photograph showing an end view of wound filtration media according to FIG. 5A.
Figure 7:
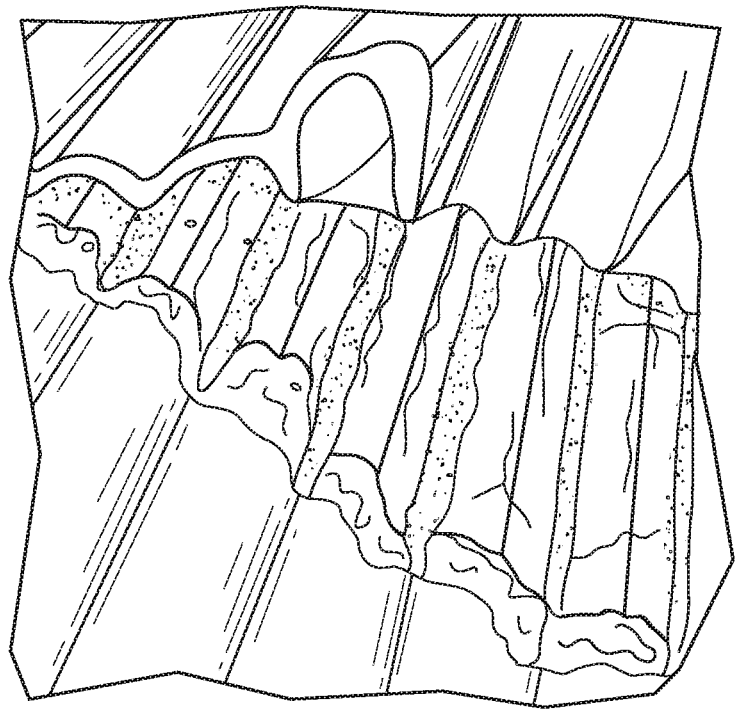
FIG. 7 is a photograph showing a perspective view of dust loaded into the filtration media shown in FIG. 6 wherein a portion of the fluted sheet is peeled back to reveal a dust cake.

The presence of a ridge 118 can be detected by visual observation. FIG. 6 shows a photograph of an end view of a filter element wherein the fluted media can be characterized as having the low contact shape. While the presence of the low contact shape may not be particularly apparent from viewing the end of the fluted media, one can cut into the filter element and see the presence of a ridge extending along a length of a flute. Furthermore, the presence of a ridge can be confirmed by a technique demonstrated by the photograph of FIG. 7 where the filter element is loaded with dust, and the fluted sheet can be peeled away from the facing sheet to reveal a cake of dust having a ridge corresponding to the ridge on the fluted media. In general, the ridge on a cake of dust reflects a portion of the dust surface having an average angle intersecting another portion of the dust surface having a different average angle. The intersection of the two portions of the dust surface cake forms a ridge. The dust that can be used to load the media to fill the flutes to provide a cake of dust within the flutes can be characterized as ISO Fine test dust.

Now referring to FIG. 5A, the fluted sheet 112 includes two ridges 118 over the distance D2 where the distance D2 refers to the length of the fluted sheet 112 from the center point of the peak 114 to the center point of the peak 116, and wherein the ridges are not the peaks 114, 115, 116 or 119. Although the peaks 114 and 116 can be referred to as internal peaks, and the peaks 115 and 119 can be referred to as the external peaks, the peaks can additionally be characterized as the facing sheet peaks. In general, it is believed that the media will be arranged in different configurations such as wound or stacked and that the flutes will be arranged spacially so that the characterizations of internal and external can be disregarded in favor of the use of the characterization of the peak as a facing sheet peak. The use of the terms internal and external is convenient for describing the flute as it is shown in the figures, and as provided as part of a single facer media.

Although the fluted sheet 112 can be provided having two ridges 118 along each length D2, the fluted sheet 112 can be provided having a single ridge along each period length D2, if desired, and can be provided having a configuration where some of the periods exhibit at least one ridge, some periods exhibit two ridges, and some periods exhibit no ridge, or any combination thereof. The fluted sheet can be provided as having a repeating pattern of ridges. A repeating pattern of ridges means that the wave pattern exhibits a pattern of ridges. The pattern of ridges may be between every adjacent peak, every other adjacent peak, every third adjacent peak, or some variation that can be perceived over the wave pattern of the media as exhibiting a repeating pattern of ridges.

The characterization of the presence of a ridge should be understood to mean that the ridge is present along a length of the flute. In general, the ridge can be provided along the flute for a length sufficient to provide the resulting media with the desired performance. While the ridge may extend the entire length of the flute, it is possible that the ridge will not extend the entire length of the flute as a result of, for example, influences at the ends of the flute. Exemplary influences include flute closure (e.g., darting) and the presence of plugs at the ends of flutes. Preferably, the ridge extends at least 20% of the flute length. By way of example, the ridge can extend at least 30% of the flute length, at least 40% of the flute length, at least 50% of the flute length, at least 60% of the flute length, or at least 80% of the flute length. The ends of the flutes may be closed in some manner and that as a result of the closure, one may or may not be able to detect the presence of a ridge when viewing the media pack from a face. Accordingly, the characterization of the presence of a ridge as extending along a length of the flute does not mean that the ridge must extend along the entire length of the flute. Furthermore, the ridge may not be detected at the ends of the flute. Attention is directed to the photograph of FIG. 6 where it may be somewhat difficult to detect the presence of a ridge at the end of fluted media although the presence of the ridge can be detected within the media at a distance from the end of the flute.

Now referring to FIG. 5B, the fluted media 120 includes a fluted sheet 122 provided between facing sheets 121 and 123. The fluted sheet 122 includes at least two ridges 128 and 129 between the internal peak 124 and the external peak 125. Along the length D2, the media 122 includes four ridges 128 and 129. A single period length of media can include four ridges. It should be understood that the ridges 128 and 129 are not the peaks 124, 125, or 126 that can be referred to as the facing media peaks. The media 122 can be provided so that between adjacent peaks (e.g., peaks 125 and 126) there are two ridges 128 and 129. In addition, the media 122 can be provided so that between adjacent peaks, there is one ridge or no ridge. There is no requirement that between each adjacent peak there are two ridges. There can be an absence of ridges between peaks if it is desirable to have the presence of ridges alternate or be provided at predetermined intervals between adjacent peaks.

The ridge 128 can be characterized as the area where a relatively flatter portion of the fluted media 128*a* joins a relatively steeper portion of the fluted media 128*b*. In general, the relatively flatter portion of the fluted media 128*a* can be characterized as having an angle of less than 45° and preferably less than about 30° wherein the angle is measured between the ridge 128 and the ridge 129, and relative to the facing sheet 123. The relatively steeper portion of the fluted media 128*b* can be characterized as having an angle of greater than 45° and preferably greater than about 60° wherein the angle is measured from the peak 126 to the ridge 128, and relative to the facing sheet 123. The ridge 129 can be provided as a result of the intersection of the relatively flatter portion of the fluted media 129*a* and the relatively steeper portion of the fluted media 129*b*. In general, the relatively flatter portion of the fluted media 129*a* corresponds to the angle of the portion of the media extending from the ridge 128 to the ridge 129. In general, the relatively flatter portion of the fluted media 129*a* can be characterized as having a slope of less than 45°, and preferably less than about 30°. The relatively steeper portion of the fluted media 129*b* can be characterized as that portion of the fluted media extending between the ridge 129 and the peak 125 and can be characterized as having an angle between the ridge 129 and the peak 125 and relative to the facing sheet 123. In general, the relatively steeper portion of the fluted media 129*b* can be characterized as having an angle of greater than 45° and preferably greater than about 60°.

Now referring to FIG. 5C, the fluted media 140 includes a fluted sheet 142 provided between facing sheets 141 and 143. The fluted sheet 142 includes at least two ridges 148 and 149 between the internal peak 144 and the external peak 145. Along the length D2, the media 140 includes four ridges 148 and 149. A single period length of media can include four ridges. It should be understood that the ridges 148 and 149 are not the peaks 144 and 145. The media 140 can be provided so that between adjacent peaks (e.g., peaks 144 and 145) there are two ridges 148 and 149. In addition, the fluted sheet 140 can be provided so that between other adjacent peaks, there is one ridge, two ridges, or no ridge. There is no requirement that between each adjacent peak there are two ridges. There can be an absence of ridges between peaks if it is desirable to have the presence of ridges alternate or provided at predetermined intervals between adjacent peaks. In general, a pattern of flutes can be provided where the pattern of flutes repeats and includes the presence of ridges between adjacent peaks.

The ridges 148 and 149 can be characterized as the areas where a relatively flatter portion of the fluted sheet joins a relatively steeper portion of the fluted sheet. In the case of the ridge 148, a relatively flatter portion of the fluted sheet 148a joins a relatively steeper portion of the fluted sheet 148b. In the case of the ridge 149, a relatively flatter portion of the fluted sheet 149a joins a relatively steeper portion of the fluted sheet 149b. The relatively steeper portion of the fluted media can be characterized as having an angle of greater than 45° and preferably greater than about 60° when measured for that portion of the media relative to the facing sheet 143. The relatively flatter portion can be characterized as having a slope of less than 45° and preferably less than about 30° for that portion of the media relative to the facing sheet 143.

The fluted sheet 142 can be considered more advantageous to prepare relative to the fluted sheet 122 because the wrap angle of the fluted sheet 142 can be less than the wrap angle for the fluted sheet 122. In general, the wrap angle refers to the sum of angles resulting in media turns during the step of fluting. In the case of the fluted media 142, the media is turned less during fluting compared with the fluted media 122. As a result, by fluting to form the fluted sheet 142, the required tencile strength of the media is lower compared with the fluted sheet 122.

The fluted sheets 112, 122, and 142 are shown as relatively symmetrical from peak to peak. That is, for the fluted sheets 112, 122, and 142, the flutes repeat having the same number of ridges between adjacent peaks. Adjacent peaks refer to the peaks next to each other along a length of fluted media. For example, for the fluted media 112, peaks 114 and 115 are considered adjacent peaks. A period of media, however, need not have the same number of ridges between adjacent peaks, and the media can be characterized as asymmetrical in this manner. That is, the media can be prepared having a ridge on one half of the period and not having a ridge on the other half of the period.

By providing a single ridge or multiple ridges between adjacent peaks of the fluted media, the distance D2 can be increased relative to prior art media such as standard A and B flutes. As a result of the presence of a ridge or a plurality of ridges, it is possible to provide filtration media having more media available for filtration compared with, for example, standard A flutes and B flutes. The previously described measurement of media-cord percentage can be used to characterize the amount of media provided between adjacent peaks. The length D2 is defined as the length of the fluted sheets 112, 122, and 142 for a period of the fluted sheets 112, 122, and 142. In the case of the fluted sheet 112, the distance D2 is the length of the fluted sheet from the lower peak 114 to the lower peak 116. This distance includes two ridges 118. In the case of the fluted sheet 122, the length D2 is the distance of the fluted sheet 122 from the lower peak 124 to the lower peak 126. This distance includes at least four ridges 128 and 129. The existence of increased filtration media between adjacent peaks as a result of providing one or more ridge (or crease) between the adjacent peaks can be characterized by the media-cord percentage. As discussed previously, standard B flutes and standard A flutes typically exhibit a media-cord percentage of about 3.6% and about 6.3%, respectively. In general, low contact flutes such as the flute design shown in FIG. 5A can exhibit a media-cord percentage of about 6.2% to about 8.2%. Preferably, the flutes exhibit a media-cord percentage greater than 5.2% and preferably greater than 6.5%. The flute designs shown in FIGS. 5B and 5C can provide a media-cord percentage of about 7.0% to about 16%. If desired, the media pack can be provided having flutes exhibiting a media-cord percentage greater than about 6.3%, or greater than about 8.3%.

Figure 8:
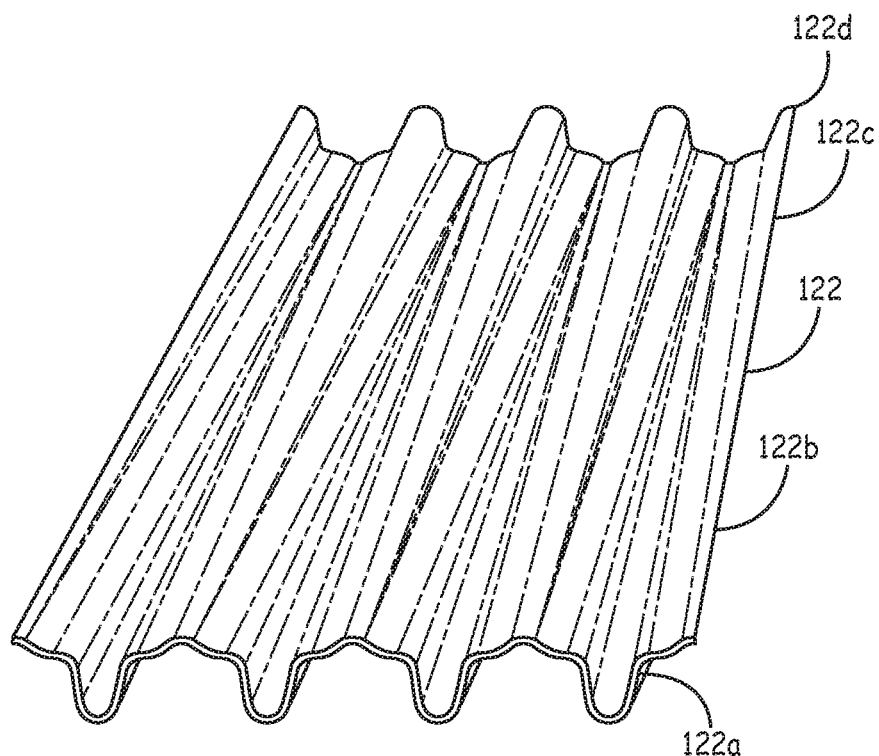
FIG. 8 is a perspective view of a tapered fluted sheet of the media according to FIG. 5B.
Figure 9A:
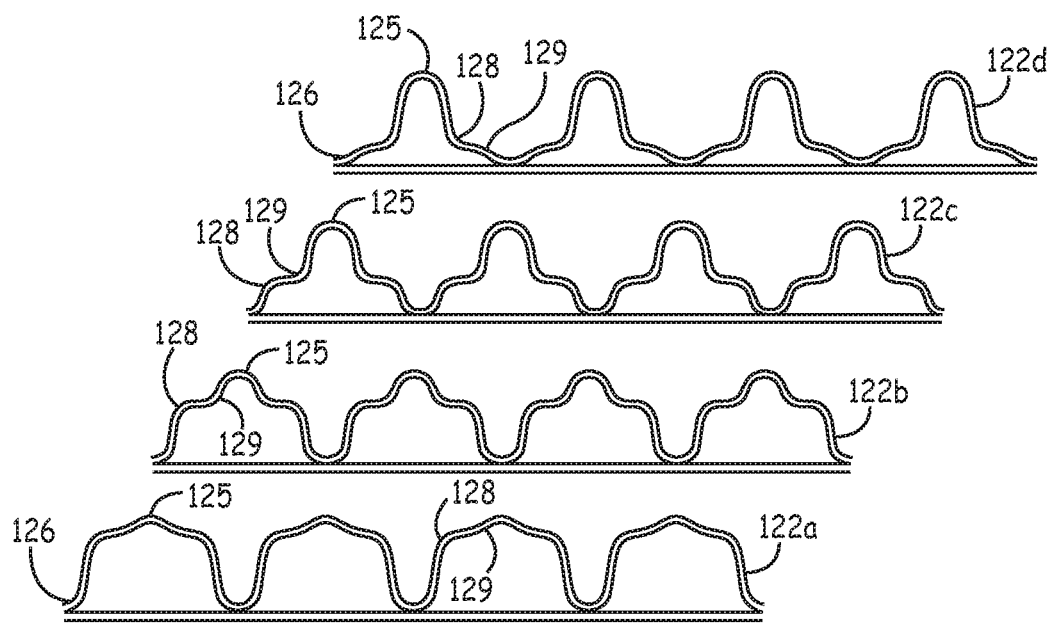
FIGS. 9A, 9B', 9B'', and 9B''' are sectional views of a tapered media according to FIGS. 5B and 5C.

The filtration media 120 and 140 in FIGS. 5B and 5C have an additional advantage of providing the ability to taper flutes along the length of the flute without creating a strain in the media. As a result of this, the flute shapes referred to in FIGS. 5B and 5C can be referred to as zero strain flute shapes. Now referring to FIGS. 8 and 9A, the fluted sheet 122 is shown in a tapered configuration. In FIG. 9A, the fluted sheet 122 is shown tapering from the configuration 122a to the configuration 122d. As a result of the taper, the fluted media includes the configurations shown as 122b and 122c. As the fluted media tapers from 122a to 122d, the ridges 128 and the ridges 129 approach the lower peaks 126 and move away from the upper peaks 125. Accordingly, as the fluted media 122 tapers from 122a to 122d, the cross sectional surface area between the fluted sheet 122 and the facing sheet 123 decreases. Corresponding with this decrease in cross sectional surface area, the corresponding flutes formed by the fluted sheet 122 and a facing sheet contacting the upper peaks 125 experience an increase in cross sectional surface area. It is additionally observed that as the taper moves toward the end configurations shown at 122a and 122d, the ridges tend to merge together or become less distinguishable from each other. The configuration shown at 122a tends to look more like the low contact shape. In addition, it is seen that as the fluted media tapers from 122d to 122a, the ridges 128 and the ridges 129 approach the upper peaks 125. In the case of the tapered zero-strain shapes, the fluted sheet can be characterized as having multiple ridges between adjacent peaks over at least 30%, and preferably at least 50%, of the length of the flute.

An advantage of using the filtration media 120 where the fluted sheet 122 contains ridges 128 and ridges 129 is the ability to taper the flutes without creating excessive strain, and the ability to use filtration media that need not exhibit a strain greater than 12%. In general, strain can be characterized by the following equation:

$$\text{strain} = \frac{D2\max - D2\min}{D2\min} \times 100$$

D2 min refers to the media distance where the media is relaxed or without strain, and D2 max refers to the media distance under strain at a point prior to tear. Filtration media that can withstand a strain of up to about 12% without ripping or tearing is fairly commonly used in the filtration industry. Commonly used filtration media can be characterized as cellulosic based. In order to increase the strain that the media can withstand, synthetic fibers can be added to the media. As a result, it can be fairly expensive to use media that must withstand a strain greater than 12%. Accordingly, it is desirable to utilize a flute configuration that provides for tapering of the flute while minimizing the strain on the media, and avoiding the necessity of using expensive media that can tolerate higher strains than 12%.

Figure 9B:
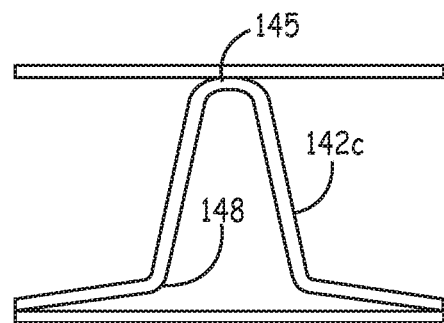
Figure 9B:
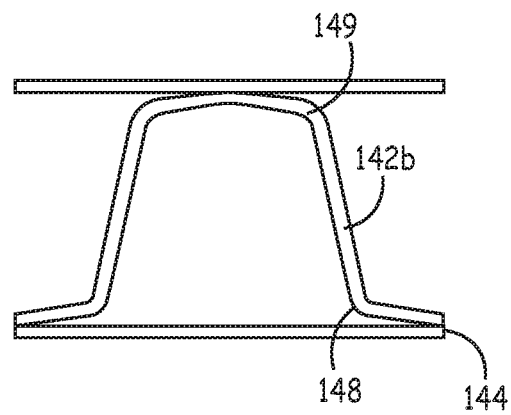
Figure 9B:
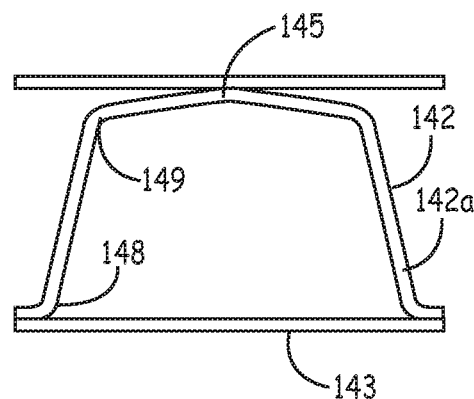

Now referring to FIGS. 9B', 9B", and 9B''', the fluted sheet 142 of FIG. 5C is shown in a tapered configuration extending from locations 142a to 142b, and then to 142c. As the flute tapers to a smaller cross-sectional area (the area between the fluted sheet 142 and the facing sheet 143), the ridges 148 and 149 move toward the peak 145. The reverse can also be said. That is, as the cross-sectional area in the flute increases, the ridges 148 and 149 move toward the peak 144.

The flute shapes exemplified in FIGS. 5A-C can help provide for reducing the area of media that may become masked at the peaks compared with standard A and B fluted media. In addition, the shapes exemplified in FIGS. 5A-C can help assist in increasing the amount of media available for filtration compared with standard A and B fluted media. In FIG. 5A, viewing the fluted media 112 from the facing sheet 113, the ridges 118 can be seen to provide the flute with a concave appearance. From the perspective of facing sheet 111, the ridges 118 can be seen to provide the media extending between adjacent peaks with a convex appearance. Now referring to FIG. 5B, the ridges 128 and 129 can be seen as providing both a concave and a convex appearance from either side of the fluted media 122 from peak to adjacent peak. It should be appreciated that the flutes are not actually concave or convex in view of the presence of the ridges. Accordingly, the ridges provide a transition or discontinuity in the curve. Another way of characterizing the presence of the ridge is by observing a discontinuity in the curve of the media wherein the discontinuity is not present in standard A flutes and B flutes. Furthermore, it should be appreciated that the flute shapes depicted in FIGS. 5A-5C and 9A-9B''' are somewhat exaggerated. That is, after forming the fluted media, there will likely be a degree of spring or memory in the media that causes it to bow out or curve. Furthermore, the application of fluid (e.g., air) through the media may cause the media to deflect. As a result, the actual media prepared according to this description will not necessarily follow precisely along the drawings presented in FIGS. 5A-5C and 9A-9B'''.

The single facer media configurations shown in FIGS. 5A-5C can be reversed, if desired. For example, the single facer media 117 includes the fluted sheet 112 and the facing sheet 113. If desired, the single facer media can be constructed so that it includes the fluted sheet 112 and the facing sheet 111. Similarly, the single facer media shown in FIGS. 5B and 5C can be reversed, if desired. The characterization of the single facer media shown in FIGS. 5A-5C is provided for purposes of explaining the invention. One will understand that a single facer media can be prepared by combining the fluted sheet with a facing sheet in a manner essentially opposite of that depicted in FIGS. 5A-5C. That is, after the step of fluting the fluted sheet, the fluted sheet can be combined with a facing sheet on either side of the fluted sheet.

Flute Volume Asymmetry

Flute volume asymmetry refers to a volumetric difference within a filter element or filter cartridge between the upstream volume and the downstream volume. The upstream volume refers to the volume of the media that receives the unfiltered fluid (e.g., air), and the downstream volume refers to the volume of the media that receives the filtered fluid (e.g., air). Filter elements can additionally be characterized as having a dirty side and a clean side. In general, the dirty side of filtration media refers to the volume of media that receives the unfiltered fluid. The clean side refers to the volume of media that receives the filtered fluid that has passed via filtering passage from the dirty side. It can be desirable to provide a media having a dirty side or upstream volume that is greater than the clean side or downstream volume. It has been observed that in the case of filtering air, particulates in the air are deposited on the dirty side and, as a result, the capacity of the filtration media can be determined by the volume of the dirty side. By providing volume asymmetry, it is possible to increase the volume of the media available for receiving the dirty air and thereby increase the capacity of the media pack.

Filtration media having a flute volume asymmetry exists when the difference between the upstream volume and the downstream volume is greater than 10%. Filtration media have a flute volume asymmetry can be referred to as a media pack having an asymmetric volume arrangement. Flute volume asymmetry can be expressed by the following formula:

$$\text{volume asymmetry} = \frac{volume_{upstream} - volume_{downstream} \times 100}{volume_{downstream}}$$

Preferably, media exhibiting volume asymmetry has volume asymmetry of greater than about 10%, greater than about 20%, greater than 30%, and preferably greater than about 50%. Exemplary ranges for flute volume asymmetry include about 30% to about 250%, and about 50% to about 200%. In general, it may be desirable for the upstream volume to be greater than the downstream volume when it is desirable to maximize the life of the media. Alternatively, there may be situations where it is desirable to minimize the upstream volume relative to the downstream volume. For example, in the case of a safety element, it may be desirable to provide a safety element having a relatively low upstream volume so that the media fills and prevents flow relatively quickly as an indicator that failure has occurred in an upstream filter element.

The volume asymmetry can be calculated by measuring the cross-sectional surface area of flutes from a photograph showing a sectional view of the flutes. If the flutes form a regular pattern, this measurement will yield the flute volume asymmetry. If the flutes are not regular (e.g., tapered), then one can take several sections of the media and calculate the flute volume asymmetry using accepted interpolation or extrapolation techniques.

Flute design can be adjusted to provide a flute asymmetry that enhances filtration. In general, flute asymmetry refers to forming flutes having narrower peaks and widened arching troughs, or vice versa so that the upstream volume and downstream volume for the media are different. An example of asymmetric volume arrangement is provided in U.S. Patent Application Publication No. US 2003/0121845 to Wagner et al. The disclosure of U.S. Patent Application Publication No. US 2003/0121845 is incorporated herein by reference.

Figure 10A:
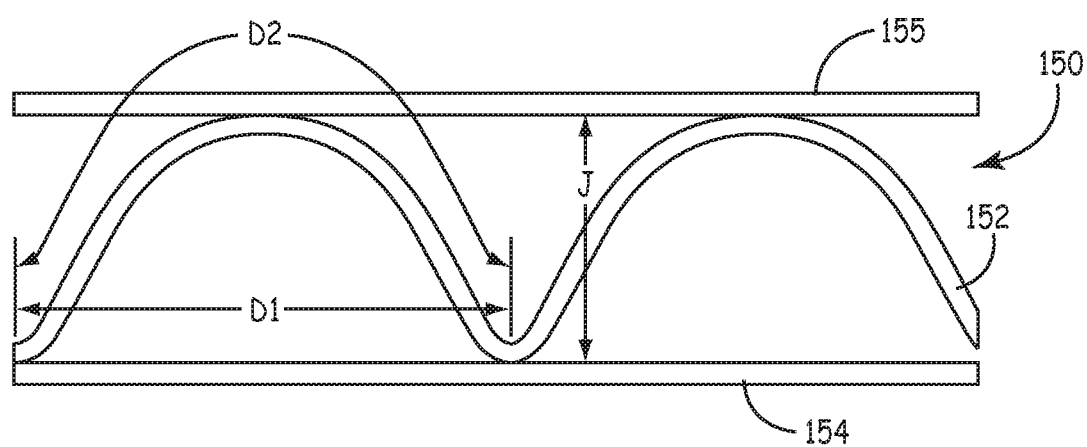
FIGS. 10A and 10B are enlarged schematic, cross-sectional views of a portion of volume asymmetric media according to the present invention.
Figure 10B:
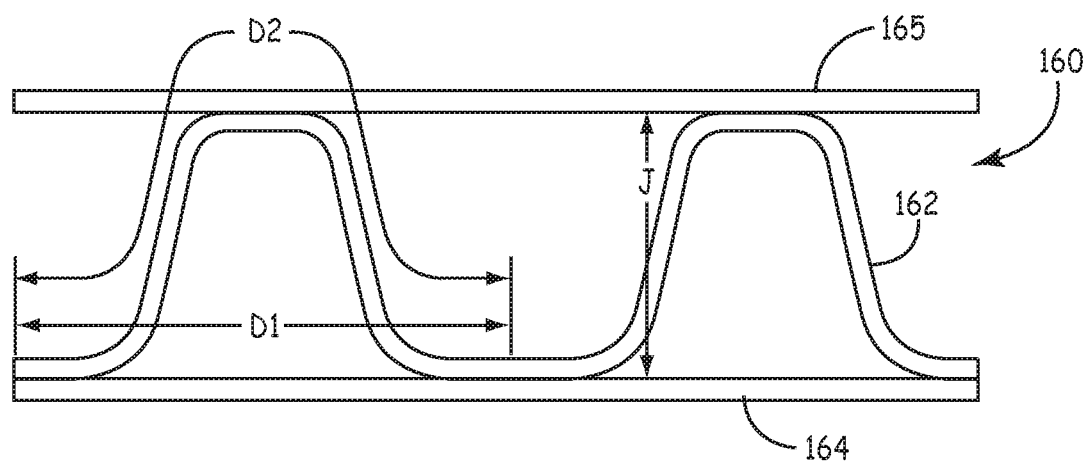

Now referring to FIGS. 10A and 10B, asymmetric flutes volumes are shown by the filtration media 150 and 160 where FIGS. 10A and 10B are sectional views of, for example, regular non-tapered fluted media. The filtration media 150 shows a fluted sheet 152 between facing sheets 154 and 155. The fluted sheet 152 is configured to provide a greater volume between the fluted sheet 152 and the facing sheet 154 than the volume defined by the fluted sheet 152 and the facing sheet 155. As a result, the volume defined by the area between the fluted sheet 152 and the facing sheet 154 can be provided as the upstream volume or as the dirty side volume when it is desired to maximize the upstream volume or dirty side volume. The flute filtration media 160 shows a fluted sheet 162 between facing sheets 164 and 165. The fluted sheet is configured to provide a greater volume between the fluted sheet 162 and the facing sheet 165. The area between the flutes sheet 162 and the facing sheet 165 can be characterized, if desired, as the upstream volume or the dirty side volume.

Filtration media having an asymmetric volume arrangement can result from the presence of regular flutes or tapered flutes. Furthermore, media having relatively symmetric tapered flutes (e.g., flutes tapering in each direct to relatively the same extent), can provide media having a lack of an asymmetric volume arrangement (less than 10% volume asymmetry). Accordingly, the existence or non-existence of tapered flutes does not imply or mean that existence or non-existence of an asymmetric volume arrangement. Media having a regular flute arrangement (e.g., non-tapered) may or may not exhibit an asymmetric volume arrangement.

The media pack can be provided so that flutes within the media pack are both regular and tapered. For example, the flutes can be provided so that along the length of the flute, the flute at one portion of the length is tapered and at another portion of the length is regular. An exemplary arrangement include, for example, a taper-straight-taper arrangement where the flute tapers from one face to a predetermined location and then exhibits a regular arrangement until another predetermined location and then exhibits a taper. The existence of a taper-straight-taper arrangement can be used to help provide volume asymmetry, and can be used to help handle loading and pressure drop.

Darted Flutes

FIGS. 11-18 illustrate a technique for closing an end of a flute having a curved wave pattern. The technique can be referred to as darting and general techniques for darting flutes are described in U.S. Patent Publication No. US 2006/0163150 that published on Jul. 27, 2006. The entire disclosure of U.S. Patent Publication No. US 2006/0163150 is incorporated herein by reference.

An exemplary darting technique that can be used to close flutes in filtration media according to the invention is shown in FIGS. 11-18. Although the darting technique provided in FIGS. 11-18 is shown in the context prior art media, the darting technique can be applied to fluted media according to the present invention. For example, the fluted media shown in FIGS. 5A-C can be darted according to the technique shown in FIGS. 11-18.

In general, darting can occur to provide closure after a facer bead 190 is applied for securing a fluted sheet 204 to a facer sheet 206. In general, and as described in U.S. Patent Publication No. US 2006/0163150, an indenting or darting wheel can be used to form the flutes 200 as shown in FIGS. 11-13, and a folder wheel can be used to close the flutes 200 as shown in FIGS. 14-18. As shown in FIGS. 11-13, the darting wheel deforms a portion 202 of the upper peak 204, by indenting or inverting it. By "inverting" and variants thereof, it is meant that the upper peak 204 is indented or turned inward in a direction toward the facing sheet 206. FIG. 12 is a cross-sectional view along the mid-point of the inversion 210 created by the darting wheel. The inversion 210 is between a pair of peaks 212, 214 that are created as a result of the darting process. The peaks 212, 214 together form a flute double peak 216. The peaks 212, 214 in the flute double peak 216 have a height that is shorter than the height of the upper peak 204 before inversion. FIG. 13 illustrates the cross-section of the flute 200 at a portion of the flute 200 that did not engage the darting wheel, and thus was not deformed. As can be seen in FIG. 13, that portion of the flute 200 retains its original shape.

While the flute double peak 216 shown in FIG. 12 represents an indenting of the upper peak 204 to form a pair of peaks 212 and 214 that are essentially symmetrical, it should be understood that the precise location of the darting or indenting may be off center. As a result of the timing of the indenting or darting wheel and the flexibility of the media, the peaks 212 and 214 may have different sizes, and the relative size of the peaks 212 and 214 can vary across the media from flute to flute.

Figure 18:
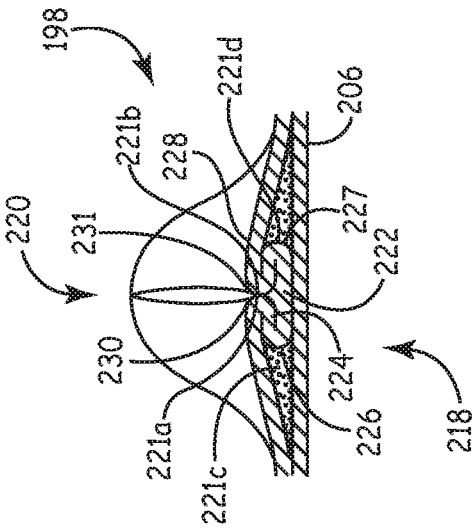
FIG. 18 is an end view of a folded flute depicted in FIG. 14.
Figure 14:
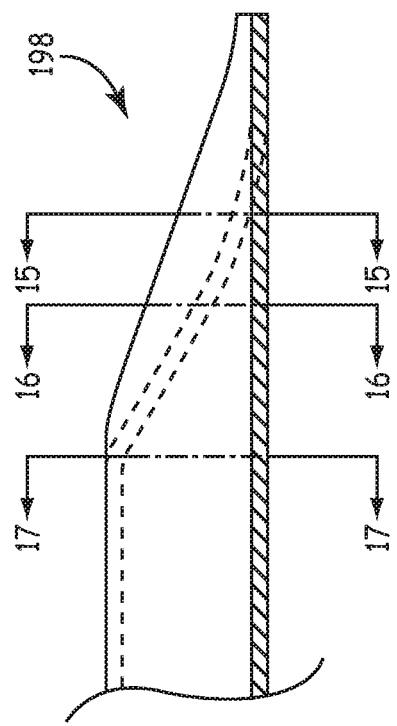
FIG. 14 is a cross-sectional view of a flute after contact with a folder wheel.

Attention is now directed to FIGS. 14-18. FIGS. 14-18 show sections of the darted section 198 after engagement with the folder wheel. FIG. 18, in particular, shows an end view of the darted section 198, in cross-section. A fold arrangement 218 can be seen to form a darted flute 220 with four creases 221a, 221b, 221c, 221d. The fold arrangement 218 includes a flat first layer 222 that is secured to the facing sheet 64. A second layer 224 is shown pressed against the flat first layer 222. The second layer 224 is preferably formed from folding opposite outer ends 226, 227 of the first layer 222.

Still referring to FIG. 18, two of the folds or creases 221a, 221b will generally be referred to herein as "upper, inwardly directed" folds or creases. The term "upper" in this context is meant to indicate that the creases lie on an upper portion of the entire fold 220, when the fold 220 is viewed in the orientation of FIG. 11. The term "inwardly directed" is meant to refer to the fact that the fold line or crease line of each crease 221a, 221b, is directed toward the other.

In FIG. 18, creases 221c, 221d, will generally be referred to herein as "lower, outwardly directed" creases. The term "lower" in this context refers to the fact that the creases 221c, 221d are not located on the top as are creases 221a, 221b, in the orientation of FIG. 14. The term "outwardly directed" is meant to indicate that the fold lines of the creases 221c, 221d are directed away from one another.

The terms "upper" and "lower" as used in this context are meant specifically to refer to the fold 220, when viewed from the orientation of FIG. 18. That is, they are not meant to be otherwise indicative of direction when the fold 120 is oriented in an actual product for use.

Based upon these characterizations and review of FIG. 18, it can be seen that a preferred regular fold arrangement 218 according to FIG. 18 in this disclosure is one which includes at least two "upper, inwardly directed, creases." These inwardly directed creases are unique and help provide an overall arrangement at which the folding does not cause a significant encroachment on adjacent flutes. These two creases result in part from folding tips 212, 214, FIG. 18, toward one another.

A third layer 228 can also be seen pressed against the second layer 224. The third layer 228 is formed by folding from opposite inner ends 230, 231 of the third layer 228. In certain preferred implementations, the facing sheet 206 will be secured to the fluted sheet 196 along the edge opposite from the fold arrangement 218.

Another way of viewing the fold arrangement 218 is in reference to the geometry of alternating peaks 204 and troughs 205 of the corrugated sheet 196. The first layer 222 includes the inverted peak 210. The second layer 224 corresponds to the double peak 216 that is folded toward, and in preferred arrangements, folded against the inverted peak 210. It should be noted that the inverted peak 210 and the double peak 216, corresponding to the second layer 224, is outside of the troughs 205 on opposite sides of the peak 204. In the example shown, there is also the third layer 228, which extends from folded over ends 230, 231 of the double peak 216.

Figure 15:
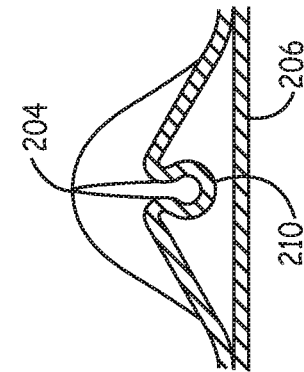
FIG. 15 is a cross-sectional view of a flute taken alone line 15-15 of FIG. 14.
Figure 16:
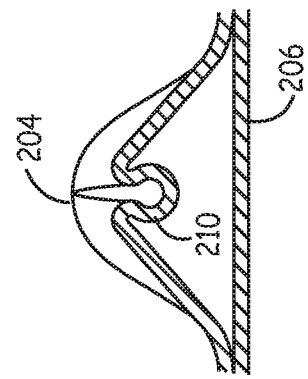
FIG. 16 is a cross-sectional view of a flute taken along line 16-16 of FIG. 14.
Figure 17:
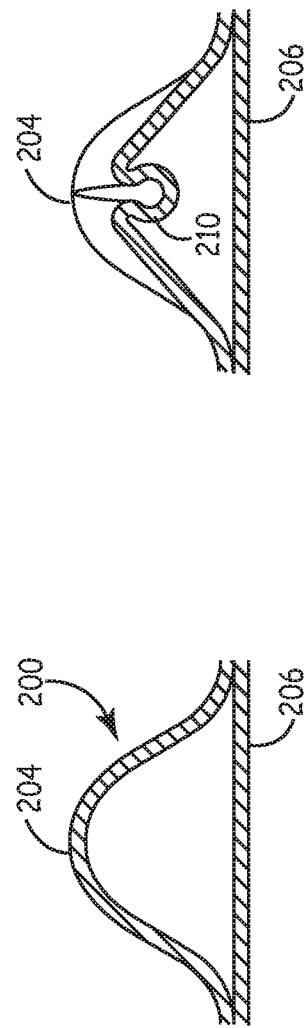
FIG. 17 is a cross-sectional view of a flute taken along line 17-17 of FIG. 14.

FIGS. 15-17 show the shape of the flute 200 at different sections. FIG. 17 shows an undeformed section of the flute 200. The inversion 210 can be seen in FIGS. 15 and 16 extending along from where it engages the facing sheet 206 (FIG. 18) to a point where it no longer exists (FIG. 17). In FIGS. 15 and 16, the inversion 210 is spaced at different lengths from the facing sheet 206.

Although the flute closure shown in FIG. 18 represents a closure resulting from a darting of the upper peak 204 to form relatively symmetrical peaks 212 and 214, it should be understood that the resulting closure may look different if the indenting of the upper peak 204 occurs at a location off center. The resulting closure may not be as symmetrical as the closure shown in FIG. 18. The fold arrangement may be provided so that only one of the fold tips is folded over.

A process used to provide a dart according to FIGS. 1-18 can be referred to as "center indenting," "center inverting," "center darting" or "center deformation." By the term "center" in this context, again, it is meant that the indentation or inversion occurred at an apex or center of the associated upper peak 80, engaged by the indenting or darting wheel. A deformation or indent will typically be considered herein to be a center indent, as long as it occurs within 3 mm of the center of a ridge. In the context of darting, the term "crease," "fold," or "fold line" are meant to indicate an edge formed by folding the media back on or over itself, with or without sealant or adhesive between portions of the media.

While the closure technique described in the context of FIGS. 11-18 can result in a flute closure as shown in FIG. 18, it is possible that during darting, as a result of the flexibility of the media and the speed at which the media is moving, the step of indenting may not occur precisely at the apex or peak of the corrugated sheet 196. As a result, folding of the tips 112 and 114 may not be as symmetrical as shown. In fact, one of the tips 212 and 214 may become somewhat flattened while the other tip is folded. Furthermore, in certain flute designs, it may be desirable to skip the indenting step. For example, the flute might have a height (J) that is sufficiently small so that the flute can be pressed closed to provide a repeating fold pattern without requiring a step of indenting the flute tip.

Plug Length and Flute Height

Z-media is sometimes characterized as having flutes extending from an inlet face to an outlet face of the media, and a first portion of the flutes can be characterized as inlet flutes and a second portion of the flutes can be characterized as outlet flutes. The inlet flutes can be provided with a plug or seal near or at the outlet face. Furthermore, the outlet flutes can be provided with a plug or seal near or at the inlet face. Of course, alternatives of this arrangement are available. For example, the seals or plugs need not be provided at or adjacent to the inlet face or outlet face. The seals or plugs can be provided away from the inlet face or the outlet face, if desired. In the case of hot melt adhesive being used as a seal or plug, it is often found that the plug has a length of at least about 12 mm in standard B fluted media. The plug length can be measured from the face of the element to the inner surface of the plug. The applicants have found that by reducing the plug length, it is possible to provide desirable characteristics of the filtration media including increased loading capacity, lower initial pressure drop, increased surface area of media available for filtration, reduced the amount of filtration media needed for a filter element, or combinations thereof. It can be desirable to provide a plug length that is less than about 10 mm, less than about 8 mm, less than about 7 mm, and even more preferably less than about 6 mm. Reducing the plug length can provide increased performance in the situation where the flute length is relatively short (e.g., a flute length of less than about 5 inches). Decreasing the plug length for a relatively long flute length (e.g., greater than 8 inches) may not be as effective for enhancing performance compared with reducing plug length for media having a shorter flute length. For shorter length flutes, for example, flutes having a length of less than about 5 inches (e.g., about 2 inches to about 4 inches), reducing the plug length to less than about 7 mm or less than about 6 mm can provide enhanced performance. The plug length can be referred to as an average plug length, and can be measured as the average plug length of the plugs sealing the first plurality of flutes or sealing the second plurality of flutes or both. That is, the average plug length can be reduced for the plugs present at or near one of the faces of the media pack. There is no requirement that the average plug length is an average plug length for all seals within the media pack. That is, the average plug length for the first portion of flutes can be different from the plug length for the second portion of flutes. The average plug length can be provided as an average plug length for all of the seals (e.g., for the first plurality of flutes and for the second plurality of flutes), if desired.

An exemplary technique for reducing plug length is to trim the edge of the single facer that contains sealant or adhesive holding the fluted sheet to the facing sheet as a way to reduce the plug length. That is, the width of single facer during production can be longer than necessary with the understanding that the width of the single facer will be trimmed to reduce the plug length. In addition, the plug length can be reduced by trimming one or both faces of the media. An alternative technique for reducing plug length is to use a thicker or more viscous sealant material to provide a seal or plug having a shorter length.

The flute height (J) can be selected depending upon the desired flute height or flute size for the resulting filtration media. The conditions of use for the filtration media can be relied upon to select the desired flute height (J). In the case where a filter element utilizing the media according to the present invention is used as a substitute for a conventional filter element that utilizes, for example, a standard B flute, the height J can be about 0.075 inch to about 0.150 inch. In the case where a filter element utilizing the media according to the present invention is used as a substitute for a conventional filter element that utilizes, for example, a standard A flute, the height J can be about 0.15 inch to about 0.25 inch.

Exemplary Media Definitions

In the case of z-media useful for air filtration applications, and in particular for filtering an air stream for an internal combustion engine, the definition of the filtration media can be selected depending upon whether the filtration media is intended maximize dust loading capacity, minimize pressure drop, or provide a desirable level of both capacity and pressure drops. The dust loading capacity can refer to the life or longevity of the filtration media. Sometimes it is desirable to design a filtration media that is capable of exhibiting a desired life span before it needs to be replaced. Alternatively, in certain circumstances, it may be more desirable to design a filtration media that is capable of performing within a desired pressure drop range. The selection of various definitions for the filtration media provides the flexibility for defining the filtration media for a particular environment and for a particular air cleaner. In addition, selecting the various definitions of the filtration media allows one to have flexibility in designing an air cleaner to fit a particular environment.

The following described exemplary filtration media can be provided with or without the flute shape referred to earlier as "low contact" or "zero strain." The provision of a ridge or multiple ridges between peaks in a fluted media is not a requirement of the filtration media, but can be relied upon for enhancing performance.

A first exemplary filtration media can be selected for maximizing dust loading capacity. The flute density can be selected so that it is greater than the flute density of filter media prepared from Standard B flute media. For example, the filtration media can be provided having a flute density of at least about 35.0 flute/inch$^2$, wherein the flute density is calculated according to the formula:

$$\rho = \frac{\text{number of channels (open and closed)}}{2 \times z\text{-media pack cross sectional area}}$$

wherein the number of channels is determined by counting the channels in a cross section of the media and the location where the media cross sectional area is determined. Preferably, the flute density can be greater than 45 flute/inch$^2$ or greater than about 50 flute/inch$^2$. In order to reduce pressure drop caused by the increase in flute density, the flute length can be decreased. For example, the media can be provided having a flute length of less than 5 inches. Because of the relatively short flute length, the plug length can be provided as relatively short in order to increase the amount of media available for filtration. For example, the plugs can be provided having a length of less than about 7 mm, and preferably less than about 6 mm. In addition, the flute volume asymmetry of the media can be adjusted. For example, the flute volume asymmetry of the media can be provided so that the upstream volume is at least 10 percent greater than the downstream volume. Preferably, the flute volume asymmetry can be greater than 30%, and preferably greater than 50%. The fluted media can be provided having a flute width height ratio of at least about 2.7, and preferably at least about 3.0.

A second exemplary media can be selected for providing a desired long life. The second exemplary media can have a medium flute length. For example, the flute length can be about 5 inches to about 8 inches. The second exemplary media can be provided without a taper, and can be provided having a flute density of about 34 flutes/inch$^2$ which is about the flute density of Standard B media. The second exemplary media can be provided having a flute width height ratio of greater than about 2.7, and preferably greater than about 3.0. In addition, the second exemplary media can be provided having a flute volume asymmetry of greater than 20%, and preferably greater than 30%.

A third exemplary filtration media can be provided so that the media exhibits a desired low pressure drop. The third exemplary filtration media can have a relatively low flute density of less than about 34 flute/inch$^2$, and preferably less than about 25 flute/inch$^2$. In addition, the flute length of the media can be medium length or long, and can have a length of at least about 5 inches and can have a length of about 6 inches to about 12 inches. The third exemplary filtration media can be provided with or without flute volume asymmetry. When provided with flute volume asymmetry, the media can have a flute volume asymmetry of greater than about 30%, or greater than about 70%. The flutes can be provided as tapered or non-tapered.

A fourth exemplary filtration media can be provided to balance the desired level of dust loading and the desired pressure drop. The fourth exemplary filtration media can be provided having relatively long flutes. For example, the flute length of the media can be about 8 inches to about 12 inches. The fourth exemplary filtration media can be provided with or without a taper.

Filter Elements

Figure 19:
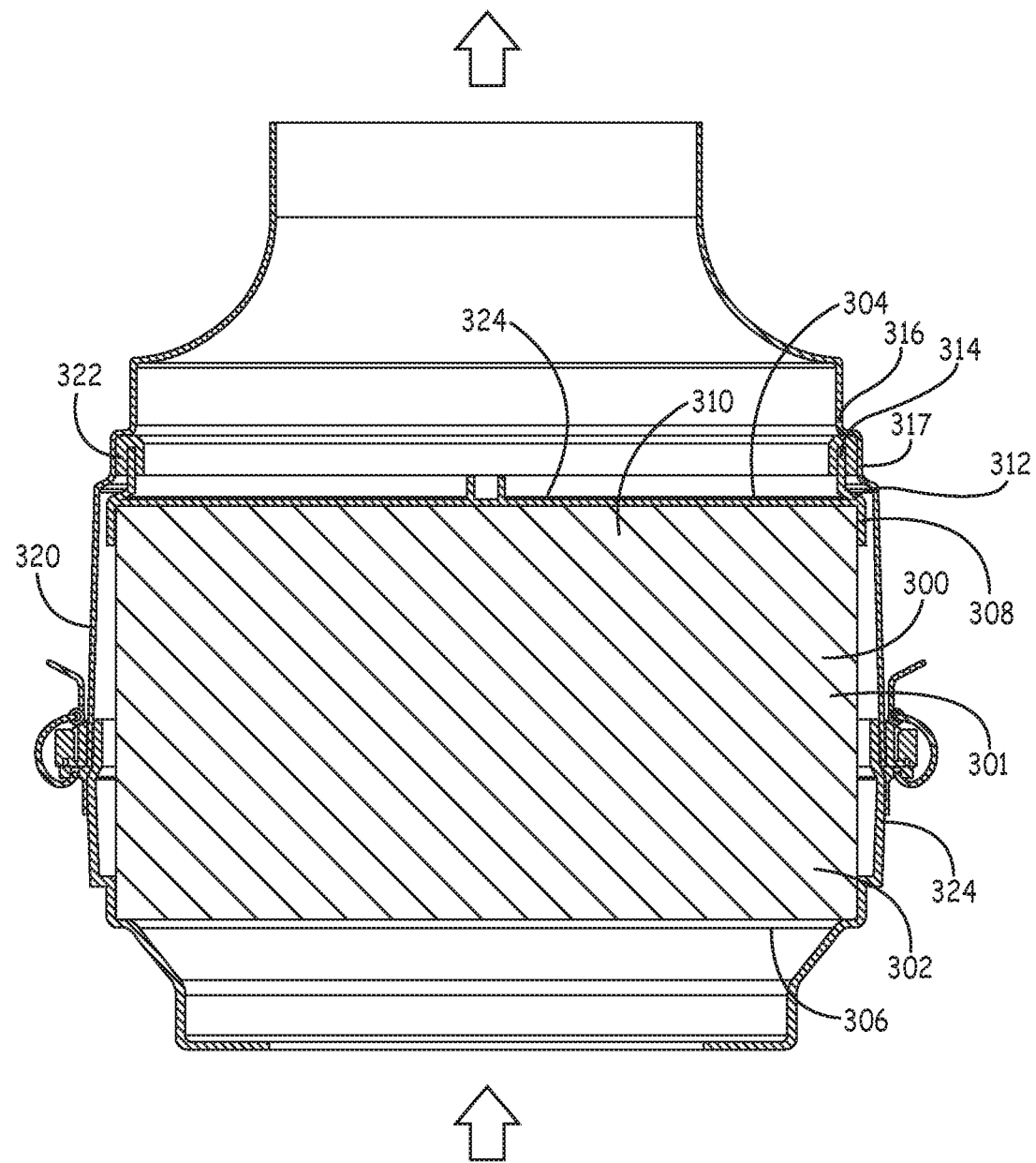
FIG. 19 is a sectional view of an exemplary air cleaner that can include a filter element containing the filtration media pack according to the present invention.
Figure 20:
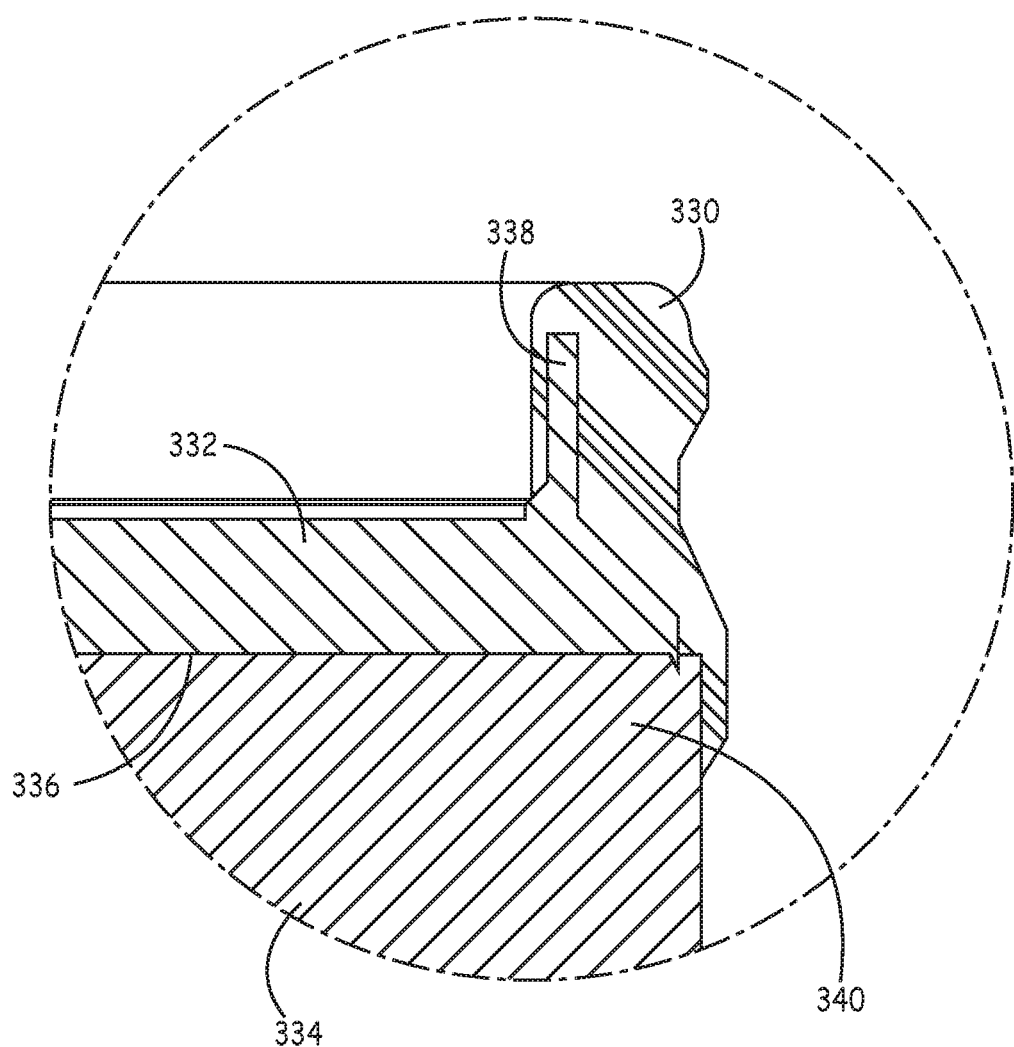
FIG. 20 is a partial, sectional view of a filter element containing a filtration media pack according to the present invention.
Figure 21:
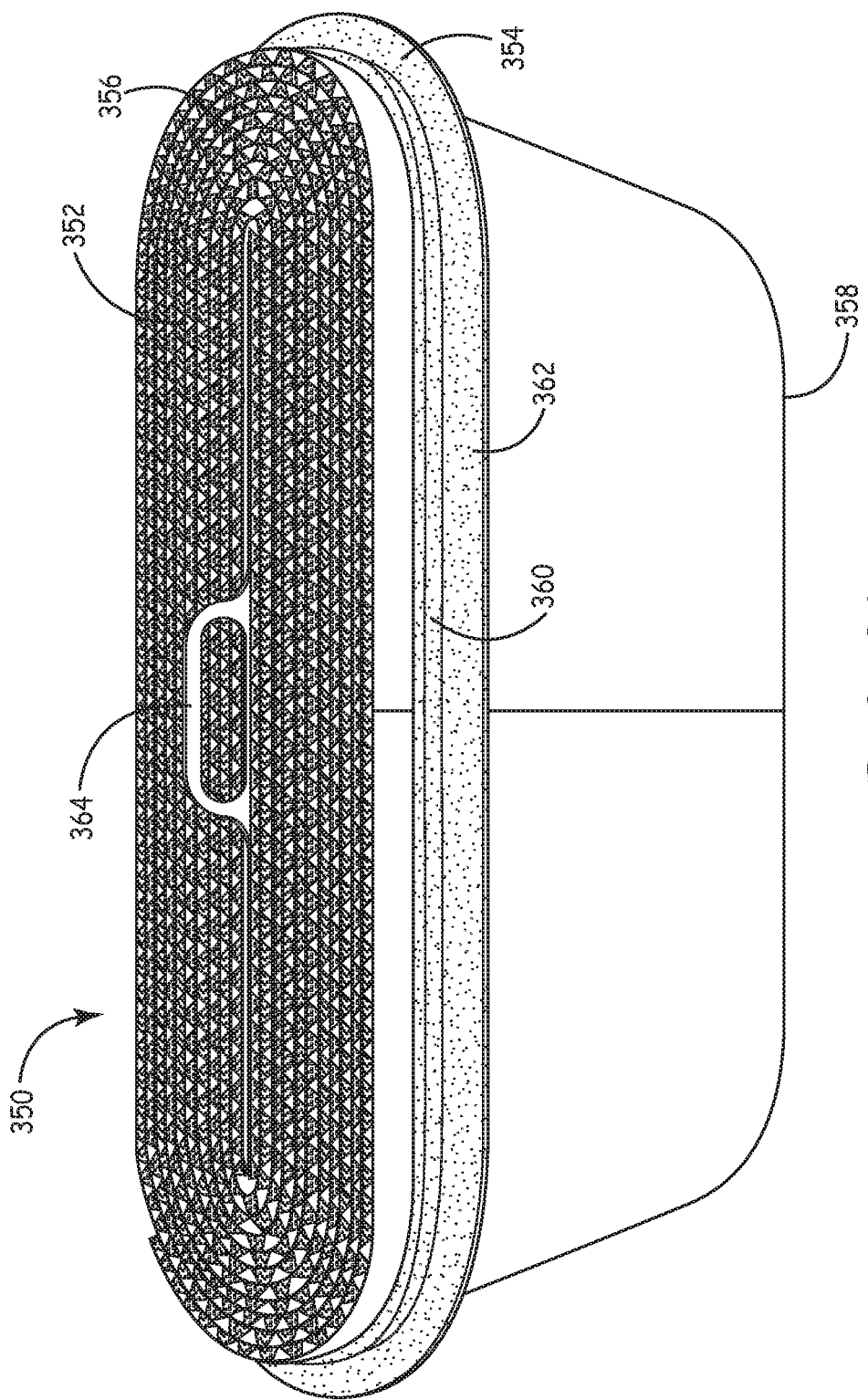
FIG. 21 is a perspective view of a filter element containing a filtration media pack according to the present invention.

Now referring to FIGS. 19-28, filter elements are described that include a filtration media pack. The filtration media pack can be provided based upon the media pack characterizations described herein, and based upon the exemplary media definitions. One will understand how the filter elements shown in FIGS. 19-28 can be modified to accept the media as characterized herein. For example, the media can be provided as coiled or stacked, and can be provided having a flute length and flute density range as described. In addition, the filter elements shown in FIGS. 19-20 are generally characterized as air filtration elements because they can be used to filter air.

The filtration media pack can be provided as part of a filter element containing a radial seal as described in, for example, U.S. Pat. No. 6,350,291, U.S. Patent Application No. US 2005/0166561, and International Publication No. WO 2007/056589, the disclosures of which are incorporated herein by reference. For example, referring to FIG. 19, the filter element 300 includes filtration media pack 301 that can be provided as a wound media pack 302 of single facer media, and can include a first face 304 and a second face 306. A frame 308 can be provided on a first end of the media pack 310, and can extend beyond the first face 304. Furthermore, the frame 308 can include a step or reduction in circumference 312 and a support 314 that extends beyond the first face 304. A seal member 316 can be provided on the support 314. When the filter element 301 is introduced within the housing 320, the seal member 316 engages the housing sealing surface 322 to provide a seal so that unfiltered air does not bypass the filtration media pack 300. The seal member 316 can be characterized as a radial seal because the seal member 316 includes a seal surface 317 that engages the housing sealing surface 322 in a radial direction to provide sealing. In addition, the frame 308 can include a media pack cross brace or support structure 324 that helps support the frame 308 and helps reduce telescoping of the air filtration media pack 300. An access cover 324 can be provided for enclosing the filter element 300 within the housing 320.

The filtration media pack can be provided as part of a filter element having a variation on the radial seal configuration. As shown in FIG. 20, the seal 330 can be relied upon for holding the frame 332 to the media pack 334. As shown in FIG. 19, the frame 308 can be adhesively attached to the media pack 301. As shown in FIG. 20, the frame 332 can be provided adjacent to the first face 336 and the seal 330 can be provided so that it holds the support 332 onto the media pack 334 without the use of additional adhesive. The seal 330 can be characterized as an overmold seal in that it expands along both sides of the seal support 338 and onto the outer surface of the media pack 334 at the first end 340.

The filtration media pack can be provided as part of a filter element according to U.S. Pat. No. 6,235,195, the entire disclosure of which is incorporated herein by reference. Now referring to FIG. 21, the filter element 350 includes a wound media pack 352 having an oblong or racetrack shape, and an axial pinch seal 354 attached to the end and circumscribing the exterior of the media pack. The axial pinch seal 354 is shown provided between the first face 356 and the second face 358 of the media pack. The axial pinch seal 354 includes a base portion 360 and a flange portion 362. The base portion 362 can be provided for attaching to the media pack. The flange portion 362 can be pinched between two surfaces to create a seal. One of the surfaces can be a surface of the housing that contains the filter element 350. In addition, the other structure that pinches the flange 362 can be an access cover or another structure provided within the housing that helps maintain the seal so that unfiltered air passes through the media pack without bypassing the media pack. The filter element 350 can include a handle 364 extending axially from the first face 356. If desired, the handle can be provided extending axially from the second face 358. The handle 364 allows one to pull or remove the filter element 350 from the housing.

Figure 22:
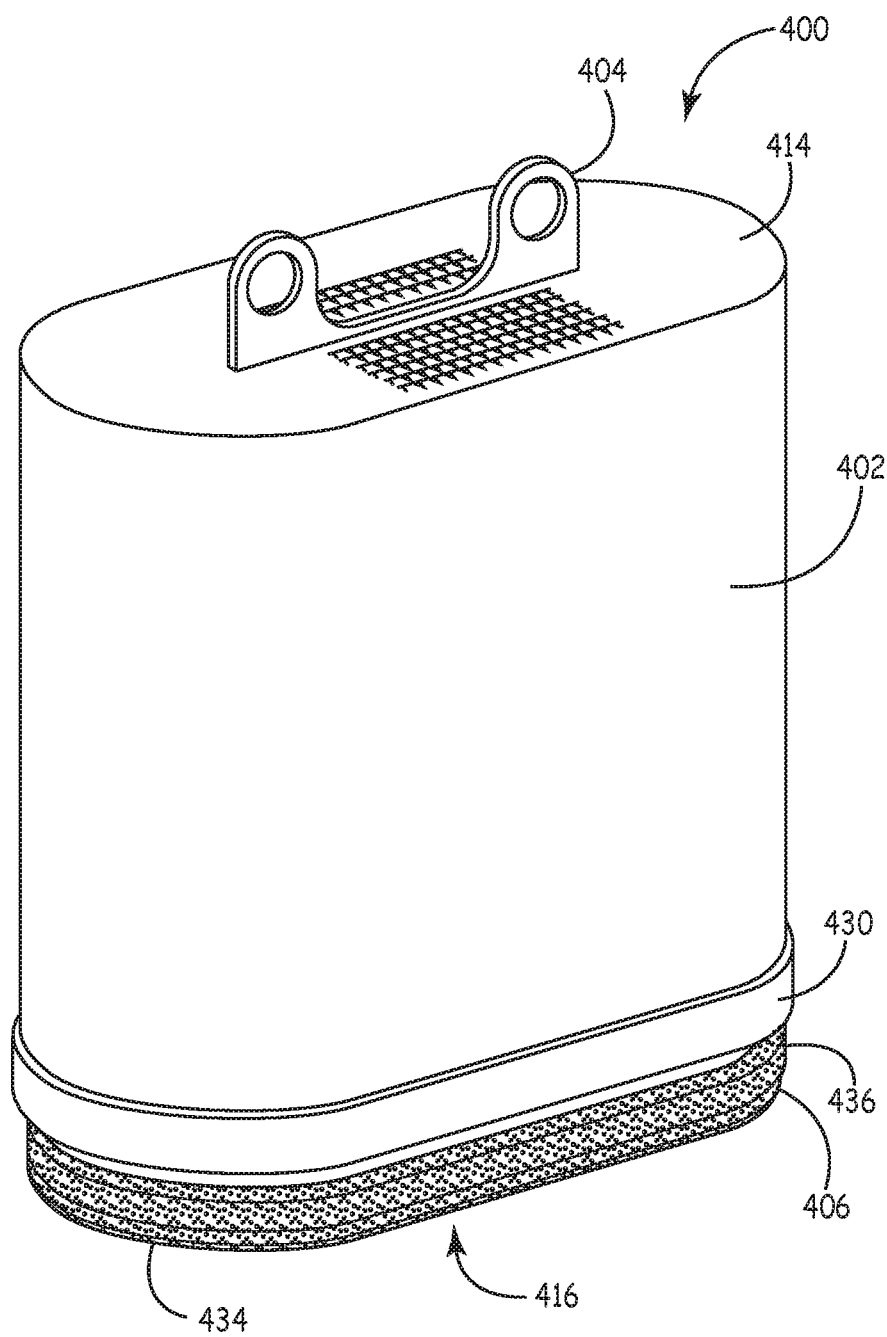
FIG. 22 is a perspective view of a filter element containing a filtration media pack according to the present invention.
Figure 23:
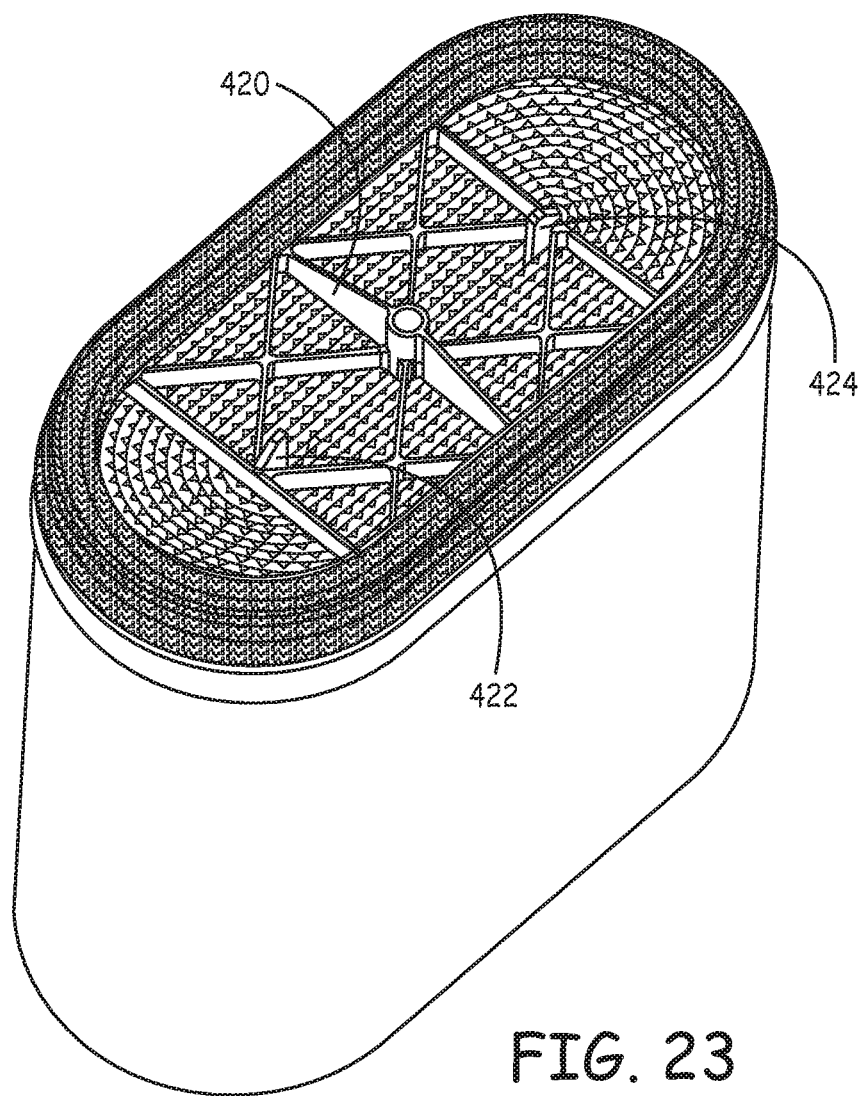
FIG. 23 is a bottom, perspective view of the filter element of FIG. 22.
Figure 24:
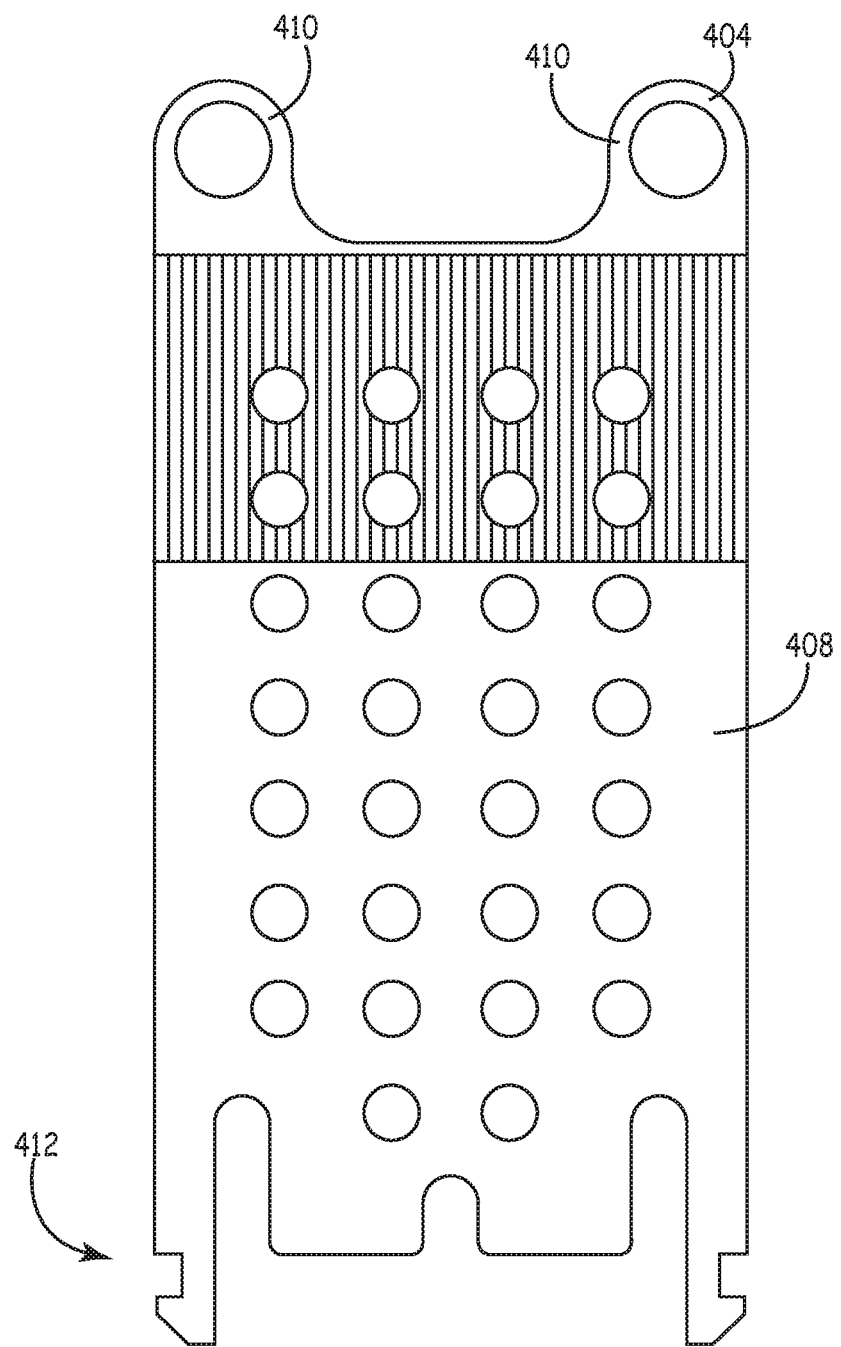
FIG. 24 is a side view of the sensor board of the filter element of FIGS. 22 and 23.
Figure 25:
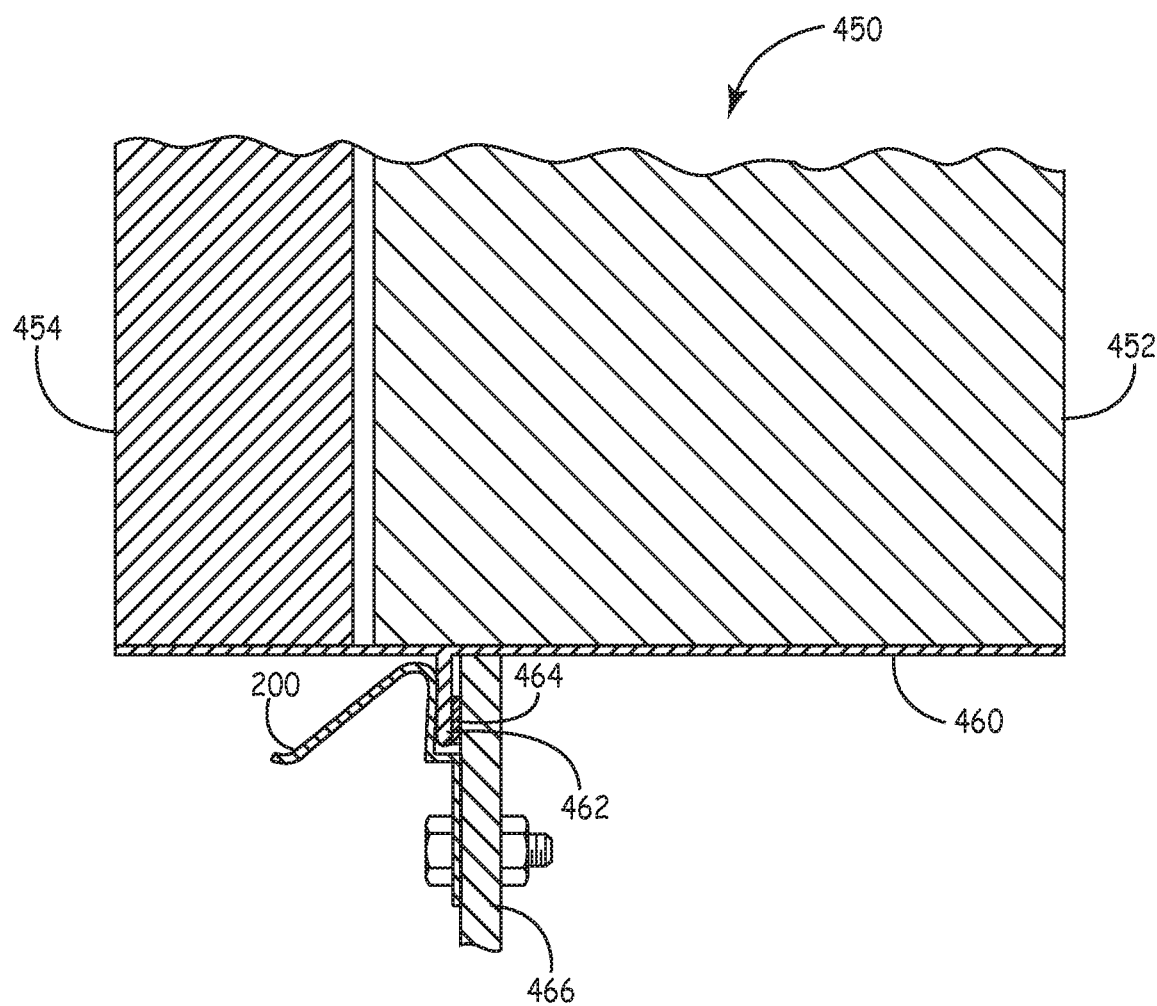
FIG. 25 is a partial, sectional view of a filter arrangement containing a filtration media pack according to the present invention.
Figure 26:
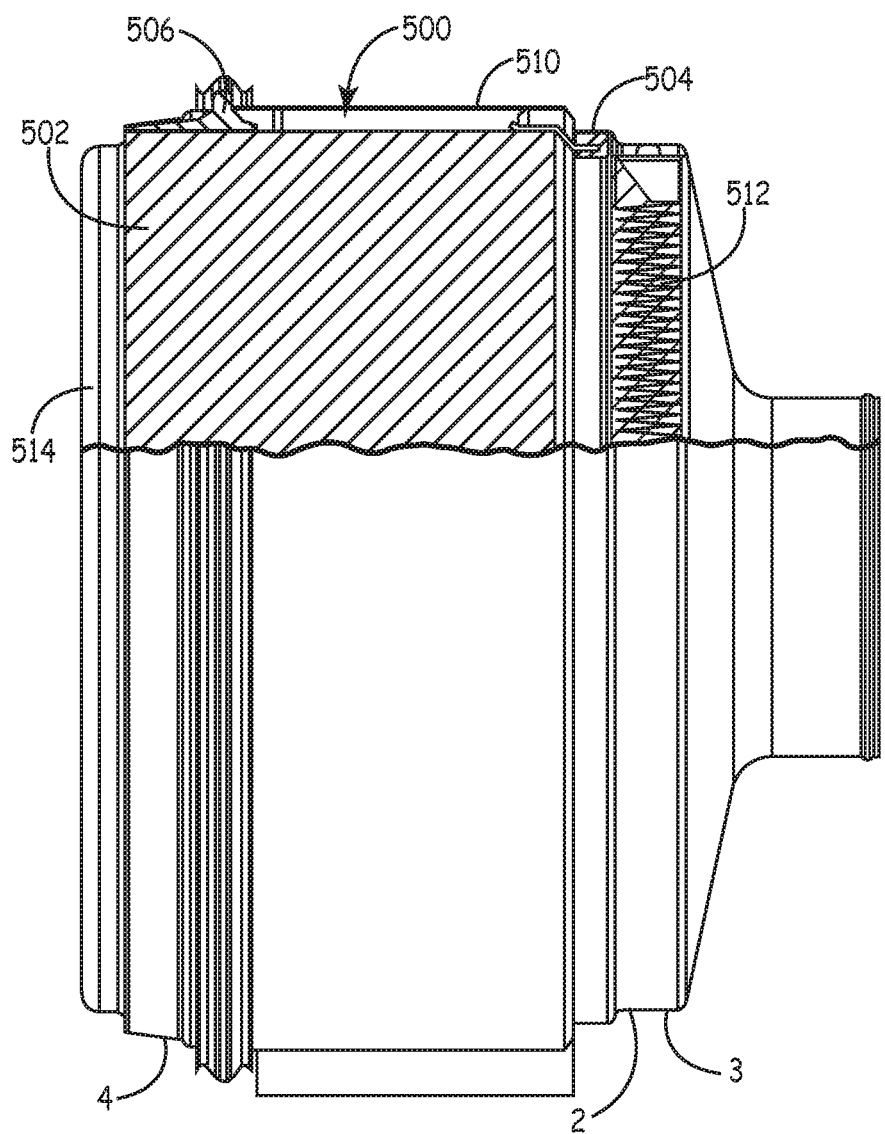
FIG. 26 is a partial, sectional view of a cleaner having a filter element containing a filtration media pack according to the present invention.
Figure 27:
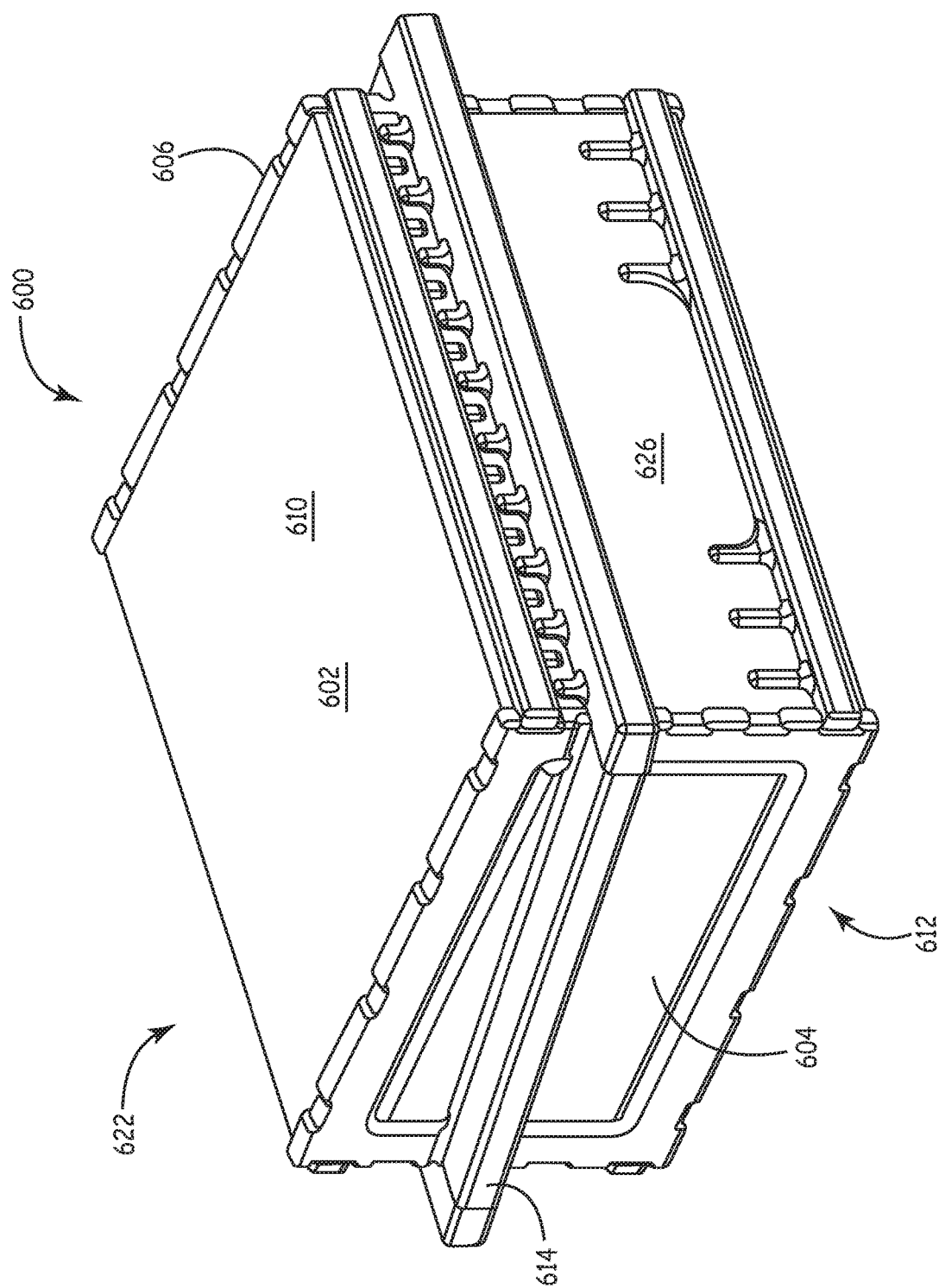
FIG. 27 is a perspective view of an exemplary filter element containing a filtration media pack according to the present invention.
Figure 28:
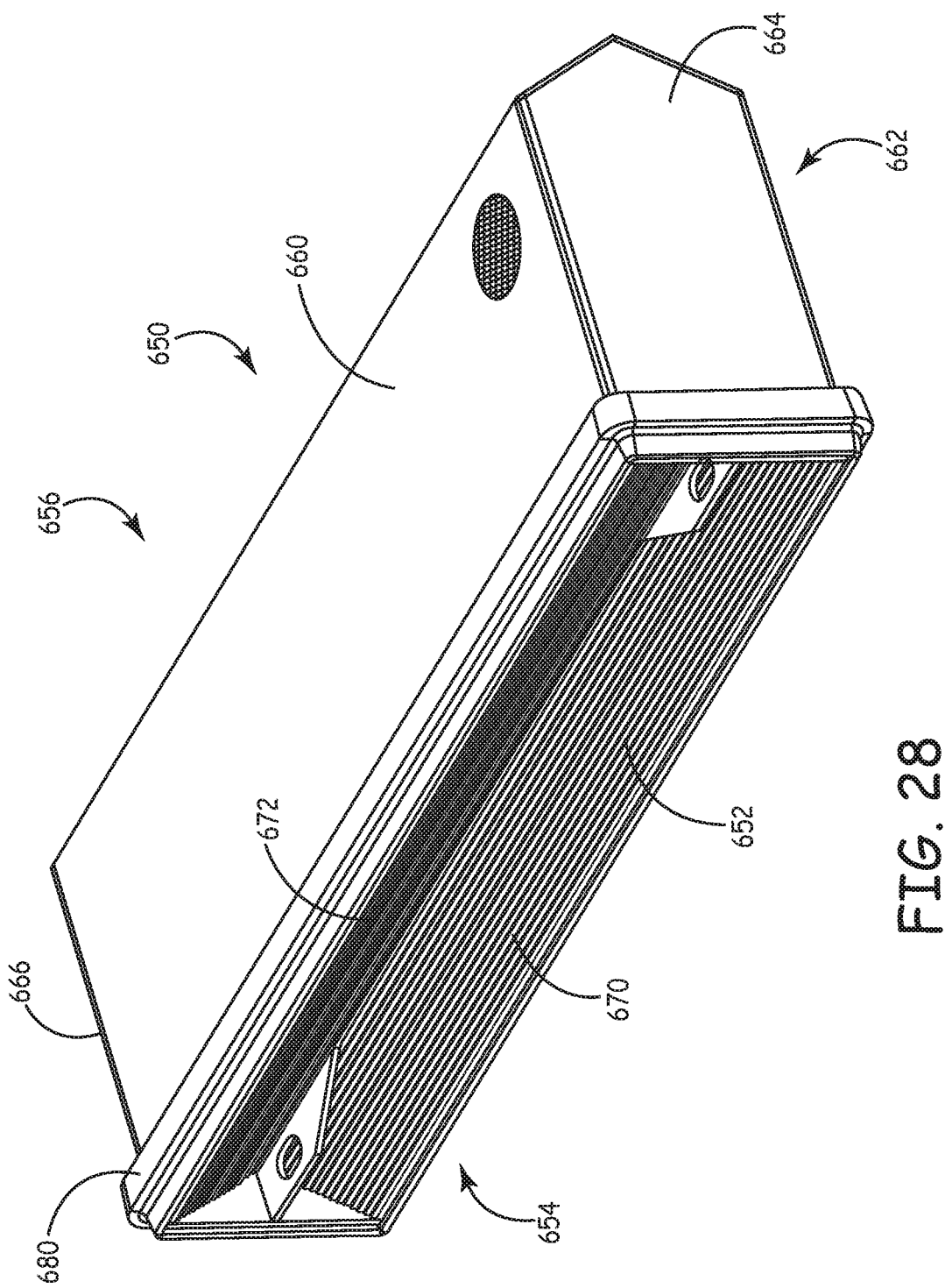
FIG. 28 is a perspective view of an exemplary filter element containing a filtration media pack according to the present invention.

Now referring to FIGS. 22-24, a filter element is shown at reference number 400. The filter element 400 includes a wound media pack 402, a handle arrangement 404, and a seal arrangement 406. Details of this filter element construction can be found in U.S. Pat. No. 6,348,084, the entire disclosure of which is incorporated herein by reference. The previously described single facer media can be used to prepare the filter element 400.

The handle arrangement 404 includes a center board 408, handles 410, and a hook construction 412. The single facer media can be wound around the center board 408 so that the handles 410 extend axially from a first face 414 of the media pack 402. The hook arrangement 412 can extend from the second face 416 of the media pack 402. The handles 410 allow an operator to remove the filter element 400 from a housing. The hook construction 412 provides for attachment to a cross brace or support structure 420. The hook construction 412 includes hook members 422 and 424 that engage the cross brace or support structure 420. The cross brace or support structure 420 can be provided as part of a seal support structure 430 that extends from the second face 416 and includes a seal support member 432. A seal 434 can be provided on the seal support member to provide a seal between the filter element 400 and a housing. The seal 434 can be characterized as a radial seal when the seal is intended to provide sealing as a result of contact of a radially facing seal surface 436 and a housing seal surface.

The filtration media pack can be provided as part of a gas turbine system as shown in U.S. Pat. No. 6,348,085, the entire disclosure of which is incorporated herein by reference. An exemplary gas turbine filtration element is shown at reference number 450 in FIG. 25. The filter element 450 can include a primary filter element 452 and a secondary filter element 454. The secondary filter element 454 can be referred to as a safety filter element. The main filter element 452 can be provided as a filtration media pack as previously described in this application. The filtration media pack can be provided as a result of winding a single facer media or as a result of stacking a single facer media. The primary filter element 452 and the secondary filter element 454 can be secured within a sleeve member 460. The sleeve member 460 can include a flange 462 that includes a seal 464. When installed, the element 450 can be provided so that the flange 462 and seal 464 are provided adjacent a support 466 and held in place by a clamp 200 so that the seal 464 provides a sufficient seal so that unfiltered air does not bypass the filter element 450.

Another filter element that can utilize the filtration media pack is described in U.S. Pat. No. 6,610,126, the entire disclosure of which is incorporated herein by reference. Now referring to FIG. 26, the filter element 500 includes a filtration media pack 502, a radial seal arrangement 504, and a dust seal or secondary seal arrangement 506. The filter element 500 can be provided within an air cleaner housing 510 and can include, downstream of the filter element 500, a safety or secondary filter element 512. Furthermore, an access cover 514 can be provided for enclosing the housing 510. The housing 510 and the access cover 514 can pinch the dust seal 506 so that the dust seal 506 can be characterized as a pinch seal.

The filtration media pack can be provided as a stacked media pack arrangement according to International Publication No. WO 2006/076479 and International Publication No. WO 2006/076456, the disclosures of which are incorporated herein by reference. Now referring to FIG. 27, a filter element is shown at reference number 600 that includes a stacked, blocked, media pack 602. The blocked stacked media pack 602 can be characterized as a rectangular or right (normal) parallelogram media pack. To seal the opposite ends of the media pack 602 are positioned side panels 604 and 606. The side panels 604 and 606 seal the lead end and tail end of each stacked, single facer media. The media pack 602 has opposite flow faces 610 and 612. It is pointed out that no flow path between faces 610 and 612 is provided that does not also require the air to pass through media of the media pack 602 and thus to be filtered. A peripheral, perimeter, housing seal ring 614 is positioned in the air filter element 600. The particular seal ring 614 depicted is an axial pinch seal ring. If desired, a protective sheath or panel can be provided over the media pack surfaces 626 and 622.

The filtration media pack can be provided as a stacked media pack arrangement according to International Publication No. WO 2007/133635, the entire disclosure of which is incorporated herein by reference. Now referring to FIG. 28, a filter element is shown at reference number 650. The filter element 650 includes a stacked z-filter media arrangement 652 having a first, in this instance, inlet face 654, and an opposite second, in this instance, outlet face 656. In addition, the filter element 650 includes an upper side 660, a lower side 662, and opposite side end 664 and 666. The stacked z-filter media arrangement 652 generally comprises one or more stacks of strips of single facer media where each strip comprises a fluted sheet secured to a facing sheet. The strips can be provided in a slanted arrangement. The strips are organized with flutes extending between the inlet face 654 and the outlet face 656. The filter element 650 depicted comprises a stacked z-filter media pack arrangement comprising two stacked media pack sections 670 and 672. A seal member 680 can be molded to the media pack.

It should be appreciated that, in view of exemplary FIGS. 19-28, that the filtration media pack can be provided in various configurations to form filter elements that can then be used in various housing arrangements to provide enhanced performance.

Examples

Filter elements having media containing various flute designs were compared using filter media performance modeling software. The filter elements were not constructed and tested for this example. Instead, the dimensions of the filter elements and the filter element components, the properties and characteristics of the filter elements and the filter element components, the conditions of use, and the characteristics of the air being filtered were inputted into a computer program that models filter media performance. The filter media performance modeling software was validated based upon tests run on actual Donaldson Company filter media. The results of the computer software modeling are expected to have an error within about 10%. For the purpose of evaluating different filter media design alternatives, it is believed that an error value of within about 10% is sufficiently low that the modeling software can be used to evaluate various design options. For purposes of the computer modeling software, the dust selected is characterized as SAE.

Tables 2-8 include a characterization of the filter element and the computer generated results. The tables identify the size of the element evaluated using the filter media performance modeling software. The element size refers to the overall size of the element.

The filter elements characterized in each of the tables are stacked elements having a depth or flute length corresponding to the last identified dimension. For example, in Table 2(a), the element has a size of 8 inches×12 inches×5 inches where the flute length is 5 inches. For element 1, the flute type can be characterized as standard B. For runs 2 and 3, the shape of the element has been changed while keeping the volume of the element relatively constant. Beginning with element 4, the flute type can no longer be considered standard B, and is characterized as arc-flat-arc which generally describes a flute shape having arcs forming the internal peaks and the external peaks of a fluted sheet, and a relatively flat portion of media connecting an internal peak and an external peak. For elements 17-19, the flute type can be characterized as low contact. The low contact shape is generally shown in FIG. 5A.

The filter elements in Tables 2-8 are additionally characterized by the flute density, volume asymmetry, flute width/height ratio, flute height, flute pitch, plug length, and media thickness. As a result of this information, the computer modeling software calculates the initial pressure drop, the SAE fine loading to 12 inches water pressure drop, the volume, and the area of media required. These values are determined for a specified flow rate through the media. In addition, the tables include comparisons with the base filter. In general, the base filter for a table refers to the first listed element in that table. As a result, performance changes can be evaluated among different elements as a result of changes to the design.

The general teaching demonstrated by the data in tables 2-8 is that multiple changes in the design of the filter element can significantly improve performance. In addition, single changes do not necessarily provide the large amounts of improvement compared with multiple changes.

TABLE 2(a)

| Element | Element Size (inches) | Comments | Flute Type and Size | Density (flutes per square inch) | Volume Asymmetry | Flute Width/ Height Ratio | Flute Height (J) (inches) | Flute Pitch (D) (inches) | Plug Length (mm) | Media Thickness (inches) | Initial Pressure Drop (inches water gauge) |
|---|---|---|---|---|---|---|---|---|---|---|---|
| 1 | 8 × 12 × 5 | | Standard B | 34 | 0 | 2.5 | 0.103 | 0.258 | 12.7 | 0.0109 | 1.97 |
| 2 | 8.9 × 12 × 4.5 | change shape | Standard B | 34 | 0 | 2.5 | 0.103 | 0.258 | 12.7 | 0.0109 | 1.66 |
| 3 | 10 × 12 × 4 | change shape | Standard B | 34 | 0 | 2.5 | 0.103 | 0.258 | 12.7 | 0.0109 | 1.39 |
| 4 | 10 × 12 × 4 | | Arc-Flat-Arc | 35 | 0 | 3.5 | 0.085 | 0.298 | 12.7 | 0.0109 | 1.49 |
| 5 | 10 × 12 × 4 | | Arc-Flat-Arc | 40 | 0 | 2.5 | 0.095 | 0.237 | 12.7 | 0.0109 | 1.47 |
| 6 | 10 × 12 × 4 | | Arc-Flat-Arc | 45 | 0 | 2.5 | 0.089 | 0.222 | 12.7 | 0.0109 | 1.54 |
| 7 | 10 × 12 × 4 | | Arc-Flat-Arc | 50 | 0 | 2.5 | 0.084 | 0.210 | 12.7 | 0.0109 | 1.62 |
| 8 | 10 × 12 × 4 | | Arc-Flat-Arc | 50 | 0 | 2.5 | 0.084 | 0.210 | 12.7 | 0.0109 | 1.62 |
| 9 | 10 × 12 × 4 | | Arc-Flat-Arc | 35 | 10 | 2.5 | 0.102 | 0.254 | 12.7 | 0.0109 | 1.42 |
| 10 | 10 × 12 × 4 | | Arc-Flat-Arc | 35 | 20 | 2.5 | 0.102 | 0.254 | 12.7 | 0.0109 | 1.44 |
| 11 | 10 × 12 × 4 | | Arc-Flat-Arc | 35 | 50 | 2.5 | 0.102 | 0.254 | 12.7 | 0.0109 | 1.59 |
| 12 | 10 × 12 × 4 | | Arc-Flat-Arc | 35 | 100 | 2.5 | 0.102 | 0.254 | 12.7 | 0.0109 | 1.98 |
| 13 | 10 × 12 × 4 | | Arc-Flat-Arc | 40 | 10 | 2.5 | 0.095 | 0.237 | 12.7 | 0.0109 | 1.49 |
| 14 | 10 × 12 × 4 | | Arc-Flat-Arc | 40 | 10 | 2.5 | 0.095 | 0.237 | 7 | 0.0109 | 1.49 |
| 15 | 10 × 12 × 4 | | Arc-Flat-Arc | 40 | 10 | 2.5 | 0.095 | 0.237 | 6 | 0.0109 | 1.49 |
| 16 | 10 × 12 × 4 | | Arc-Rat-Arc | 40 | 10 | 2.5 | 0.095 | 0.237 | 2 | 0.0109 | 1.49 |
| 17 | 10 × 12 × 4 | | Low Contact | 40 | 10 | 2.5 | 0.095 | 0.237 | 5 | 0.0109 | 1.42 |
| 18 | 10 × 12 × 4 | | Low Contact | 40 | 10 | 3 | 0.086 | 0.258 | 5 | 0.0109 | 1.49 |
| 19 | 10 × 12 × 4 | | Low Contact | 40 | 10 | 0.33 | 0.270 | 0.089 | 5 | 0.0109 | 1.78 |

TABLE 2(b)

| Element | % of Initial Pressure Drop of Base Filter | SAE Fine Loading to 12 inches H2O Pressure Drop (grams) | % Loading of Base Filter | Volume | % Volume of Base Filter | Media Required (ft²) | % Area of Base Filter | Flow Rate (cfm) |
|---|---|---|---|---|---|---|---|---|
| 1 | 100% | 603 | 100% | 480 | 100% | 63.6 | 100% | 636 |
| 2 | 84% | 589 | 98% | 480 | 100% | 63.9 | 100% | 636 |
| 3 | 71% | 561 | 93% | 480 | 100% | 64.0 | 101% | 636 |
| 4 | 76% | 714 | 118% | 480 | 100% | 71.3 | 112% | 636 |
| 5 | 75% | 611 | 101% | 480 | 100% | 68.9 | 108% | 636 |
| 6 | 78% | 645 | 107% | 480 | 100% | 73.0 | 115% | 636 |
| 7 | 82% | 672 | 111% | 480 | 100% | 76.9 | 121% | 636 |
| 8 | 82% | 672 | 111% | 480 | 100% | 76.9 | 121% | 636 |

TABLE 2(b)-continued

| Element | % of Initial Pressure Drop of Base Filter | SAE Fine Loading to 12 inches H2O Pressure Drop (grams) | % Loading of Base Filter | Volume | % Volume of Base Filter | Media Required (ft²) | % Area of Base Filter | Flow Rate (cfm) |
|---|---|---|---|---|---|---|---|---|
| 9 | 72% | 555 | 92% | 480 | 100% | 64.9 | 102% | 636 |
| 10 | 73% | 563 | 93% | 480 | 100% | 64.8 | 102% | 636 |
| 11 | 81% | 561 | 93% | 480 | 100% | 65.0 | 102% | 636 |
| 12 | 101% | 542 | 90% | 480 | 100% | 65.5 | 103% | 636 |
| 13 | 76% | 599 | 99% | 480 | 100% | 69.1 | 109% | 636 |
| 14 | 76% | 741 | 123% | 480 | 100% | 69.1 | 109% | 636 |
| 15 | 76% | 779 | 129% | 480 | 100% | 69.1 | 109% | 636 |
| 16 | 76% | 814 | 135% | 480 | 100% | 69.1 | 109% | 636 |
| 17 | 72% | 1017 | 169% | 480 | 100% | 67.9 | 107% | 636 |
| 18 | 76% | 1131 | 188% | 480 | 100% | 71.7 | 113% | 636 |
| 19 | 90% | 1351 | 224% | 480 | 100% | 82.3 | 129% | 636 |

TABLE 3(a)

| Element | Element Size (inches) | Comments | Flute Type and Size | Density (flutes per square inch) | Volume Asymmetry | Flute Width/Height Ratio | Flute Height (J) (inches) | Flute Pitch (D) (inches) | Plug Length (mm) | Media Thickness (inches) | Initial Pressure Drop (inches water gauge) |
|---|---|---|---|---|---|---|---|---|---|---|---|
| 20 | 10 × 12 × 4 | | Arc-Flat-Arc | 40 | 20 | 2.5 | 0.095 | 0.237 | 12.7 | 0.0109 | 1.51 |
| 21 | 10 × 12 × 4 | | Arc-Flat-Arc | 40 | 20 | 2.5 | 0.095 | 0.237 | 7 | 0.0109 | 1.51 |
| 22 | 10 × 12 × 4 | | Arc-Flat-Arc | 40 | 20 | 2.5 | 0.095 | 0.237 | 6 | 0.0109 | 1.51 |
| 23 | 10 × 12 × 4 | | Arc-Flat-Arc | 40 | 20 | 2.5 | 0.095 | 0.237 | 5 | 0.0109 | 1.51 |
| 24 | 10 × 12 × 4 | | Low Contact | 40 | 20 | 2.5 | 0.095 | 0.237 | 5 | 0.0109 | 1.45 |
| 25 | 10 × 12 × 4 | | Low Contact | 40 | 20 | 3 | 0.086 | 0.258 | 5 | 0.0109 | 1.52 |
| 26 | 10 × 12 × 4 | | Low Contact | 40 | 20 | 0.33 | 0.270 | 0.089 | 5 | 0.0109 | 1.81 |
| 27 | 10 × 12 × 4 | | Arc-Flat-Arc | 40 | 50 | 2.5 | 0.095 | 0.237 | 12.7 | 0.0109 | 1.67 |
| 28 | 10 × 12 × 4 | | Arc-Flat-Arc | 40 | 50 | 2.5 | 0.095 | 0.237 | 7 | 0.0109 | 1.66 |
| 29 | 10 × 12 × 4 | | Arc-Flat-Arc | 40 | 50 | 2.5 | 0.095 | 0.237 | 6 | 0.0109 | 1.66 |
| 30 | 10 × 12 × 4 | | Arc-Flat-Arc | 40 | 50 | 2.5 | 0.095 | 0.237 | 5 | 0.0109 | 1.66 |
| 31 | 10 × 12 × 4 | | Low Contact | 40 | 50 | 2.5 | 0.095 | 0.237 | 5 | 0.0109 | 1.60 |
| 32 | 10 × 12 × 4 | | Low Contact | 40 | 50 | 3 | 0.086 | 0.258 | 5 | 0.0109 | 1.67 |
| 33 | 10 × 12 × 4 | | Low Contact | 40 | 50 | 0.33 | 0.270 | 0.089 | 5 | 0.0109 | 1.98 |
| 34 | 10 × 12 × 4 | | Arc-Flat-Arc | 40 | 100 | 2.5 | 0.095 | 0.237 | 12.7 | 0.0109 | 2.08 |
| 35 | 10 × 12 × 4 | | Arc-Flat-Arc | 40 | 100 | 2.5 | 0.095 | 0.237 | 7 | 0.0109 | 2.07 |
| 36 | 10 × 12 × 4 | | Arc-Flat-Arc | 40 | 100 | 2.5 | 0.095 | 0.237 | 6 | 0.0109 | 2.07 |
| 37 | 10 × 12 × 4 | | Arc-Flat-Arc | 40 | 100 | 2.5 | 0.095 | 0.237 | 5 | 0.0109 | 2.07 |
| 38 | 10 × 12 × 4 | | Low Contact | 40 | 100 | 2.5 | 0.095 | 0.237 | 5 | 0.0109 | 2.00 |
| 39 | 10 × 12 × 4 | | Low Contact | 40 | 100 | 3 | 0.086 | 0.258 | 5 | 0.0109 | 2.09 |
| 40 | 10 × 12 × 4 | | Low Contact | 40 | 100 | 0.33 | 0.270 | 0.089 | 5 | 0.0109 | 2.41 |

TABLE 3(b)

| Element | % of Initial Pressure Drop of Base Filter | SAE Fine Loading to 12 inches H2O Pressure Drop (grams) | % Loading of Base Filter | Volume | % Volume of Base Filter | Media Required (ft²) | % Area of Base Filter | Flow Rate (cfm) |
|---|---|---|---|---|---|---|---|---|
| 20 | 77% | 613 | 102% | 480 | 100% | 69.0 | 108% | 636 |
| 21 | 77% | 764 | 127% | 480 | 100% | 69.0 | 108% | 636 |
| 22 | 77% | 798 | 132% | 480 | 100% | 69.0 | 108% | 636 |
| 23 | 77% | 838 | 139% | 480 | 100% | 69.0 | 108% | 636 |
| 24 | 74% | 1047 | 174% | 480 | 100% | 68.1 | 107% | 636 |
| 25 | 77% | 1158 | 192% | 480 | 100% | 71.9 | 113% | 636 |
| 26 | 92% | 1376 | 228% | 480 | 100% | 83.3 | 131% | 636 |
| 27 | 85% | 608 | 101% | 480 | 100% | 69.2 | 109% | 636 |
| 28 | 84% | 764 | 127% | 480 | 100% | 69.2 | 109% | 636 |
| 29 | 84% | 799 | 133% | 480 | 100% | 69.2 | 109% | 636 |
| 30 | 84% | 842 | 140% | 480 | 100% | 69.2 | 109% | 636 |
| 31 | 81% | 1119 | 186% | 480 | 100% | 68.8 | 108% | 636 |
| 32 | 85% | 1237 | 205% | 480 | 100% | 72.5 | 114% | 636 |
| 33 | 101% | 1426 | 236% | 480 | 100% | 83.7 | 132% | 636 |
| 34 | 106% | 588 | 98% | 480 | 100% | 69.9 | 110% | 636 |
| 35 | 105% | 735 | 122% | 480 | 100% | 69.9 | 110% | 636 |

TABLE 3(b)-continued

| Element | % of Initial Pressure Drop of Base Filter | SAE Fine Loading to 12 inches H2O Pressure Drop (grams) | % Loading of Base Filter | Volume | % Volume of Base Filter | Media Required ($ft^2$) | % Area of Base Filter | Flow Rate (cfm) |
|---|---|---|---|---|---|---|---|---|
| 36 | 105% | 778 | 129% | 480 | 100% | 69.9 | 110% | 636 |
| 37 | 105% | 818 | 136% | 480 | 100% | 69.9 | 110% | 636 |
| 38 | 102% | 1186 | 197% | 480 | 100% | 70.5 | 111% | 636 |
| 39 | 106% | 1292 | 214% | 480 | 100% | 74.0 | 116% | 636 |
| 40 | 122% | 1441 | 239% | 480 | 100% | 83.7 | 132% | 636 |

TABLE 4(a)

| Element | Element Size (inches) | Comments | Flute Type and Size | Density (flutes per square inch) | Volume Asymmetry | Flute Width/ Height Ratio | Flute Height (J) (inches) | Flute Pitch (D) (inches) | Plug Length (mm) | Media Thickness (inches) | Initial Pressure Drop (inches water gauge) |
|---|---|---|---|---|---|---|---|---|---|---|---|
| 41 | 8 × 12 × 5 | | Standard B Flute | 34 | 0 | 2.5 | 0.103 | 0.258 | 12.7 | 0.0109 | 0.96 |
| 42 | 8.9 × 12 × 4.5 | | Arc-Flat-Arc | 34 | 0 | 2.5 | 0.103 | 0.258 | 12.7 | 0.0109 | 0.82 |
| 43 | 10 × 12 × 4 | | Arc-Flat-Arc | 34 | 0 | 2.5 | 0.103 | 0.258 | 12.7 | 0.0109 | 0.70 |
| 44 | 10 × 12 × 4 | | Arc-Flat-Arc | 35 | 0 | 3.5 | 0.085 | 0.298 | 12.7 | 0.0109 | 0.75 |
| 45 | 10 × 12 × 4 | | Arc-Flat-Arc | 40 | 0 | 2.5 | 0.095 | 0.237 | 12.7 | 0.0109 | 0.74 |
| 46 | 10 × 12 × 4 | | Arc-Flat-Arc | 45 | 0 | 2.5 | 0.089 | 0.222 | 12.7 | 0.0109 | 0.78 |
| 47 | 10 × 12 × 4 | | Arc-Flat-Arc | 50 | 0 | 2.5 | 0.084 | 0.210 | 12.7 | 0.0109 | 0.83 |
| 48 | 10 × 12 × 4 | | Arc-Flat-Arc | 50 | 0 | 2.5 | 0.084 | 0.210 | 12.7 | 0.0109 | 0.83 |
| 49 | 10 × 12 × 4 | | Arc-Flat-Arc | 35 | 10 | 2.5 | 0.102 | 0.254 | 12.7 | 0.0109 | 0.72 |
| 50 | 10 × 12 × 4 | | Arc-Flat-Arc | 35 | 20 | 2.5 | 0.102 | 0.254 | 12.7 | 0.0109 | 0.73 |
| 51 | 10 × 12 × 4 | | Arc-Flat-Arc | 35 | 50 | 2.5 | 0.102 | 0.254 | 12.7 | 0.0109 | 0.79 |
| 52 | 10 × 12 × 4 | | Arc-Flat-Arc | 35 | 100 | 2.5 | 0.102 | 0.254 | 12.7 | 0.0109 | 0.98 |
| 53 | 10 × 12 × 4 | | Arc-Flat-Arc | 40 | 10 | 2.5 | 0.095 | 0.237 | 12.7 | 0.0109 | 0.75 |
| 54 | 10 × 12 × 4 | | Arc-Flat-Arc | 40 | 10 | 2.5 | 0.095 | 0.237 | 7 | 0.0109 | 0.75 |
| 55 | 10 × 12 × 4 | | Arc-Flat-Arc | 40 | 10 | 2.5 | 0.095 | 0.237 | 6 | 0.0109 | 0.75 |
| 56 | 10 × 12 × 4 | | Arc-Flat-Arc | 40 | 10 | 2.5 | 0.095 | 0.237 | 5 | 0.0109 | 0.75 |
| 57 | 10 × 12 × 4 | | Low Contact | 40 | 10 | 2.5 | 0.095 | 0.237 | 5 | 0.0109 | 0.71 |
| 58 | 10 × 12 × 4 | | Low Contact | 40 | 10 | 3 | 0.086 | 0.258 | 5 | 0.0109 | 0.75 |
| 59 | 10 × 12 × 4 | | Low Contact | 40 | 10 | 0.33 | 0.270 | 0.089 | 5 | 0.0109 | 0.91 |

TABLE 4(b)

| Element | % of Initial Pressure Drop of Base Filter | SAE Fine Loading to 12 inches H2O Pressure Drop (grams) | % Loading of Base Filter | Volume | % Volume of Base Filter | Media Required ($ft^2$) | % Area of Base Filter | Flow Rate (cfm) |
|---|---|---|---|---|---|---|---|---|
| 41 | 49% | 1038 | 172% | 480 | 100% | 63.6 | 100% | 400 |
| 42 | 42% | 1012 | 168% | 480 | 100% | 63.9 | 100% | 400 |
| 43 | 36% | 965 | 160% | 480 | 100% | 64.0 | 101% | 400 |
| 44 | 38% | 1133 | 188% | 480 | 100% | 71.3 | 112% | 400 |
| 45 | 38% | 1020 | 169% | 480 | 100% | 68.9 | 108% | 400 |
| 46 | 40% | 1055 | 175% | 480 | 100% | 73.0 | 115% | 400 |
| 47 | 42% | 1081 | 179% | 480 | 100% | 76.9 | 121% | 400 |
| 48 | 42% | 1081 | 179% | 480 | 100% | 76.9 | 121% | 400 |
| 49 | 37% | 975 | 162% | 480 | 100% | 64.9 | 102% | 400 |
| 50 | 37% | 997 | 165% | 480 | 100% | 64.8 | 102% | 400 |
| 51 | 40% | 1020 | 169% | 480 | 100% | 65.0 | 102% | 400 |
| 52 | 50% | 1041 | 173% | 480 | 100% | 65.5 | 103% | 400 |
| 53 | 38% | 1024 | 170% | 480 | 100% | 69.1 | 109% | 400 |
| 54 | 38% | 1022 | 169% | 480 | 100% | 69.1 | 109% | 400 |
| 55 | 38% | 1272 | 211% | 480 | 100% | 69.1 | 109% | 400 |
| 56 | 38% | 1322 | 219% | 480 | 100% | 69.1 | 109% | 400 |
| 57 | 36% | 1533 | 254% | 480 | 100% | 67.9 | 107% | 400 |
| 58 | 38% | 1627 | 270% | 480 | 100% | 71.7 | 113% | 400 |
| 59 | 46% | 1780 | 295% | 480 | 100% | 82.3 | 129% | 400 |

TABLE 5(a)

| Element | Element Size (inches) | Comments | Flute Type and Size | Density (flutes per square inch) | Volume Asymmetry | Flute Width/Height Ratio | Flute Height (J) (inches) | Flute Pitch (D) (inches) | Plug Length (mm) | Media Thickness (inches) | Initial Pressure Drop (inches water gauge) |
|---|---|---|---|---|---|---|---|---|---|---|---|
| 60 | 10 × 12 × 4 | | Arc-Flat-Arc | 40 | 20 | 2.5 | 0.095 | 0.237 | 12.7 | 0.0109 | 0.76 |
| 61 | 10 × 12 × 4 | | Arc-Flat-Arc | 40 | 20 | 2.5 | 0.095 | 0.237 | 7 | 0.0109 | 0.76 |
| 62 | 10 × 12 × 4 | | Arc-Flat-Arc | 40 | 20 | 2.5 | 0.095 | 0.237 | 6 | 0.0109 | 0.76 |
| 63 | 10 × 12 × 4 | | Arc-Flat-Arc | 40 | 20 | 2.5 | 0.095 | 0.237 | 5 | 0.0109 | 0.76 |
| 64 | 10 × 12 × 4 | | Low Contact | 40 | 20 | 2.5 | 0.095 | 0.237 | 5 | 0.0109 | 0.72 |
| 65 | 10 × 12 × 4 | | Low Contact | 40 | 20 | 3 | 0.086 | 0.258 | 5 | 0.0109 | 0.76 |
| 66 | 10 × 12 × 4 | | Low Contact | 40 | 20 | 0.33 | 0.270 | 0.089 | 5 | 0.0109 | 0.92 |
| 67 | 10 × 12 × 4 | | Arc-Flat-Arc | 40 | 50 | 2.5 | 0.095 | 0.237 | 12.7 | 0.0109 | 0.83 |
| 68 | 10 × 12 × 4 | | Arc-Flat-Arc | 40 | 50 | 2.5 | 0.095 | 0.237 | 7 | 0.0109 | 0.83 |
| 69 | 10 × 12 × 4 | | Arc-Flat-Arc | 40 | 50 | 2.5 | 0.095 | 0.237 | 6 | 0.0109 | 0.83 |
| 70 | 10 × 12 × 4 | | Arc-Flat-Arc | 40 | 50 | 2.5 | 0.095 | 0.237 | 5 | 0.0109 | 0.83 |
| 71 | 10 × 12 × 4 | | Low Contact | 40 | 50 | 2.5 | 0.095 | 0.237 | 5 | 0.0109 | 0.79 |
| 72 | 10 × 12 × 4 | | Low Contact | 40 | 50 | 3 | 0.086 | 0.258 | 5 | 0.0109 | 0.84 |
| 73 | 10 × 12 × 4 | | Low Contact | 40 | 50 | 0.33 | 0.270 | 0.089 | 5 | 0.0109 | 1.01 |
| 74 | 10 × 12 × 4 | | Arc-Flat-Arc | 40 | 100 | 2.5 | 0.095 | 0.237 | 12.7 | 0.0109 | 1.03 |
| 75 | 10 × 12 × 4 | | Arc-Flat-Arc | 40 | 100 | 2.5 | 0.095 | 0.237 | 7 | 0.0109 | 1.03 |
| 76 | 10 × 12 × 4 | | Arc-Flat-Arc | 40 | 100 | 2.5 | 0.095 | 0.237 | 6 | 0.0109 | 1.03 |
| 77 | 10 × 12 × 4 | | Arc-Flat-Arc | 40 | 100 | 2.5 | 0.095 | 0.237 | 5 | 0.0109 | 1.03 |
| 78 | 10 × 12 × 4 | | Low Contact | 40 | 100 | 2.5 | 0.095 | 0.237 | 5 | 0.0109 | 0.99 |
| 79 | 10 × 12 × 4 | | Low Contact | 40 | 100 | 3 | 0.086 | 0.258 | 5 | 0.0109 | 1.04 |
| 80 | 10 × 12 × 4 | | Low Contact | 40 | 100 | 0.33 | 0.270 | 0.089 | 5 | 0.0109 | 1.22 |

TABLE 5(b)

| Element | % of Initial Pressure Drop of Base Filter | SAE Fine Loading to 12 inches H2O Pressure Drop (grams) | % Loading of Base Filter | Volume | % Volume of Base Filter | Media Required (ft²) | % Area of Base Filter | Flow Rate (cfm) |
|---|---|---|---|---|---|---|---|---|
| 60 | 39% | 1059 | 176% | 480 | 100% | 69.0 | 108% | 400 |
| 61 | 39% | 1263 | 209% | 480 | 100% | 69.0 | 108% | 400 |
| 62 | 39% | 1313 | 218% | 480 | 100% | 69.0 | 108% | 400 |
| 63 | 39% | 1364 | 226% | 480 | 100% | 69.0 | 108% | 400 |
| 64 | 37% | 1585 | 263% | 480 | 100% | 68.1 | 107% | 400 |
| 65 | 39% | 1683 | 279% | 480 | 100% | 71.9 | 113% | 400 |
| 66 | 47% | 1830 | 303% | 480 | 100% | 83.3 | 131% | 400 |
| 67 | 42% | 1087 | 180% | 480 | 100% | 69.2 | 109% | 400 |
| 68 | 42% | 1303 | 216% | 480 | 100% | 69.2 | 109% | 400 |
| 69 | 42% | 1357 | 225% | 480 | 100% | 69.2 | 109% | 400 |
| 70 | 42% | 1412 | 234% | 480 | 100% | 69.2 | 109% | 400 |
| 71 | 40% | 1715 | 284% | 480 | 100% | 68.8 | 108% | 400 |
| 72 | 43% | 1816 | 301% | 480 | 100% | 72.5 | 114% | 400 |
| 73 | 51% | 1950 | 323% | 480 | 100% | 83.7 | 132% | 400 |
| 74 | 52% | 1103 | 183% | 480 | 100% | 69.9 | 110% | 400 |
| 75 | 52% | 1334 | 221% | 480 | 100% | 69.9 | 110% | 400 |
| 76 | 52% | 1398 | 232% | 480 | 100% | 69.9 | 110% | 400 |
| 77 | 52% | 1453 | 241% | 480 | 100% | 69.9 | 110% | 400 |
| 78 | 50% | 1870 | 310% | 480 | 100% | 70.5 | 111% | 400 |
| 79 | 53% | 1967 | 326% | 480 | 100% | 74.0 | 116% | 400 |
| 80 | 62% | 2086 | 346% | 480 | 100% | 83.7 | 132% | 400 |

TABLE 6(a)

| Element | Element Size (inches) | Comments | Flute Type and Size | Flute Height (J) (inches) | Flute Width/Height Ratio | Plug Length (mm) | Media Thickness (inches) | Initial Pressure Drop (inches H2O) | % of Initial Pressure Drop of Base Filter |
|---|---|---|---|---|---|---|---|---|---|
| 81 | 8 × 12 × 6 | | Standard B | 0.103 | 2.45 | 12.7 | 0.0109 | 1.99 | 100 |
| 82 | 8 × 12 × 8 | | Standard B | 0.103 | 2.45 | 12.7 | 0.0109 | 2.06 | 100 |
| 83 | 8 × 12 × 6 | | Low Contact | 0.103 | 2.50 | 12.7 | 0.0109 | 2.15 | 108.0 |
| 84 | 8 × 12 × 8 | | Low Contact | 0.103 | 2.50 | 12.7 | 0.0109 | 2.20 | 106.8 |
| 85 | 8 × 12 × 6 | | Low Contact | 0.103 | 3.50 | 12.7 | 0.0109 | 1.84 | 92.5 |
| 86 | 8 × 12 × 8 | | Low Contact | 0.103 | 3.50 | 12.7 | 0.0109 | 1.88 | 91.3 |
| 87 | 8 × 12 × 6 | | Arc-Flat-Arc | 0.206 | .40 | 12.7 | 0.0109 | 3.16 | 158.8 |
| 88 | 8 × 12 × 8 | | Arc-Flat-Arc | 0.206 | .40 | 12.7 | 0.0109 | 3.55 | 172.3 |

TABLE 6(a)-continued

| Element | Element Size (inches) | Comments | Flute Type and Size | Flute Height (J) (inches) | Flute Width/Height Ratio | Plug Length (mm) | Media Thickness (inches) | Initial Pressure Drop (inches H2O) | % of Initial Pressure Drop of Base Filter |
|---|---|---|---|---|---|---|---|---|---|
| 89 | 9 × 12 × 6 | | Arc-Flat-Arc | 0.206 | .30 | 12.7 | 0.0109 | 2.96 | 148.7 |
| 90 | 9 × 12 × 8 | | Arc-Flat-Arc | 0.206 | .30 | 12.7 | 0.0109 | 3.28 | 159.2 |

TABLE 6(b)

| Element | SAE Fine Loading to 12 inches H2O Pressure Drop | % Loading of Base Filter | Element Volume (ft³) | % Volume of Base Filter | Volume Asymmetry (%) | Media Required (ft²) | % of Area of Base Filter | Flow Rate (cfm) |
|---|---|---|---|---|---|---|---|---|
| 81 | 948 | 100.0 | 0.3333 | 100.0 | 0.00 | 76.2 | 100 | 636 |
| 82 | 1768 | 100.0 | 0.4444 | 100.0 | 0.00 | 101.5 | 100 | 636 |
| 83 | 1311 | 138.3 | 0.3333 | 100.0 | 51.4 | 78.1 | 102.5 | 636 |
| 84 | 2371 | 134.1 | 0.4444 | 100.0 | 51.4 | 104.2 | 102.7 | 636 |
| 85 | 1252 | 132.1 | 0.3333 | 100.0 | 15.1 | 73.2 | 96.1 | 636 |
| 86 | 2258 | 127.7 | 0.4444 | 100.0 | 15.1 | 97.6 | 96.2 | 636 |
| 87 | 1640 | 173.0 | 0.3333 | 100.0 | 18.9 | 113.0 | 148.3 | 636 |
| 88 | 2531 | 143.2 | 0.4444 | 100.0 | 18.9 | 150.7 | 148.5 | 636 |
| 89 | 1696 | 178.9 | 0.3333 | 100.0 | 19.6 | 108.7 | 142.7 | 636 |
| 90 | 2643 | 149.5 | 0.4444 | 100.0 | 19.6 | 145.0 | 142.9 | 636 |

TABLE 7(a)

| Element | Element Size (inches) | Comments | Flute Type and Size | Flute Height (J) (inches) | Flute Width/Height Ratio | Plug Length (mm) | Media Thickness (inches) | Initial Pressure Drop (inches H2O) | % of Initial Pressure Drop of Base Filter |
|---|---|---|---|---|---|---|---|---|---|
| 91 | 8 × 12 × 9 | | Standard B | 0.103 | 2.45 | 12.7 | 0.0109 | 2.11 | 100 |
| 92 | 8 × 12 × 12 | | Standard B | 0.103 | 2.45 | 12.7 | 0.0109 | 2.27 | 100 |
| 93 | 8 × 12 × 9 | | Low Contact | 0.103 | 2.60 | 12.7 | 0.0109 | 1.98 | 93.8 |
| 94 | 8 × 12 × 12 | | Low Contact | 0.103 | 2.60 | 12.7 | 0.0109 | 2.13 | 93.8 |
| 95 | 8 × 12 × 9 | | Low Contact | 0.103 | 2.60 | 12.7 | 0.0109 | 2.19 | 103.8 |
| 96 | 8 × 12 × 12 | | Low Contact | 0.103 | 2.60 | 12.7 | 0.0109 | 2.31 | 101.8 |
| 97 | 8 × 12 × 9 | | Low Contact | 0.103 | 2.60 | 12.7 | 0.0109 | 2.63 | 124.6 |
| 98 | 8 × 12 × 12 | | Low Contact | 0.103 | 2.60 | 12.7 | 0.0109 | 2.69 | 118.5 |
| 99 | 8 × 12 × 9 | | Arc-Flat-Arc | 0.275 | .30 | 12.7 | 0.0109 | 3.41 | 161.6 |
| 100 | 8 × 12 × 12 | | Arc-Flat-Arc | 0.275 | .30 | 12.7 | 0.0109 | 3.98 | 175.3 |
| 101 | 8 × 12 × 9 | | Arc-Flat-Arc | 0.275 | .30 | 12.7 | 0.0109 | 3.49 | 165.4 |
| 102 | 8 × 12 × 12 | | Arc-Flat-Arc | 0.275 | .30 | 12.7 | 0.0109 | 4.02 | 177.1 |
| 103 | 8 × 12 × 9 | | Arc-Flat-Arc | 0.275 | .30 | 12.7 | 0.0109 | 3.58 | 169.7 |
| 104 | 8 × 12 × 12 | | Arc-Flat-Arc | 0.275 | .30 | 12.7 | 0.0109 | 4.07 | 179.3 |

TABLE 7(b)

| Element | SAE Fine Loading to 12 inches H2O Pressure Drop | % Loading of Base Filter | Element Volume (ft³) | % Volume of Base Filter | Volume Asymmetry (%) | Media Required (ft²) | % of Area of Base Filter | Flow Rate (cfm) |
|---|---|---|---|---|---|---|---|---|
| 91 | 2222 | 100.0 | 0.5000 | 100.0 | 0.00 | 114.2 | 100 | 636 |
| 92 | 3600 | 100.0 | 0.6666 | 100.0 | 0.00 | 152.3 | 100 | 636 |
| 93 | 2615 | 117.7 | 0.5000 | 100.0 | 0.00 | 114.7 | 100.4 | 636 |
| 94 | 4126 | 114.6 | 0.6666 | 100.0 | 0.00 | 152.9 | 100.4 | 636 |
| 95 | 2934 | 132.0 | 0.5000 | 100.0 | 49.1 | 116.1 | 101.7 | 636 |
| 96 | 4650 | 129.2 | 0.6666 | 100.0 | 49.1 | 154.8 | 101.6 | 636 |
| 97 | 2988 | 134.5 | 0.5000 | 100.0 | 98.7 | 118.6 | 103.9 | 636 |
| 98 | 4666 | 129.6 | 0.6666 | 100.0 | 98.7 | 158.1 | 103.8 | 636 |
| 99 | 2958 | 133.1 | 0.5000 | 100.0 | 0.00 | 162.3 | 142.1 | 636 |
| 100 | 4164 | 115.7 | 0.6666 | 100.0 | 0.00 | 216.3 | 142.0 | 636 |
| 101 | 3126 | 140.7 | 0.5000 | 100.0 | 27.20 | 163.4 | 143.1 | 636 |
| 102 | 4370 | 121.4 | 0.6666 | 100.0 | 27.20 | 217.8 | 143.0 | 636 |
| 103 | 3114 | 140.1 | 0.5000 | 100.0 | 44.10 | 163.9 | 143.5 | 636 |
| 104 | 4256 | 118.2 | 0.6666 | 100.0 | 44.10 | 218.6 | 143.5 | 636 |

TABLE 8(a)

| Element | Element Size (inches) | Comments | Flute Type and Size | Flute Height (J) (inches) | Flute Width/Height Ratio | Plug Length (mm) | Media Thickness (inches) | Initial Pressure Drop (inches H2O) | % of Initial Pressure Drop of Base Filter |
|---|---|---|---|---|---|---|---|---|---|
| 105 | 8 × 12 × 4 | | Standard B | 0.103 | 2.45 | 12.7 | 0.0109 | 1.99 | 100 |
| 106 | 8 × 12 × 4 | | Standard B | 0.103 | 2.45 | 7.0 | 0.0109 | 1.98 | 99.5 |
| 107 | 8 × 12 × 4 | | Standard B | 0.103 | 2.45 | 6.0 | 0.0109 | 1.98 | 99.5 |
| 108 | 8 × 12 × 4 | | Standard B | 0.103 | 2.45 | 5.0 | 0.0109 | 1.97 | 99.0 |
| 109 | 8 × 12 × 4 | | Standard B | 0.103 | 2.45 | 4.0 | 0.0109 | 1.97 | 99.0 |
| 110 | 8 × 12 × 4 | | Low Contact | 0.103 | 2.50 | 7.0 | 0.0109 | 2.15 | 108.0 |
| 111 | 8 × 12 × 4 | | Low Contact | 0.103 | 2.50 | 6.0 | 0.0109 | 2.15 | 108.0 |
| 112 | 8 × 12 × 4 | | Low Contact | 0.103 | 2.50 | 5.0 | 0.0109 | 2.14 | 107.5 |
| 113 | 8 × 12 × 4 | | Low Contact | 0.103 | 2.50 | 4.0 | 0.0109 | 2.14 | 107.5 |

TABLE 8(b)

| Element | SAE Fine Loading to 12 inches H2O Pressure Drop | % Loading of Base Filter | Element Volume (ft³) | % Volume of Base Filter | Volume Asymmetry (%) | Media Required (ft²) | % of Area of Base Filter | Flow Rate (cfm) |
|---|---|---|---|---|---|---|---|---|
| 105 | 314 | 100.0 | 0.2222 | 100.0 | 0.00 | 50.8 | 100.0 | 636 |
| 106 | 397 | 126.4 | 0.2222 | 100.0 | 0.00 | 50.8 | 100.0 | 636 |
| 107 | 418 | 133.1 | 0.2222 | 100.0 | 0.00 | 50.8 | 100.0 | 636 |
| 108 | 441 | 140.4 | 0.2222 | 100.0 | 0.00 | 50.8 | 100.0 | 636 |
| 109 | 465 | 148.1 | 0.2222 | 100.0 | 0.00 | 50.8 | 101.0 | 636 |
| 110 | 575 | 183.1 | 0.2222 | 100.0 | 51.4 | 52.1 | 102.6 | 636 |
| 111 | 601 | 191.4 | 0.2222 | 100.0 | 51.4 | 52.1 | 102.6 | 636 |
| 112 | 634 | 201.9 | 0.2222 | 100.0 | 51.4 | 52.1 | 102.6 | 636 |
| 113 | 666 | 212.1 | 0.2222 | 100.0 | 51.4 | 52.1 | 102.6 | 636 |

The above specification, examples and data provide a complete description of the manufacture and use of the filtration media and filter element of the invention. Since many embodiments of the invention can be made without departing from the spirit and scope of the invention, the invention resides in the claims hereinafter appended.

We claim:

1. A filtration media pack comprising:
   (a) a plurality of layers of filter media wherein the layers of filter media comprise a folded sheet and a facing sheet with spaces between the layers;
   (b) a first portion of the spaces between the layers of filter media being closed to unfiltered fluid flowing into the first portion of the spaces between the layers, and a second portion of the spaces between the layers being closed to unfiltered fluid flowing out of the second portion of the spaces between the layers, so that fluid passing into one face of the media pack and out another face of the media pack passes through media to provide filtration of the fluid; and
   (c) wherein the folded sheets comprise first peaks and second peaks, and at least a portion of the folded sheets have a crease aligned so that it approaches toward a first peak and away from a second peak.

2. A filtration media pack according to claim 1, wherein the folded sheet comprises repeating internal peaks facing toward the facing sheet and repeating external peaks facing away from the facing sheet and a pattern of at least one ridge extending along at least 50% of the flute length between an internal peak and an adjacent external peak.

3. A filtration media pack according to claim 2, wherein the folded sheet comprises at least two ridges along at least 50% of the flute length between an internal peak and an adjacent external peak.

4. A filtration media pack according to claim 2, where at least two ridges are provided in a pattern between an internal peak and an adjacent external peak.

5. A filtration media pack according to claim 1, wherein the filtration media pack has a fold width height ratio of greater than 2.5 of a flute height ratio of less than 0.4.

6. A filtration media pack according to claim 1, wherein the filtration media pack has an average flute density of less than 25 flute/inch.

7. A filtration media pack according to claim 1, wherein the filtration media pack has an average media-cord percentage of greater than 6.5%.

8. A filter element comprising a filtration media pack according to claim 1 and a seal member extending around a periphery of the media pack.

* * * * *